US007203665B2

(12) United States Patent
Donner

(10) Patent No.: US 7,203,665 B2
(45) Date of Patent: Apr. 10, 2007

(54) SYSTEM AND METHOD FOR INTERACTIVE MESSAGING AND/OR ALLOCATING AND/OR UPGRADING AND/OR REWARDING TICKETS, OTHER EVENT ADMITTANCE MEANS, GOODS AND/OR SERVICES

(76) Inventor: Irah H. Donner, 11601 Yeatman Ter., Silver Spring, MD (US) 20902

( * ) Notice: Subject to any disclaimer, the term of this patent is extended or adjusted under 35 U.S.C. 154(b) by 0 days.

(21) Appl. No.: 11/347,990

(22) Filed: Feb. 6, 2006

(65) Prior Publication Data
US 2006/0173781 A1 Aug. 3, 2006

Related U.S. Application Data

(63) Continuation of application No. 09/910,821, filed on Jul. 24, 2001, now Pat. No. 7,031,945.

(60) Provisional application No. 60/220,218, filed on Jul. 24, 2000, provisional application No. 60/226,594, filed on Aug. 21, 2000.

(51) Int. Cl.
*G06F 99/00* (2006.01)
(52) U.S. Cl. .............................. 705/64; 705/5; 705/67; 705/37; 705/26; 340/825; 235/382; 235/384
(58) Field of Classification Search ................ 705/65, 705/26, 27, 67; 235/382, 384; 340/825
See application file for complete search history.

(56) References Cited

U.S. PATENT DOCUMENTS 4,599,490 A 7/1986 Cornell et al.
4,700,374 A 10/1987 Bini
4,724,435 A 2/1988 Moses et al.
4,740,792 A 4/1988 Sagey et al.

(Continued)

FOREIGN PATENT DOCUMENTS

EP 0 597 225 5/1994

(Continued)

OTHER PUBLICATIONS

Whalen, David J. and Gary Churan, "The American Mobile Satellite Corporation Space Segment." American Mobile Satellite Corporation, Washington DC, pp. 394-404.

(Continued)

*Primary Examiner*—Frimin Backer
(74) *Attorney, Agent, or Firm*—Thomas, Kayden, Horstemeyer & Risley LLP

(57) ABSTRACT

A method, system, server architecture and/or tangible medium upgrade and award admittance of events to an event customer, preferably via a data communication network. The method includes, for example, receiving a communication from the event customer, the communication including a request to obtain admittance to at least one event, the communication also including an identifier associated with the event customer, admitting the event customer at the point of sale system after verification of the request, and updating a database indicating that the request was processed. The method also includes determining first predetermined criteria associated with the event indicative of at least one other event customer not attending the event, releasing an allocation associated with the at least one other event customer, and notifying at least another of the event customers to perform the upgrade and/or reallocation.

22 Claims, 46 Drawing Sheets

U.S. PATENT DOCUMENTS

| | | | |
|---|---|---|---|
| 4,754,495 | A | 6/1988 | Kawano et al. |
| 4,866,732 | A | 9/1989 | Carey et al. |
| 4,905,301 | A | 2/1990 | Krolopp et al. |
| 4,951,279 | A | 8/1990 | Hotta |
| 4,956,875 | A | 9/1990 | Bernard et al. |
| 4,972,455 | A | 11/1990 | Phillips et al. |
| 4,972,456 | A | 11/1990 | Kaczmarek et al. |
| 5,020,091 | A | 5/1991 | Krolopp et al. |
| 5,020,092 | A | 5/1991 | Phillips et al. |
| 5,020,093 | A | 5/1991 | Pireh |
| 5,073,900 | A | 12/1991 | Mallinckrodt |
| 5,119,397 | A | 6/1992 | Dahlin et al. |
| 5,163,131 | A | 11/1992 | Row et al. |
| 5,216,427 | A | 6/1993 | Yan et al. |
| 5,239,647 | A | 8/1993 | Anglin et al. |
| 5,247,699 | A | 9/1993 | Hartman |
| 5,257,400 | A | 10/1993 | Yoshida |
| 5,303,286 | A | 4/1994 | Wiedeman |
| 5,307,400 | A | 4/1994 | Sawyer et al. |
| 5,339,330 | A | 8/1994 | Mallinckrodt |
| 5,353,331 | A | 10/1994 | Emery et al. |
| 5,353,352 | A | 10/1994 | Dent et al. |
| 5,369,681 | A | 11/1994 | Boudreau et al. |
| 5,371,898 | A | 12/1994 | Grube et al. |
| 5,392,355 | A | 2/1995 | Khurana et al. |
| 5,394,560 | A | 2/1995 | Kane |
| 5,446,756 | A | 8/1995 | Mallinckrodt |
| 5,475,734 | A | 12/1995 | McDonald et al. |
| 5,488,649 | A | 1/1996 | Schellinger |
| 5,511,233 | A | 4/1996 | Otten |
| 5,526,404 | A | 6/1996 | Wiedeman et al. |
| 5,533,023 | A | 7/1996 | Ohlson et al. |
| 5,535,430 | A | 7/1996 | Aoki et al. |
| 5,555,257 | A | 9/1996 | Dent |
| 5,586,165 | A | 12/1996 | Wiedeman |
| 5,590,395 | A | 12/1996 | Diekelman |
| 5,592,470 | A | 1/1997 | Rudrapatna et al. |
| 5,594,740 | A | 1/1997 | LaDue |
| 5,594,780 | A | 1/1997 | Wiedeman et al. |
| 5,612,703 | A | 3/1997 | Mallinckrodt |
| 5,618,045 | A | 4/1997 | Kagan et al. |
| 5,636,920 | A | 6/1997 | Shur et al. |
| 5,647,795 | A | 7/1997 | Stanton |
| 5,649,292 | A | 7/1997 | Doner |
| 5,659,878 | A | 8/1997 | Uchida et al. |
| 5,794,207 | A | 8/1998 | Walker et al. |
| 5,812,968 | A | 9/1998 | Hassan et al. |
| 5,832,379 | A | 11/1998 | Mallinckrodt |
| 5,835,857 | A | 11/1998 | Otten |
| 5,867,765 | A | 2/1999 | Nilsson |
| 5,878,329 | A | 3/1999 | Mallinckrodt |
| 5,915,207 | A | 6/1999 | Dao et al. |
| 5,940,753 | A | 8/1999 | Mallinckrodt |
| 5,995,832 | A | 11/1999 | Mallinckrodt |
| 6,038,455 | A | 3/2000 | Gardner et al. |
| 6,052,629 | A | 4/2000 | Leatherman et al. |
| 6,091,955 | A | 7/2000 | Aalto et al. |
| 6,108,561 | A | 8/2000 | Mallinckrodt |

FOREIGN PATENT DOCUMENTS

| | | |
|---|---|---|
| EP | 0 712 215 | 5/1996 |
| EP | 0 750 406 | 12/1996 |
| GB | 2265795 | 10/1996 |
| JP | 08214362 | 8/1996 |
| JP | 10-506517 | 6/1998 |
| JP | 10-209939 | 8/1998 |
| WO | WO 95/19078 | 7/1995 |
| WO | WO 99/34636 | 7/1999 |

OTHER PUBLICATIONS

Calcutt, David and Laurie Tetley. "Satellite Communications: Principles and Applications."

White, Lawrence, Anil Agarwal, Brian Skerry and Bill Tisdale. "North American Mobile Satellite System Signaling Architecture." American Institute of Aeronautics and Astronautics and Astronautics, Inc. 1992, pp. 427-439.

Lunsford, J., R. Thorne, D. Gokhale, W. Garner and G. Davies. "The AMSC/TMI Mobile Satellite Services (MSS) System Ground Segment Architecture." American Institute of Aeronautics and Astronautics, Inc. 1992, pp. 405-426.

www.salutation.org/simulate.htm.

Green, James Harry. *The Irwin Handbook of Telecommunications*. Irwin Professional Publishing. 2$^{nd}$ ed. 1992.

Gitlin, R. D., J. F. Hayes and S. B. Weinstain. *Data Communications Principles*. Plenum Press, 1992.

Spohn, Darren L. *Data Network Design*. McGraw-Hill Inc., 1993.

Stallings, William. *Computer Organization and Architecture*. MacMillam Publishing Co. 3$^{rd}$ ed. 1993.

Baranowsky II, Patrick W. "MSAT and Cellular Hybrid Networking," *Proceedings of the Third International Mobile Satellite Conference*, Jun. 16-18, 1993, pp. 149-154.

Johanson, Gary A., N. George Davies and William R. H. Tisdale. "Implementation of a System to Provide Mobile Satellite Services in North America." Presented at International Mobile Satellite Conference '93, Jun. 16-18, 1993.

Fasulo, A. and T. Haines. "Westinghouse MSAT Mobile Terminal Channel Emulator." American Institute of Aeronautics and Astronautics, 1993, pp. 256-260.

Harvey, Tony and Vicky Schumaker. "MSAT Communications Controller and Network Operations Center." American Institute of Aeronautics and Astronautics, Inc. 1993, pp. 1-10.

Tisdale, William R. H. and Gary A. Johanson. "Call Control in the AMSC Mobile Satellite Service System." Pre-Publication Review Copy for AIAA: 15$^{th}$ ICSSC/Session S-9/Mar. 1, 1994.

McCauley, Robert H. and Jeffrey O. Pike, "Feederlink Earth Station to Provide Mobile Satellite Services in North America." American Institute of Aeronautics and Astronautics, 1994, pp. 1-9.

Kittiver, Charles. "Radio Transmission in the American Mobile Satellite System." American Institute of Aeronautics and Astronautics, 1994, pp. 280-294.

Fong, Kok-Song and Gary Churan. "Mobile Earth Terminal in the AMSC Mobile Satellite Service System." American Institute of Aeronautics and Astronautics, 1994, pp. 1-11.

Barroso, L.A. et al. "RPM: A Rapid Prototyping Engine for Multiprocessor Systems." IEEE Computer, Feb. 1995, pp. 26-34.

Katzela, I. And M. Naghshineh. "Channel Assignment Schemes for Cellular Mobile Telecommunication Systems: A Comprehensive Survey." *IEEE Personal Communications*, Jun. 1996, pp. 10-31.

Lutz, Erich. "Issues in Satellite Personal Communication Systems." *Wireless Networks*, 1998, pp. 109-1274.

Wood and Douglas. "Radio Telemetry Applications Manual." *Wood and Douglas Ltd Applications Manual*, Oct. 1999, pp. 1-70.

Toewijzing, Frequentie. *Frequency Assignment, Models and Algorithms*. Nov. 4, 1999, pp. 1-161.

Leavitt, Neal. "Will WAP Deliver the Wireless Internet?" *Computer, Technology News*, May 2000, pp. 16-20.

Goodman, David J. "The Wireless Internet: Promises and Challenges." *IEEE, Perspectives*, Jul. 2000, pp. 36-41.

Lui-Kwan, Gerald. "In-Flight Entertainment: The Sky's the Limit." *Computer, Entertainment Computing*, Oct. 2000, pp. 98-101.

Oliphant, Malcolm W. "Radio Interfaces Make the Difference in 3G Cellular Systems." *IEEE Spectrum*, Oct. 2000, pp. 53-58.

Boxer, A. "Where Buses Cannot Go." IEEE Spectrum, Feb. 1995, pp. 41-45.

Richard III, Golden G. *Service Advertisement and Discover*, IEEE Internet Computing, Sep.-Oct. 2000.

Clark, David. "Speech Recognition: The Wireless Interface Revolution." *Computer, Technology News*, Mar. 2001, pp. 16-18.

Ingebretsen, Mark and Matt Siegel. "Cable Slouches Toward Open Access." *IEEE Spectrum*, Apr. 2001, pp. 74-79.

Dixit, Sudhir and Yinghua Ye. "Streamlining the Internet-Fiber Connection." *IEEE Spectrum*, Apr. 2001, pp. 52-57.

Ledbetter, James. "Wireless Promises a Bold Future of Mobile Commerce and Multimedia But Before We Get There, The Telecom Industry Will have to Overcome Five Unspoken Hurdles." *The Industry Standard*, Jun. 25, 2001, pp. 37-44.

Katzela, I. And M. Naghshinch. "Channel Assignment Schemes for Cellular Mobile Telecommunication Systems: A Comprehensive Survey." *IEEE Personal Communications*, Jun. 1996, pp. 10-31.

Elsen, Ingo, Frank Hartung, Uwe Horn, Markus Kampmann and Liliane Peters. "Streaming Technology in 3G Mobile Communication Systems." *IEEE, Cover Feature*, Sep. 2001, pp. 46-52.

Danesh, Mina, Juan-Carlos Zuniga and Fabio Concilio. "Fixed Low-Frequency Broadband Wireless Access Radio Systems." *IEEE Communications Magazine*, Sep. 2001, pp. 134-138.

Izadpanah, Hossein. "A Milimeter-Wave Broadband Wireless Access Technology Demonstrator for the Next-Generation Internet Network Reach Extension." *IEEE Communications Magazine*, Sep. 2001, pp. 140-145.

Minoh, Michihiko. "Networked Appliances and Their Peer-to-Peer Architecture AMIDEN." *IEEE Communications Magazine*, Oct. 2001, pp. 80-84.

Ala-Laurila, Juha, Jouni Mikkonen and Jyri Rinnemaa. "Wireless LAN Access Network Architecture for Mobile Operators." *IEEE Communications Magazine*, Nov. 2001, pp. 82-89.

Lawton, George. "Browsing the Mobile Internet." *Computer, Industry Trends*, Dec. 2001, pp. 17-21.

Kagal, Lalana, Tim Finin and Anupam Joshi. "Trust-Based Security in Pervasive Computing Environments." *Computer, Communications*, Dec. 2001, pp. 153-157.

Garber, Lee. "Will 3G Really be the Next Big Wireless Technology?" *Computer, Technology News*, Jan. 2002, pp. 26-32.

Moyer, Stan, Dave Maples, Simon Tsang and Abhrajit Ghosh. "Service Portability of Networked Appliances." *IEEE Communications Magazine*, Jan. 2002, pp. 116-121.

Lienhart, Rainer, Matthew Holliman, Yeh-Kuang Chen, Igor Kozintsev and Minerva Yeung. Improving Media Services on P2P Networks. *IEEE Internet Computing*, Jan.-Feb. 2002, pp. 73-77.

Berezdivin, Robert, Robert Breinig and Randy Topp. "Next-Generation Wireless Communications Concepts and Technologies." *IEEE Communications Magazine*, Mar. 2002, pp. 108-116.

De Vriendt, Johan, Philippe Lainé, Christophe Lerouge and Xiaofeng Xu. "Mobile Network Evolution: A Revolution on the Move." *IEEE Communications Magazine*, Apr. 2002, pp. 104-111.

Raghu, T.S., Ramesh, R. and Andrew B. Whinston. "Next Steps for Mobile Entertainment Portals." *IEEE, Research Feature*, May 2002, pp. 63-70.

Parameswaran, Manoj, Anjana Susarla and Andrew B. Whinston. "P2P Networking: An Information-Sharing Alternative." *IEEE, Computing Practices*, Jul. 2001, pp. 31-37.

"Toronto Blue Jays 'Take Baseball to the People' With Xybernaut® Wearable Computers", www.xybernaut.com, Apr. 8, 2002.

Wolverton, Troy, "Ticket market meets its digital future", www.news.com, May 21, 2002.

Sairam, K., N. Gunasekaran, S. Rama Reddy, "Bluetooth in Wireless Communication", *IEEE Communications Magazine*, Jun. 2002, pp. 90-96.

Cochennec, Jean-Yves, "Activities on Next-Generation Networks Under Global Information Infrastructure in ITU-T", *IEEE Communications Magazine*, Jul. 2002, pp. 98-101.

Personick, Stewart D., "Evolving toward the Next-Generation Internet: Challenges in the Path Forward", *IEEE Communications Magazine*, Jul. 2002, pp. 72-76.

Farber, David J., "Predicting the Unpredictable: Future Directions in Internetworking and Their Implications", *IEEE Communications Magazine*, Jul. 2002, pp. 67-71.

Andrews, Frederick T., "The Telephone Network of the 1960s", *IEEE Communications Magazine*, Jul. 2002, pp. 49-53.

Baran, Paul, "The Beginnings of Packet Switching: Some Underlying Concepts", *IEEE Communications Magazine*, Jul. 2002, pp. 42-48.

Soriano, Miguel and Diego Ponce, "A Security and Usability Proposal for Mobile Electronic Commerce", *IEEE Communications Magazine*, Aug. 2002, pp. 62-67.

Demestichas, Panagiotis, Louisa Papadopoulou, Vera Stavroulaki, Michael Theologou, Guillanme Vivier, Georges Martinez and Fabio Galliano, "Wireless Beyond 3G: Managing Services and Network Resources", Aug. 2002, pp. 80-82.

Huber, Josef F., "Toward the Mobile Internet", Oct. 2002, pp. 100-102.

Schilit, Bill N., Jonathan Trevor, David M. Hilbert, Tzu Khiau Koh, "Web Interaction Using Very Small Internet Devices", *IEEE*, Oct. 2002, pp. 37-45.

El-Sayed, Mohamed and Jeffrey Jaffe, "A View of Telecommunications Network Evolution", *IEEE Communications Magazine*, Dec. 2002, pp. 74-81.

Nava, Mario Diaz and Goran S. Okvist, "The Zipper Prototype: A Complete and Flexible VDSL Multicarrier Solution", *IEEE Communications Magazine*, Dec. 2002, pp. 92-106.

Henry, Paul S. and Hui Luo, "WiFi: What's Next?", *IEEE Communications Magazine*, Dec. 2002, pp. 66-72.

Rege, Kiran, Subra Dravida, Sanjiv Nanda, Sriram Narayan, Jerome Strombosky, Manas Tandon, and Dev Gupta, "QoS Management in Trunk-and-Branch Switched Ethernet Networks", *IEEE Communications Magazine*, Dec. 2002, 30-36.

Oh-ishi, Tetsuya, Koji Sakai, Kazuhiro Kikuma, and Akira Kurokawa, "Study of Relationship between Peer-to-Peer Systems and IP Multicasting", *IEEE Communications Magazine*, Jan. 2003, pp. 80-84.

Paulson, Linda Dailey, "Low-Power Chips for High-Powered Handholds", Jan. 2003, pp. 21-23.

SYSTEM AND METHOD FOR INTERACTIVE MESSAGING AND/OR ALLOCATING AND/OR UPGRADING AND/OR REWARDING TICKETS, OTHER EVENT ADMITTANCE MEANS, GOODS AND/OR SERVICES

RELATED APPLICATIONS

This application is a continuation of U.S. application Ser. No. 09/910,821, filed on Jul. 24, 2001 now U.S. Pat. No. 7,031,945 and entitled "SYSTEM AND METHOD REAL-LOCATING AND/OR UPGRADING AND/OR REWARDING TICKETS, OTHER EVENT ADMITTANCE MEANS, GOODS AND/OR SERVICES," which in turn claims priority from U.S. provisional application Ser. No. 60/220,218 filed on Jul. 24, 2000 and entitled "SYSTEM AND METHOD FOR REALLOCATING AND/OR UPGRADING TICKETS OR OTHER EVENT ADMITTANCE MEANS", and U.S. provisional application Ser. No. 60/226,594 filed on Aug. 21, 2000 and entitled "SYSTEM AND METHOD FOR REALLOCATING AND/OR UPGRADING TICKETS OR OTHER EVENT ADMITTANCE MEANS", and the details of all the above referenced application are hereby incorporated by reference.

FIELD OF THE INVENTION

The present invention relates generally to purchasing and provisioning items or services online for reallocating and/or upgrading and/or rewarding tickets and/or other goods/services, and more particularly, to a system, method, and computer readable medium storing computer-executable instructions for upgrading, reallocating, purchasing, and/or being rewarded items or services including event tickets, concessions, and/or merchandise over a data communication network and provisioning these purchases for, for example, reallocating and/or upgrading tickets.

Provisioning, as defined herein, includes in whole or in part, the process of effectuating and/or facilitating the processing of a transaction, including, for example, the sale and/or transfer and/or reallocation of tickets, goods, services, and the like, for movies, theatre, shows, sporting events, cultural events, and other non-event related purchases, services, and the like.

BACKGROUND OF THE INVENTION

U.S. Pat. No. 6,052,629 to Leatherman et al. (Leatherman), incorporated herein by reference, is directed to an Internet capable browser dispenser architecture. As shown in prior art FIG. 1 (FIG. 1 of Leatherman), the system of Leatherman includes a plurality of fuel dispensers 12, each having at least two fueling positions and acting as a point of sale (POS) interface. Connected to the fuel dispensers 12 is a main service station store 16, a local server 18, a convenience store 20, a number of restaurants 22, and a car wash 24, as well as other remote servers 26 via the Internet. Basically, the system of Leatherman provides gas station customers with access to a server on a local network and remote sites via the Internet. With this arrangement, the gas station customers may purchase services at the POS dispensers and be subject to advertisements transmitted thereto. However, while Leatherman discusses purchasing items at a gas station, it makes no disclosure of effectively provisioning and/or performing transactions in the entertainment and/or ticketing industry.

U.S. Pat. No. 5,618,045 to Kagan et al. (Kagen), incorporated herein by reference, relates to an interactive game system. As depicted in prior art FIG. 2 (FIG. 1 of Kagen), the interactive game system 610 of Kagen includes three playing devices 612, 614, and 616, which communicate via a wireless local area network. Communication is effected utilizing short-range radio, infrared, or ultra-sonic signals. As shown in prior art FIG. 3 (FIG. 2 of Kagen), each playing device includes a processor 718, an interface 720, a transmitter 722, a receiver 724 and a display 726. Using these components, a player's actions are transmitted to and received by another player's playing device.

U.S. Pat. No. 5,636,920 to Shur et al. (Shur), incorporated herein by reference, relates to a sports team organizer. In prior art FIG. 4 (FIG. 1 of Shur), a portable computing device for organizing a sports team includes an input device 812, a processor 814, a memory 816, a number of stored programs 818, and an output device 820. With these elements, the organizing system allows a team roster, a starting lineup, and a number of drills to be generated.

U.S. Pat. No. 5,647,795 to Stanton (Stanton), incorporated herein by reference, relates to portable computerized pari-mutuel sports entertainment system. In prior art FIG. 5 (FIG. 1 of Stanton), the system includes a computer 911 and conductor 916, a video cassette recorder 912 with video tape 917, a television set 913, keypads 914, and printers 915. The computer 911 operates as a main computing server, and includes a motherboard 920, a memory card 921, and a number of graphics and other serial cards 922, 923, and 924. With this system, bets are entered from remote locations with keypads 914 and stored in computer 911. After a race, winnings are collected at the cashiers' windows (keypads 914).

The above cited patents are relevant from the perspective that wireless devices are gaining more popularity in today's society.

U.S. Pat. No. 5,794,207 to Walker et al. (Walker), incorporated herein by reference, relates to a method and apparatus for a cryptographically assisted commercial network system designed to facilitate buyer-driven conditional purchase offers. In prior art FIG. 6 (FIG. 1 of Walker), the system includes seller interfaces 300, central controller 200, and buyer node 400. A number of modems 350 and 450 facilitate connection to central controller 200. Using these components, a buyer communicates a binding purchase offer to a number of sellers. In response, the sellers have the option to accept a purchase offer and thus bind the corresponding buyer to a contract. Nevertheless, Walker makes no mention of allowing redemption of the purchases at a point of sale location upon identification or verification of the purchaser or of the purchase.

FIGS. 7–9 show a prior art radio frequency (RF) transmission system 100, as disclosed in U.S. Pat. No. 5,819,172, incorporated herein by reference, for transmitting information from one of a plurality of originating processors A-N to at least one of a plurality of destination processors (A-N) which may be transported during operation. The system 100 includes at least one gateway switch 150 that stores information received from one of the at least one originating processor prior to transmission of the information to the at least one destination processor; a RF information transmission network 130 for transmitting stored information received from one of the at least one gateway switch 150 by RF transmission to at least one destination processor; and at least one interface switch 162 that connects a gateway switch 150 to the RF transmission network 100 and transmits stored information received from one of the at least one gateway switch 150 to the RF information transmission network 100.

The information is transmitted to a receiving interface switch by the electronic mail system in response to an address of the receiving interface switch which has been added to the information originated by the originating processor by either the originating processor or gateway switch 14. The information is transmitted from the receiving interface switch to the RF information transmission network 130 with an address of the destination processor to receive the information which has been added by either the originating processor, a gateway switch or the receiving interface switch.

More particularly, FIG. 8 illustrates a block diagram of the connection between a plurality of gateway switches with mailboxes 150 in different electronic mail systems to the RF information transmission network 160. Multiple gateway switches with mailboxes 150 from a single electronic mail system 1-N may be connected to each interface switch 162 instead of the connection of a single gateway switch with a mailbox to a single interface switch as illustrated. A plurality of interface switches 162 connect information transmitted from at least one electronic mail system as illustrated in FIG. 7. Optionally, a plurality of electronic mail systems 1-N are connected to a data input port of the RF information transmission system which is preferably hub switch 116. The dotted line communication paths 163 illustrate optional information transmissions in which information from a plurality of different electronic mail systems is concentrated at a single interface switch 304. The dotted line communication paths 161 illustrate connections to additional gateway switches with mailboxes 150 within electronic mail systems 1-N.

The interface switches 162 function as a security check to determine that information transmissions originating from a gateway switch with mailbox 150 represent transmissions which should be coupled to a hub switch 116 of the RF information transmission network 160. The security check is performed by the interface switch 162 comparing the identification number of the RF receiver 119 which has been added by either an originating processor A-N or a gateway switch with mailboxes 150 with permissible identification numbers or the interface switch performing the addition of the identification number.

The interface switch 162 also removes information added by the electronic mail system 1-N to the information originated by the originating processor A-N from the stored information received from one of the gateway switches 14, and adds information used by the RF information transmission network 130 during transmission of the information originated at the originating processor to a RF receiver 119 in the RF information transmission network 130 which receives the information and transfers it to the destination processor A-N. Additionally, the interface switch 162 encodes data, which is required to format the display of the cathode ray tube (CRT) of the destination processor for the electronic mail system to which the destination processor is connected, in the form of a character or characters which are decoded by either the RF receiver 119 or the destination processor A-N. This information is added in decoded form back to the information which is processed by the destination processor with a format of the electronic mail system to which the destination processor A-N is connected.

The interface switches 162 also function to store information which has been stored by at least one gateway switch 150 that is received from a plurality of originating processors, and assemble the information from a plurality of originating processors into a packet having a predetermined format and transmit the packet to the hub switch 116 within the RF information transmission network 160. The hub switch is the preferable node in the RF information transmission network to which communications from the gateway switches 150 should be transmitted as a consequence of it having jurisdiction over both local access and transport area (LATA) switches 150 and the local switches 112 in the RF information transmission network, which results in lesser network overhead.

The hub switch 116 receives the packet from the receiving interface switch 162 and disassembles the packet into information from the plurality of originating processors. The originating processors are either within a single electronic mail system such as system 1, or from a plurality of electronic mail systems, such as systems 1-N, or from outside of any electronic mail system from at least one additional processor 312 which is connected directly to interface switch 162 to originate information to be transmitted to a destination processor A-N in an electronic mail system as described below. The RF information transmission network 130 transmits the disassembled information from the hub switch 116, including the identification number of the RF receiver 119 transferring information, to the destination processor A-N to a local switch 112 storing the file identified by the identification number and any destination of the RF receiver in the RF information transmission network to which the information and identification number is to be transmitted by the RF information transmission network, and adds any destination of the RF receiver to the information. The RF information transmission network, in response to any added destination, transmits the information and identification number to the destination for RF broadcast to the RF receiver 119 for transfer to the destination processor A-N.

The information is transmitted to a receiving interface switch 162 from one or more gateway switches 150 by one or more electronic mail systems 1-N in response to an address of the receiving interface switch which has been added to the information originated by the originating processor by either the originating processor or gateway switch. The information is transmitted from the receiving interface switch 162 to the RF information transmission network with an address of the destination processor, such as a name of a user of the destination processor A-N, to receive the information which has been added by either the originating processor A-N, a gateway switch 150 or the receiving interface switch 304.

Preferably, the address of the receiving interface switch is a code word, such as "TF-MOBOX", which is recognized throughout the electronic mail system when appended to information as directing the information to be transmitted to the interface switch 304. The address of the destination processor is preferably the identification number of the RF receiver 119 within the RF information transmission network 160. The address of the receiving interface switch may be added to the information originated by the originating processor, by a gateway switch 150 or by the originating processor A-N. The address of the receiving interface switch 162 may be added to the information by matching an identification of the destination processor A-N which may be the name of the individual utilizing the processor or some other information to add an address of an interface switch such as the aforementioned "TF-MOBOX" stored with the matched identification of the destination processor to the information as the address of the receiving interface switch.

Alternatively, the originating processor may be used to add the address of the receiving interface switch 150 by inputting the address of the receiving interface switch (TF-MOBOX) along with an identification of the destination processor A-N (name of recipient using the processor).

The originating processor A-N may also add the address of the receiving interface switch 162 by matching an identification of the destination processor (name of the user of the processor) with a stored identification of a destination processor and adding an address of the interface switch (TF-MOBOX) stored with the matched identification of the destination processor to the information as the address of the receiving interface switch.

The identification number may be added to the information originated by the originating processor or, alternatively, maybe added by the originating processor by matching an identification of the destination processor (the name of the user of the processor) with a stored identification of a destination processor (the authorized user of the destination processor) and adding an identification number stored with the matched identification of the destination processor to the information as the identification number of the RF receiver 119. Alternatively, the aforementioned matching process may be performed by either the gateway switch 150 or the interface switch 304. The additional processors 312 originates information from outside of any electronic mail system.

Processors 312 provide an address of at least one destination processor in an electronic mail system, such as the name of the user, to receive information transmitted by the RF information transmission system 160, or an identification number of the RF receiver 119 receiving information and transferring the information to the destination processor. The interface switch 162 which receives the information from each processor 312 adds information used by the RF information transmission network 130 during transmission of the information to the RF receiver 119 receiving the information in the same manner as described above with respect to the interface switch 304.

Processors 312 are only required to have a telephone modem and support programming to format information for RF transmission to a destination processor A-N within any one of one or more electronic mail systems 1-N. The processors 312 are not required to have the necessary electronic mail system software present in originating processors A-N or interconnections with an electronic mail system. As a result of the connection to the interface switch 304, information originating from the additional processors 312 may be transmitted by RF transmission to a destination processor A-N within any one or a plurality of electronic mail systems with the user of the processor 312, the processor 312 or the interface switch 162 only having to supply an identification number of the receiver 119 to input information into the RF information transmission system 130 for RF transmission to a destination processor.

The difference between originating information by one of the additional processors 312 outside of any electronic mail system and originating information by one of the processors within one of the electronic mail systems is that the direct connection of the additional processor to the interface switch 162 eliminates the requirement for the adding of an address of the interface switch 162 which is required by the electronic mail systems to forward the information to the interface switch where necessary formatting of the information to be compatible with the RF information transmission system is performed. The interface switch 162 packetizes information originating from the additional processors 312 in the same manner as described above with respect to information originating from within an electronic mail system.

Information from within an electronic mail system and originating from additional processors 312 outside of the electronic mail system may be formatted into the same packets which are forwarded to the hub switch 116. Additionally, interface switch 162 may be connected only to the additional processors 312 to provide an interface only for processors outside of any electronic mail system to destination processors A-N within one or more electronic mail systems 1-N. The only information which is necessary to be inputted by the additional processors 312 is the address of the destination processor (user of the processor). The addition of the identification number of the receiver 119 may be added by matching of an identification of the destination processor with stored destination processors within the additional processor 312, or the interface switch 162 with an identification number of the receiver 119 stored with an identification of a destination processor A-N used as an identification of the destination processor upon a match having been made.

Prior art FIGS. 7–9, however, do not generally relate to, for example, providing an integrated or combination real time and polled electronic messaging system, method and/or a computer readable medium storing computer-executable instructions for enabling e-mail messages and/or other data messages and/or services to be transmitted and/or received via a wireless communications device on either a real time and/or polled basis In recent years, technological advance and consumer demand together have made wireless messaging and related services (e.g., eLinks$^{SM}$ provided by Motient Corporation, Reston, Va.) increasingly popular. These services allow users to, for example, send and receive e-mail messages, as well as provide other messaging services such as paging and faxing. Such e-mail messages are generally received on either a polled or real time basis, where the user has to select the preferred delivery method.

In a polled delivery scheme, the user's existing Internet e-mail account is "extended" via a wireless communications device. For example, in the case of eLink$^{SM}$, messages are retrieved from, for example, a Post Office Protocol 3 (POP3) or Internet Messaging Access Protocol 4 (IMAP4) server and forwarded to a user's wireless device. Using a wireless device, users can access their Internet mailbox either automatically by, for example, setting one or more times at which they wish to receive their messages, or manually by, for example, clicking a "Get Messages" or similar icon. Other ways of accessing the mailbox are also optionally possible. In a real time delivery scheme, user's are generally provided a new, unique e-mail address, which obviously provides the user with an e-mail account that is separate from their desktop e-mail account. For example, in the case of eLinks$^{SM}$, user's are provided a unique e-mail address having the form <username>@2way.net. Other message forms and/or domain names may also optionally be utilized. Such wireless schemes also generally allow users to respond to e-mails in a way such that they appear as though they are originated from the user's e-mail system residing on their desktop PC.

Accordingly, the above prior art is cited as background, none of which relates to the reallocating and/or reprovisioning and/or upgrading and/or rewarding of tickets at events or other goods and services as described in connection with the detailed description below.

SUMMARY OF THE INVENTION

Driven by a widespread understanding of the Internet's capabilities, the power of electronic commerce, and advances in wireless technologies and devices, mobile commerce (m-commerce) is rapidly approaching the business forefront. According to independent research findings, m-commerce-the conduct of business and services over portable, wireless devices-will soon be a dominant force in business and society. For example:

- IDC, an information technology research firm, reports that 70 percent of all wireless subscribers worldwide will access data applications via their phones by 2002.
- The investment firm Robinson Humphrey predicts that, in the US, 50 percent of Internet hits will originate from wireless devices by 2004.
- The Yankee Group, a telecommunications research firm, projects that by 2004 more than 40 percent of wireless users in the US will access Internet content directly from their mobile devices.

The viability of these projections depends on the power of the underlying technology drivers and the attractiveness of m-commerce applications. To compete in a marketplace dominated by wireless devices, businesses must devise effective m-commerce strategies. Building successful strategies begins by recognizing the forces driving m-commerce's emergence.

The US Federal Communication Commission's auctioning of personal communication-service spectrum space in the mid-1990s triggered the current rush to wireless communication methods. Wireless communication now encompasses not only telephones but appliances, including personal digital assistants (PDAs).

Internet use has grown on the strength of PC networks. According to Yankee Group projections, the installed base of PCs will reach 500 million by 2003, as FIG. 10 shows. This huge base is essential to continued growth in electronic commerce and other communications applications. Moreover, because these systems will have greater power and storage capability, as well as the best ever price-performance ratios, more powerful and sophisticated applications will likely emerge for desktop computing and the Internet.

Although these expectations are impressive, PCs still have two limiting characteristics. First, users must sit in front of them. Second, even portable-notebook PCs have to load software, dial into and connect with a network service provider, and await completion of the handshaking process before they can launch an Internet application. This sequence is understandable, but at best it seems a tolerable nuisance. Hence, the dominant applications are still those that are worth the trouble it takes for a user to follow this access sequence or, at least, to keep the computer and applications running.

The aggregate PC installation is substantial, but even more mobile communication devices are in use. The Gartner Group and other research firms project that by 2004, the installed base of mobile phones worldwide will exceed 1 billion more than twice the number of PCs. In addition, the number of other wireless mobile devices will also increase dramatically. Wireless PDA use will more than triple in the next three years. Unlike PCs, these wireless devices require no boot sequence, so people can use them as soon as they turn them on-making them attractive for quick-hit applications.

Just as the transmission control protocol/Internet protocol and the general purpose browser were principal drivers of Internet growth, letting disparate devices interconnect and communicate, similar factors will simplify the interconnectivity and communication of heterogeneous wireless devices. As FIG. 11 shows, mobile network carriers have relied on a variety of incompatible wireless access standards. Recently, however, a common communications technology and uniform interface standard for presenting and delivering wireless services on mobile devices-wireless application protocol (WAP)-have emerged.

WAP specifications include a microbrowser; scripting similar to JavaScript; access functions; and layered communication specifications for sessions, transport, and security. These specifications enable interface-independent and interoperable applications. Most wireless handset and device manufacturers, as well as several service and infrastructure providers, have adopted the WAP standard.

Current access technologies, including TDMA (time division multiple access), CDMA (code division multiple access), and GSM (Global System for Mobile Communication), transmit at 9.6 to 19.2 Kbps. These speeds are dramatically slower than the dial-up rates of desktop PCs connecting to the Internet. Although m-commerce is possible at these bandwidth rates, the slow speeds are not conducive to creating widespread business or consumer participation.

3G (third-generation) wireless technology will also be available. In addition to having greater bandwidth rates, with speeds up to 2 Mbps, 3G will support multimedia transmission. Integrating voice, data, and one- or two-way video will let m-commerce run over any wireless device.

M-commerce applications fall into three main categories: transaction management, digital content delivery, and telemetry services. Users will increasingly initiate a wide range of business transactions from mobile devices. Online shopping sites tailored to mobile phones and PDAs including browsing, selection, purchase, payment, and delivery-have already emerged. These sites include all the necessary shopping features, such as online catalogs, shopping carts, and back office functions. Online booksellers are among the firms that have already implemented wireless shopping transactions. Another class of m-commerce transactions involves using wireless devices to initiate and pay for purchases and services in real time. These kinds of transactions will likely increase as users gain the capability-and become comfortable enough-to manage them. The highest m-commerce transaction volume will probably occur in micro transactions. When individuals reach for their e-cash-equipped mobile phones or PDAs-rather than coins-to settle transactions such as subway fees, widespread use of digital cash will be a reality.

Digital content delivery uses the wireless channel's distribution characteristics. These m-commerce activities include information browsing-instant retrieval of status information (weather, transit schedules, sports scores, ticket availability, and market prices)-and directory services. The CNN Wireless news subscription service and the UPS PDA-linked package tracking and locator service are representative of emerging content delivery services.

Digital products easily transport to and from wireless devices. Hence, downloading entertainment products-for example, MP3 music-is likely to become even more commonplace when 3G arrives. Transferring software, high resolution images, and full-motion advertising messages will also become common activities. The emergence of high-quality display screens and greater bandwidth will undoubtedly trigger the development of innovative video applications. Individuals will use wireless devices to access, retrieve, store, and display high-resolution video content for entertainment, product demonstration, and distance learning.

The transmission and receipt of status, sensing, and measurement information-telemetry services-form the basis for a wide range of new applications involving mobile devices. Innovations in this area let people use wireless phones and appliances to communicate with various devices from their homes, offices, or in the field. For instance, delivery drivers will "ping" intelligent dispensing machines or store computers to determine where their rolling inventory is needed most or which locations need immediate service. Similarly, users will transmit messages to activate remote recording devices or service systems.

Active m-commerce applications function only when someone directly initiates them by transmitting payment details, requesting information, receiving specific content, or retrieving status information. In contrast, passive applications occur without the user taking any action-for example, the automatic collection of toll charges with dedicated cash cards. Integrating digital cash into mobile devices would make these cash cards unnecessary. These wireless devices would facilitate and record payment of toll, mass-transit, fast-food, and other transactions without the user authorizing or entering identification information for each individual transaction. Users could arrange to have their cash chips update automatically by directing the wireless device to contact their money source and download additional digital cash whenever necessary.

Popular in Europe, short messages text messages, up to 160 characters in length, that show up on the recipient's display as they arrive-are examples of passive content delivery. As digital convergence becomes more commonplace, all forms of mail will passively go to wireless devices, including digitized voice mail, fax documents, and e-mail. Passive security, intrusion, and emergency telemetry services will refine the monitoring of facilities and individuals. Any unusual event or unacceptable condition will trigger user notification, regardless of location. Airlines are testing technology that will let them alert passengers, especially frequent fliers, to seat upgrades, schedule changes, and so on, through wireless devices. Some airlines already have prototype telemetry systems that transmit this kind of information to passengers as soon as they enter the airport or pass near a kiosk-like device.

Passive m-commerce telemetry is the foundation of still another form of interactive marketing. Stores will be able to market their products and services by transmitting promotional coupons and messages to passers by: "Come in and enjoy a complimentary cup of our new coffee blend," or "Get half off, if you make your purchase within the next 30 minutes." This type of marketing may give rise to a new challenge: managing m-junk messages without turning off your wireless device.

The technology to facilitate m-commerce is within reach, even as barriers to its development fall away. Applications and wireless devices promise to evolve together, each driving the introduction of innovative and powerful features in the other. The opportunity and challenge is for business to develop strategies that capitalize on the strengths of mobile commerce, thereby helping it to compete in an increasingly digital marketplace. The greatest challenge to structuring such a strategy may be creating the innovations that will meet the needs and expectations of consumers and commercial participants. Additional details regarding the above may be found in James A. Senn, The Emergence of M-Commerce, IEEE COMPUTER (December 2000), incorporated herein by reference and all references cited there incorporated herein by reference.

Mobile device and computer users increasingly face the management of many computing devices. One reason is the expansion of computing environments in the home and office, as printers, scanners, digital cameras, and other peripherals are integrated into networked environments. Another reason is the proliferation of mobile devices such as laptop and palm-sized computers, cellular phones, and pagers. Because these devices trade functionality for suitable form factors and low power consumption, they are necessarily "peripheral-poor" and must therefore establish connections to neighboring devices for storage, faxing, high-speed network access, and printing. It is easy to become frustrated when dealing with the configuration and interaction of such a multitude of devices. Service discovery technologies were developed to reduce this frustration and to simplify the use of mobile devices in a network by allowing them to be "discovered," configured, and used by other devices with a minimum of manual effort. Although most of these "service discovery suites" promise similar functionality—namely, reduced configuration hassles, improved device cooperation, and automated discovery of required services—they come at the problem from different philosophical and technical approaches. Since none of these technologies is a superset of the others and none is mature enough to dominate the market, interoperation among them will require bridging mechanisms. Five competing technologies are described that may be used in conjunction with the present invention, however, other technologies may also or alternatively be used.

Thus, to address the above and other needs of the prior art, it is a feature and advantage of the present invention to provide users with the ability to be awarded, reallocated, upgraded and/or reprovisioned purchase items including tickets and concessions and/or other merchandise and/or services online. By doing so, the present invention allows these users to proceed directly to the event and/or receive the goods and/or services, thereby bypassing any box offices. In addition, the present invention allows purchases of a variety of items such as movie tickets, concessions, movie merchandise, and/or other goods or services using the processes and architecture described herein or other standard platforms. The present invention facilitates these purchases and the subsequent provisioning thereof by utilizing an identification device associated with a user's account which, in turn, is readable by a reader at a point of sale location for verifying the purchases made by the user. The identification device can be, for example, a smart card and/or wireless device with infrared and/or bluetooth enabled, or other standard wireless device, including those described herein.

It is also another optional feature and advantage, alone or in combination with one or more other features, of the present invention to facilitate the provisioning of demographic information to program sponsors. By having each user register demographic information such as age and interests during, for example an initialization process, the present invention compiles information for advertising and marketing use. Using this information, the present invention allows event sponsors to create custom offerings to users. Similarly, the invention allows a sponsor to leverage user and market information to create programs that address evolving user needs for targeting and acquiring new customers.

It is another optional feature and advantage of the present invention to provide marketing opportunities for the events themselves and/or event related merchandise at an entertainment site. This allows users to shop for tickets, concessions, and event-related merchandise at a single time and location.

It is yet another optional feature and advantage of the present invention to apply these concepts to a wide variety of venues such as movies, concerts, sporting events, cultural activities, reserved seating events, events requiring advanced ticket purchase, and/or other similar and analogous events or settings where goods and/or services can be sold, including upgraded, awarded and/or reprovisioned.

To accomplish the above and other features, in one embodiment of the present invention, a user first visits a leading portal, for example, Yahoo!, and selects an event and a desired time. Next, the user is linked to a server, where he or she purchases a ticket and/or concessions and other merchandise with, for example, a credit card, in a secure transaction. The event ticket is then transferred to the user's account, which in turn is associated with a smart card and/or wireless device in the possession of the user. With the smart card/wireless device in hand, the user avoids any box office lines and proceeds directly to an attendant or a point of sale (POS) server or system. The user then presents the smart card to the attendant or POS who reads the smart card using a reading device. After reading the smart card, the attendant or POS accesses the user's account and verifies that a ticket has indeed been purchased before admitting the user. Once the user is at the event, as described below, the user has the functionality to be upgraded, reallocated and/or rewarded tickets.

For example, in one embodiment of the invention, the process begins as all tickets are checked in, for example, as the patrons enter the reserved seating area, such as a stadium or theater, through, for example, bar code readers, scanners, infrared readers, and/or manually or other method where the patron is checked in, either at the gate, seat or other location. For example, patrons can optionally check in a predetermined time before the event through a wireless device, Internet connection, manual or voice recognition telephone, or other manner. The important point is to provide a standard manner for allowing patrons to check in, and if the patron fails to check in using a predetermined procedure to allow that seat to be provided to another willing patron in accordance with a process to be described below.

The patron may check in either a predetermined time before or after the event begins. Currently, such a process is impossible and unthinkable in view of the difficulty reserved seating events have in simply getting the patrons seated prior to the beginning of the event. The present invention represents a revolutionary process to enhance event enjoyment, earn patron loyalty and optionally provide additional revenues to the theater/stadium or optionally other patrons with the desirable ticket.

The check in procedure continues for a predetermined period of time until a predetermined time period has expired, for example, 5 minutes before the event begins, 10 minutes after the event begins, after a predetermined event, such as the second act of a play, and the like. Once the predetermined time period or event has been completed, the check in procedure may be considered completed to begin the seat re-allocation process. To begin the seat re-allocation process, a re-allocation algorithm is used to re-assign seat for patrons that are willing or interested in different or better seats. Such re-allocation processes or algorithms may include a random process, a process where priority patrons are given priority for re-assignment of seat, a process where patrons are willing to pay additional for the re-assignment to either the theater or the individual patron whose seat is being provided to another patron, frequent event patrons, season ticket patrons, or other predetermined process.

If the patron that is identified by the re-allocation process is determined to be present in the theater or event, for example, via mobile telephone, wireless device, and/or manual verification, an optional sub-process determines whether the patron's optional profile is also satisfied with the available seating. If the optional subscriber profile is not satisfied, then the re-allocation process searches for another possible patron. If the optional profile sub-process is satisfied, then the eligible patron is notified via one or means, such as announcement, manually, wireless device, mobile telephone, bulletin board, and/or other means. The patron is then notified and presented with the option of moving for free, use of award points, additional money to the theater and/or patron to whose seat is being provided, or other predetermined criteria to obtain the seat. Optionally, a bidding process may be initiated that allows various patrons to bid against one another. Any standard bidding process may optionally be used. The patron, of course has the option to decline, and if so, the process continues and returns to the re-allocation process to attempt to locate another possible patron.

If the patron accepts, payment of money or other means may be effectuated on the spot via the wireless device, credit card, debit card, points, and the like, and the patron may now move to the other seat. The patron's seat may then optionally be made available as an empty seat to the re-allocation process. If a predetermined period of time has not expired, then the re-allocation process may be run again to optionally continuously re-allocate seats. The patron may optionally store the up-graded ticket on a wireless device for proof of entrance to the better seating area. Optionally, the seat and/or row and/or section, includes a separate reader device to receive optionally the original ticket that is now re-allocated to a better seat, or a new ticket that may optionally be received by the patron via the wireless device and/or manually via a worker in the theater or stadium.

In another aspect of the invention, a registration form is first completed by the user in an initialization process. Subsequently, the user selects an event and pays for the ticket with, for example, a credit card in a secure e-commerce transaction. Then, in this embodiment, a bar coded ticket or receipt is generated and printed by the user. With the bar coded ticket or receipt in hand, the user avoids the box office lines and proceeds directly to an attendant or POS who collects the ticket, verifies the purchase optionally automatically via a bar code reader, and admits the user to the movie screen. The user is then eligible to participate in the reallocation, upgrade and/or reward process described herein.

In alternate embodiments, a scanner is utilized by, for example, an attendant who, rather than tearing the ticket stub in half, simply scans the bar code with the scanner to verify that a ticket purchase has indeed been made by the user. Similar processes may be used for the purchase of merchandise and concessions. Furthermore, to eliminate fraud, once a ticket has been scanned into the real time point of sale system, it cannot be used again. Alternatively, the present invention is implemented in a fully automated setting without human intervention, except in the event of a failure or when assistance is needed.

In other embodiments, the present invention utilizes credit cards, smart cards, or cards with memory media embedded therein, or other portable devices, such as wireless phones, wireless pagers, personal digital assistants, or Internet-ready watches as an alternative or in addition to the printed tickets.

In one embodiment, the present invention relates to upgrading and/or reallocating for the purchasing and provisioning an item utilizing a server linked to a client via a data communication network. This embodiment includes receiving a communication at the server from the client. The communication includes an order for a purchase of the item and an identifier associated with an identification device. This embodiment also includes updating an account associated with the identifier to reflect the purchase, accessing the account by utilizing the identifier at a point of sale server upon presentation of the identification device to verify the purchase, and provisioning the item at the point of sale server after verification of the purchase.

In another embodiment, the present invention also relates to reallocating, upgrading and/or awarding for the purchasing and/or provisioning an item utilizing a server linked to a client via a data communication network. This embodiment includes receiving a communication at the server from the client. The communication includes an order for a purchase of the item. This embodiment also includes transmitting an identifier associated with an account from the server to the client for storage on an identification device, updating the account to reflect the purchase, accessing the account at a point of sale server upon presentation of the identification device by utilizing the identifier to verify the purchase, and provisioning the item at the point of sale server after verification of the purchase. The purchaser is then optionally eligible for the reallocating, upgrading and/or awarding process described herein.

In yet another embodiment, the present invention relates to purchasing and provisioning an item utilizing a server linked to a client via a data communication network. This embodiment includes transmitting a communication from the client to the server. The communication includes an order for a purchase of the item and causes an account to be updated thereby reflecting the purchase. The purchase and the account are associated with an identifier stored on an identification device. The account is accessible upon presentation of the identification device for verifying and provisioning the item. The purchaser is then optionally eligible for the reallocating, upgrading and/or awarding process described herein.

In still yet another embodiment, the present invention relates to purchasing and provisioning an item utilizing a server linked to a client via a data communication network. This embodiment includes transmitting an order for a purchase of the item from the client to the server, associating an identifier with the purchase order and with an identification device in the possession of or to be transferred to a user, updating an account associated with the identifier to include the purchase, accessing the account at a point of sale server upon presentation of the identification device by utilizing the identifier to verify the purchase, and provisioning the item at the point of sale server after verification of the purchase order. The purchaser is then optionally eligible for the reallocating, upgrading and/or awarding process described herein.

In yet another embodiment, the present invention relates to purchasing and provisioning an item utilizing a server linked to a client via a data communication network. This embodiment includes receiving a communication from a user including a purchase order request. In this embodiment, the user is associated with an identifier. This embodiment also includes updating an account associated with the identifier to reflect the purchase order, and provisioning the purchase upon presentation of the identifier. The user is then optionally eligible for the reallocating, upgrading and/or awarding process described herein.

In one embodiment of the invention, a method at least one of reallocates, upgrades and awards admittance to events to an event customer via a data communication network. The data communication network optionally comprises a server, workstations operably connectable to the server, one or more databases operably connectable to the server and the workstations where the workstations optionally include a web browser interface facilitating communication with the server, a point of sale server operably connectable to the server, a point of sale system operably connectable to the point of sale server, and wireless devices operably connectable to the server. The wireless devices include at least one of a smart card, a personal digital assistant, a mobile telephones, and a mobile data device, and the wireless device comprising at least one of transmitting and receiving means and transceiver means for receiving and transmitting signals.

According to one embodiment, the method includes the sequential, non-sequential and sequence independent steps of receiving a communication from the event customer, the communication including a request to obtain admittance to at least one event, the communication also including an identifier associated with an identification device, updating an account associated with the identifier to reflect the request, accessing the account by utilizing the identifier stored on the identification device at the point of sale system upon presentation of the identification device to verify the request, admitting the event customer at the point of sale system after verification of the request, determining a predetermined time period associated with the event indicative of another event customer from event customers not attending the event in accordance with first predetermined criteria, releasing an allocation associated with the another event customer and notifying at least one of the event customers that are at least one of currently attending the event and registered for the at least one of reallocating, reprovisioning, upgrading and awarding responsive to the releasing the allocation, and accepting by at least one of the event customers the at least one of reallocating, reprovisioning, upgrading and awarding in accordance with second predetermined criteria.

The communication optionally includes at least one of payment information, an event selection, a venue selection, a concession selection, and a merchandise selection.

The identification device optionally comprises a memory medium for storing the identifier. The accessing optionally further comprises reading the identifier from the identification device with a reading device. The account is optionally stored in at least one of the server, the identification device, and the point of sale server. The account optionally includes a list of purchased items. The request optionally comprises at least one of a movie ticket, a sporting event ticket, a concession, or merchandise.

In other embodiments of the present invention, demographic information is received from the event customer. In addition, the identification device optionally comprises at least one of a smart card, a credit card, a ticket, a wireless phone, a personal digital assistant, and a wireless device.

The method optionally includes the step of generating at least one of a physical receipt, a confirmation, and an electronic confirmation with at least one of the identification device and the point of sale server.

The method optionally includes the step of generating at least one of a physical receipt, a confirmation, and an electronic confirmation with at least one of the identification device and the point of sale server, and the at least one of the physical receipt, the confirmation, and the electronic confirmation comprises at least one of reserved seating and purchase information.

The second predetermined criteria optionally includes the event customer willing to pay at least one of a predetermined price and the highest price, and wherein the method further comprises the step of billing the event customer in at least one of real-time or at a later time for the at least one of reallocating, reprovisioning, upgrading and awarding in accordance with the second predetermined criteria.

The method optionally includes the step of releasing an allocation associated with the another event customer and the notifying at least one of the event customers that are at least one of currently attending the event and registered for the at least one of reallocating, reprovisioning, upgrading and awarding is performed in accordance with a predetermined algorithm.

The first predetermined criteria optionally includes at least one of agreement with one or more of the event customers, the event customer not providing notice of non-attendance a first predetermined time period prior to the event, the event customer not providing notice of non-attendance a second predetermined time period after start of the event, the event customer leaving the event early, and other predetermined criteria.

In another embodiment of the invention, a method is provided of upgrading and awarding admittance to events to an event customer via a data communication network. The data communication network optionally comprises a server, workstations operably connectable to the server, one or more databases operably connectable to the server and the workstations, the workstations optionally including a web browser interface facilitating communication with the server, a point of sale system, and wireless devices operably connectable to the server, the wireless devices including at least one of a smart card, a personal digital assistant, a mobile telephone, and a mobile data device, and the wireless device comprising at least one of transmitting and receiving means and transceiver means for receiving and transmitting signals to and from the server.

The method includes the sequential, sequence independent and non-sequential steps of receiving a communication from the event customer, the communication including a request to obtain admittance to at least one event, the communication also including an identifier associated with an identification device, processing the request including accessing an account by utilizing the identifier stored on the identification device at the point of sale system upon presentation of the identification device to verify and process the request, and updating a database indicating that the request was processed, admitting the event customer at the point of sale system after verification of the request, determining a predetermined time period associated with the event indicative of at least one other event customer not attending the event in accordance with first predetermined criteria, releasing an allocation associated with the at least one other event customer and notifying at least one of the event customers that are at least one of currently attending the event, previously submitted a request to attend the event and registered for the event to perform the at least one of upgrading and awarding responsive to the releasing the allocation, and accepting by the at least one of the event customers the at least one of upgrading and awarding in accordance with second predetermined criteria.

In another embodiment of the invention, a method is provided of upgrading and awarding admittance to events to an event customer via a data communication network. The data communication network optionally includes a server, workstations operably connectable to the server, one or more databases operably connectable to the server and the workstations, the workstations optionally including a web browser interface facilitating communication with the server, a point of sale system, and wireless devices operably connectable to the server, the wireless devices including at least one of a smart card, a personal digital assistant, a mobile telephone, and a mobile data device, the wireless device comprising at least one of transmitting and receiving means and transceiver means for receiving and transmitting signals to and from the server.

The method includes the sequential, non-sequential or sequence independent steps of receiving a communication from the event customer, the communication including a request to obtain admittance to at least one event, the communication also including an identifier associated with the event customer, admitting the event customer at the point of sale system after verification of the request, and updating a database indicating that the request was processed, determining first predetermined criteria associated with the event indicative of at least one other event customer not attending the event, releasing an allocation associated with the at least one other event customer responsive to the determining step, and notifying at least another of the event customers to perform the at least one of upgrading and awarding responsive to the releasing the allocation, and accepting by the at least another of the event customers the at least one of upgrading and awarding in accordance with second predetermined criteria.

In another embodiment of the invention, a system is provided to upgrade and award admittance to events to an event customer. The system includes a server comprising a processor and a memory medium, the server connected to a data communication network, the memory medium containing instructions for controlling the processor, wherein the processor receives a communication from the event customer, the communication including a request to obtain admittance to at least one event, the communication also including an identifier associated with the event customer, updates a database indicating that the request was processed, determines first predetermined criteria associated with the event indicative of at least one other event customer not attending the event, releases an allocation associated with the at least one other event customer responsive to the determining step, and notifies at least another of the event customers to at least one of upgrade and award the at least another of the event customers with the allocation. The system also includes a plurality of wireless devices operably connectable to the server, the wireless devices including at least one of a smart card, a personal digital assistant, a mobile telephone, and a mobile data device, the wireless device comprising at least one of transmitting and receiving means and transceiver means for receiving and transmitting signals to and from the server, including accepting by the at least another of the event customers the at least one of the upgrade and award for the reallocation via at least one of the wireless devices.

In another embodiment of the invention, a system is provided for upgrading and awarding admittance to events to an event customer. The system includes means for receiving a communication from the event customer, the communication including a request to obtain admittance to at least one event, the communication also including an identifier associated with the event customer, means for admitting the event customer at the point of sale system after verification of the request, and updating a database indicating that the request was processed, means for determining first predetermined criteria associated with the event indicative of at least one other event customer not attending the event, means for releasing an allocation associated with the at least one other event customer responsive to the determining step, and notifying at least another of the event customers to perform the at least one of upgrading and awarding responsive to the releasing the allocation, and means for accepting by the at least another of the event customers the at least one of upgrading and awarding in accordance with second predetermined criteria.

In another embodiment of the invention, a method, system, server architecture and/or tangible medium upgrade and award admittance of events to an event customer, preferably via a data communication network. The method includes the sequential, sequence independent and non-sequential steps of, for example, receiving a communication from the event customer including a request to obtain admittance to at least one event, admitting the event customer, determining first predetermined criteria associated with the event indicative of at least one other event customer not attending the event, releasing an allocation associated with the at least one other event customer, and notifying at least another of the event customers to perform the upgrade and/or reallocation.

In another embodiment of the invention, a method, system, server architecture and/or tangible medium upgrades or awards purchases for a customer. The method includes the sequential, sequence independent and non-sequential steps of, for example, receiving a communication from the customer including a request to purchase an item, determining first predetermined criteria associated with the purchase associated with at least one other customer, and notifying at least another of the event customers regarding the at least one of upgrade, award and purchase.

In another embodiment of the invention, a method, system, server architecture and/or tangible medium combines, upgrades and/or awards purchases for a customer. The method includes the sequential, sequence independent and non-sequential steps of, for example, receiving a communication from the customer including a request to purchase an item, determining first predetermined criteria associated with the purchase and associated with at least one other customer, and notifying the at least one other customer regarding the at least one of upgrade, award and purchase.

In another embodiment of the invention, a system is provided for purchasing, upgrading and awarding an item to a customer. The system includes means for receiving a communication from the customer, the communication including a request to obtain the item, the communication also including an identifier associated with the customer, means for associating the customer at the point of sale system after verification of the request, and updating a database indicating that the request was processed, means for determining first predetermined criteria associated with the item indicative of at least one other customer associated or interested in the item, means for releasing an allocation associated with the at least another customer, and notifying at least another of the customers to perform the at least one of purchasing, upgrading and awarding for the item, and means for accepting by the at least another of the customers the at least one of purchasing, upgrading and awarding in accordance with second predetermined criteria.

Thus, any or all of the following advantages may be provided by the present invention: decrease costs incurred via printing fewer tickets; decrease the number of employees at the events as a result of increased home based printing, wireless device and/or smart card usage; increase efficiency at concession stands; provide another method and outlet to sell tickets and concessions; sell more tickets using e-mail messages; improve sales of tickets and concessions from key demographic information; receive a portion of advertisement sales; improve safety due to the decrease in the amount of cash handled at the theatres; ensure that parents' money given to children is actually spent on the concessions; shorter lines; greater convenience at the concession stand and point of sale; advance sales; more information about events before purchase of ticket; easy way to control a family budget; greater access to merchandise; improve demographic information to improve sales; direct marketing; higher impact for advertising via e mail messages; and/or more focused advertising.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there is illustrated preferred embodiments of the invention.

DESCRIPTION OF BEST MODE OF THE INVENTION

Reference now will be made in detail to the presently preferred embodiments of the invention. Such embodiments are provided by way of explanation of the invention, which is not intended to be limited thereto. In fact, those of ordinary skill in the art may appreciate upon reading the present specification and viewing the present drawings that various modifications and variations can be made. For example, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

Driven by a widespread understanding of the Internet's capabilities, the power of electronic commerce, and advances in wireless technologies and devices, mobile commerce (m-commerce) is rapidly approaching the business forefront. According to independent research findings, m-commerce-the conduct of business and services over portable, wireless devices-will soon be a dominant force in business and society. For example:

- IDC, an information technology research firm, reports that 70 percent of all wireless subscribers worldwide will access data applications via their phones by 2002.
- The investment firm Robinson Humphrey predicts that, in the US, 50 percent of Internet hits will originate from wireless devices by 2004.
- The Yankee Group, a telecommunications research firm, projects that by 2004 more than 40 percent of wireless users in the US will access Internet content directly from their mobile devices.

The viability of these projections depends on the power of the underlying technology drivers and the attractiveness of m-commerce applications. To compete in a marketplace dominated by wireless devices, businesses must devise effective m-commerce strategies. Building successful strategies begins by recognizing the forces driving m-commerce's emergence.

The US Federal Communication Commission's auctioning of personal communication-service spectrum space in the mid-1990s triggered the current rush to wireless communication methods. Wireless communication now encompasses not only telephones but appliances, including personal digital assistants (PDAs).

Figure 1:
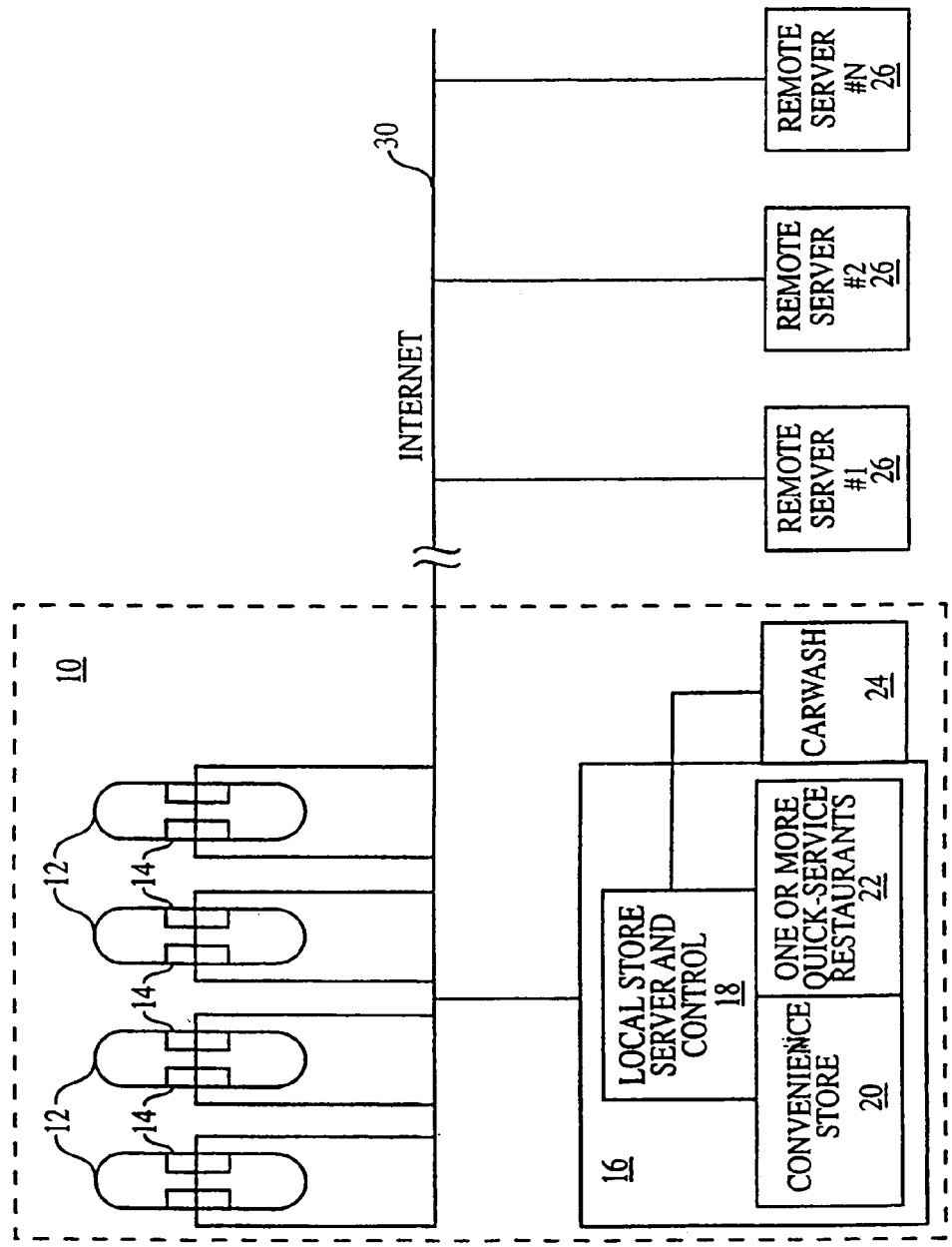
FIG. 1 is directed to a prior art Internet capable browser dispenser architecture.
Figure 2:
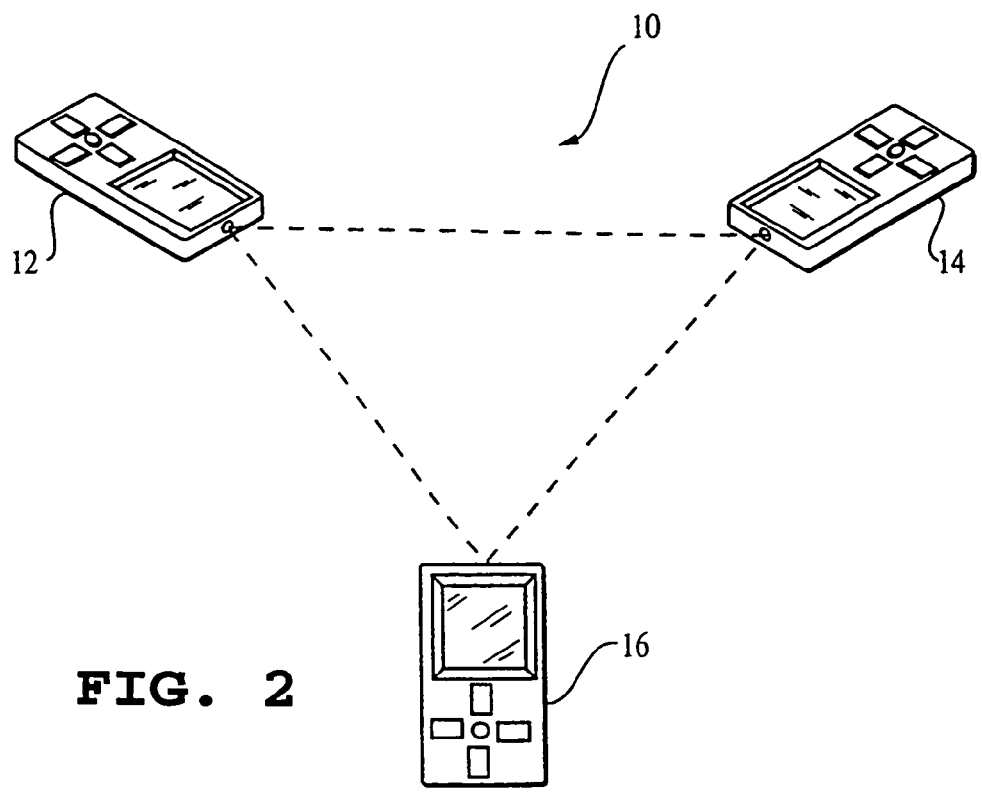
FIGS. 2–3 are illustrations of a prior art interactive game system.
Figure 3:
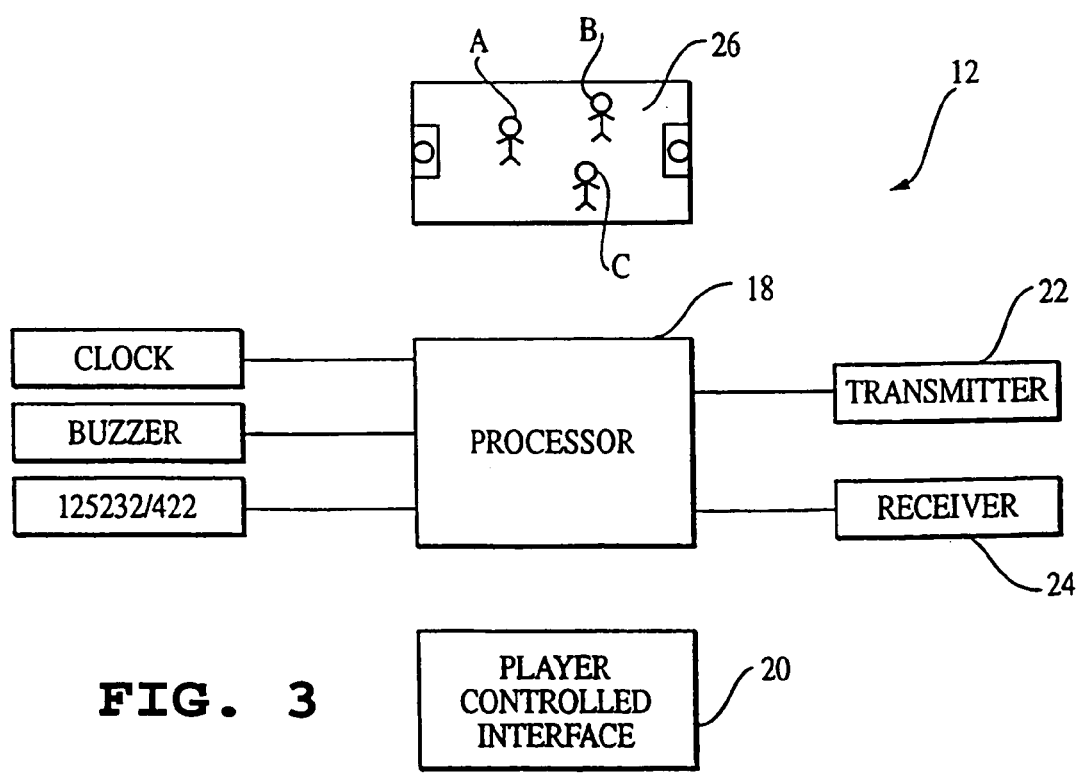
Figure 4:
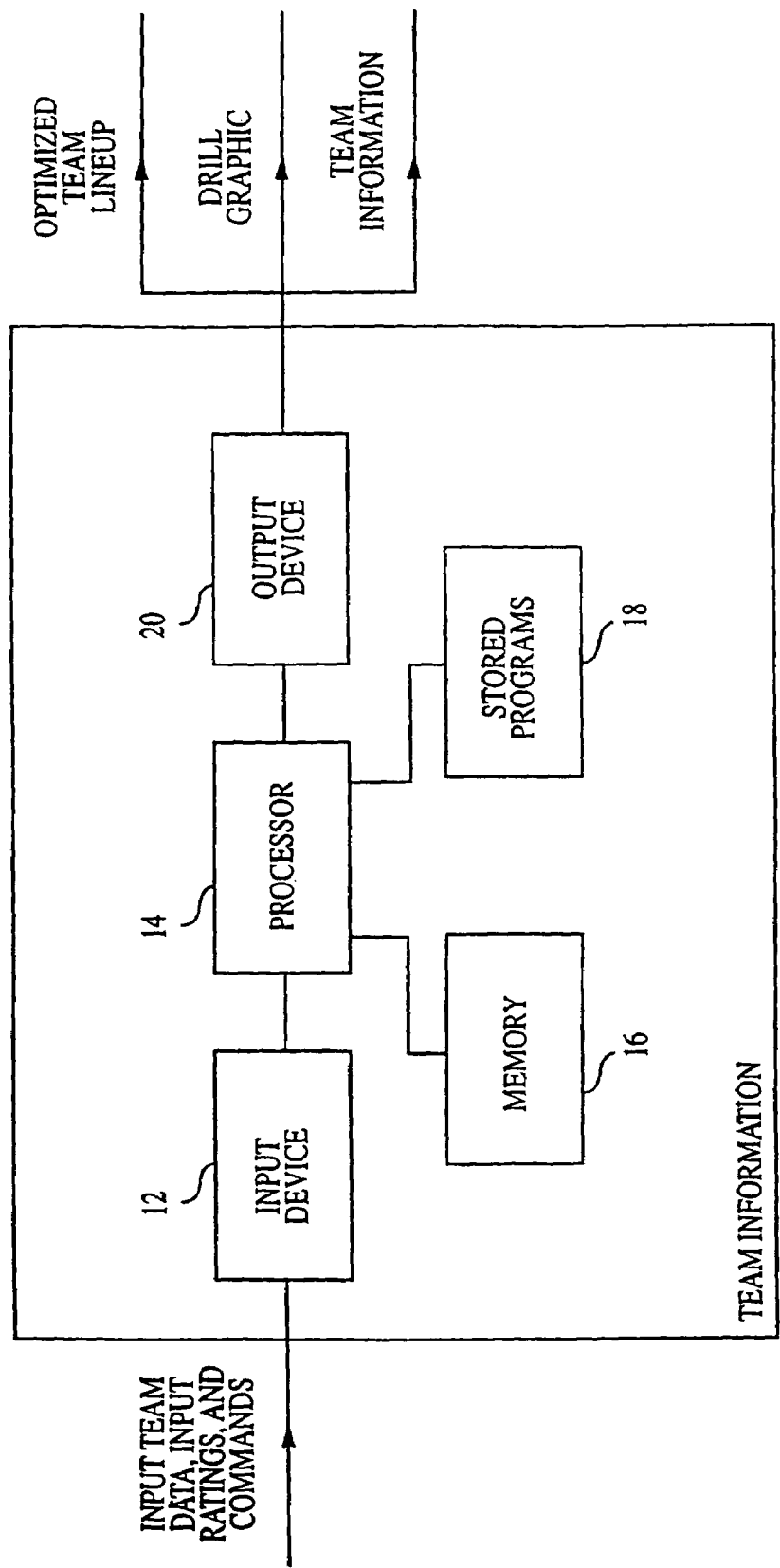
FIG. 4 is an illustration of a prior art portable computing device for organizing a sports team.
Figure 5:
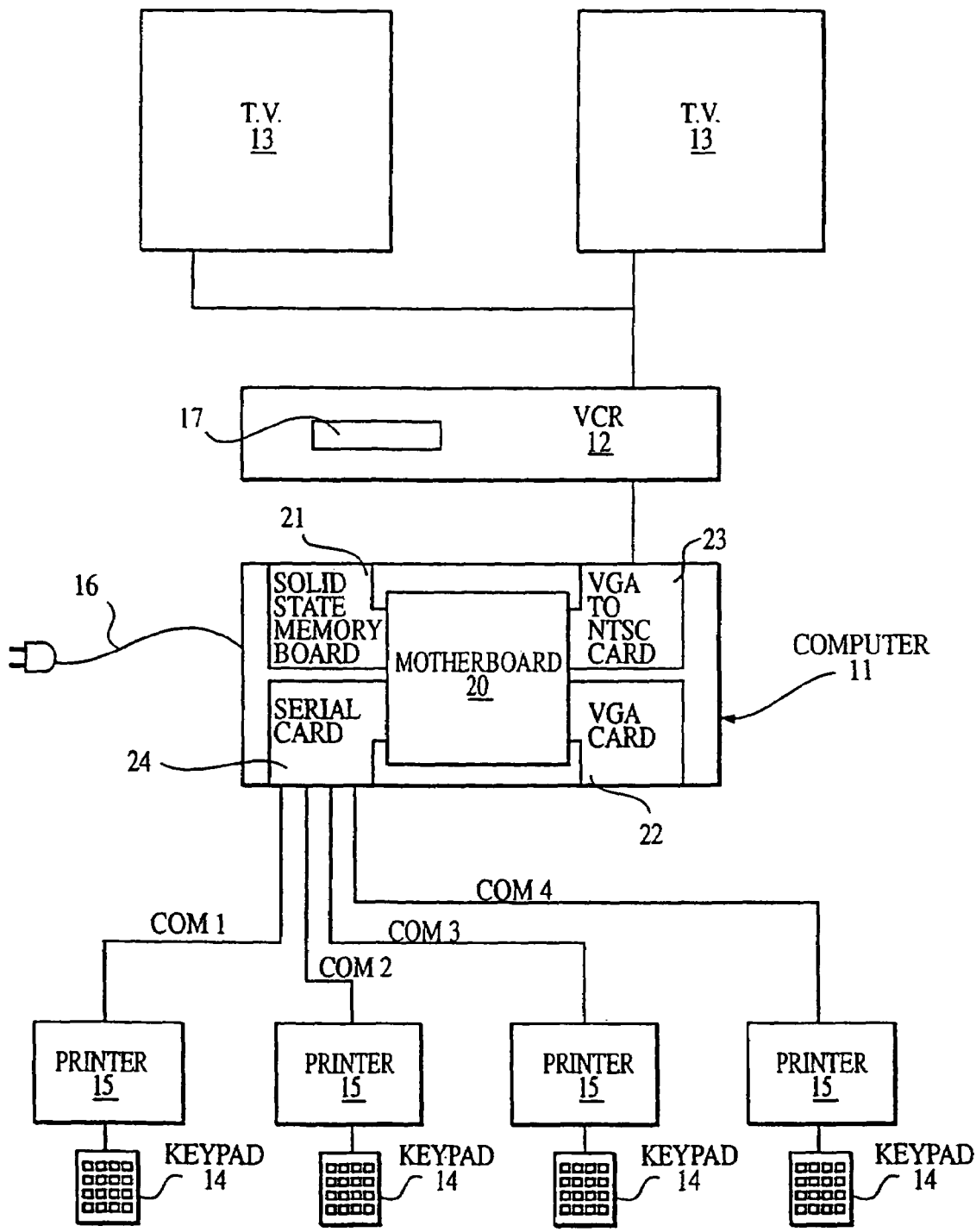
FIG. 5 is a prior art illustration of a portable computerized pari-mutuel sports entertainment system.
Figure 6:
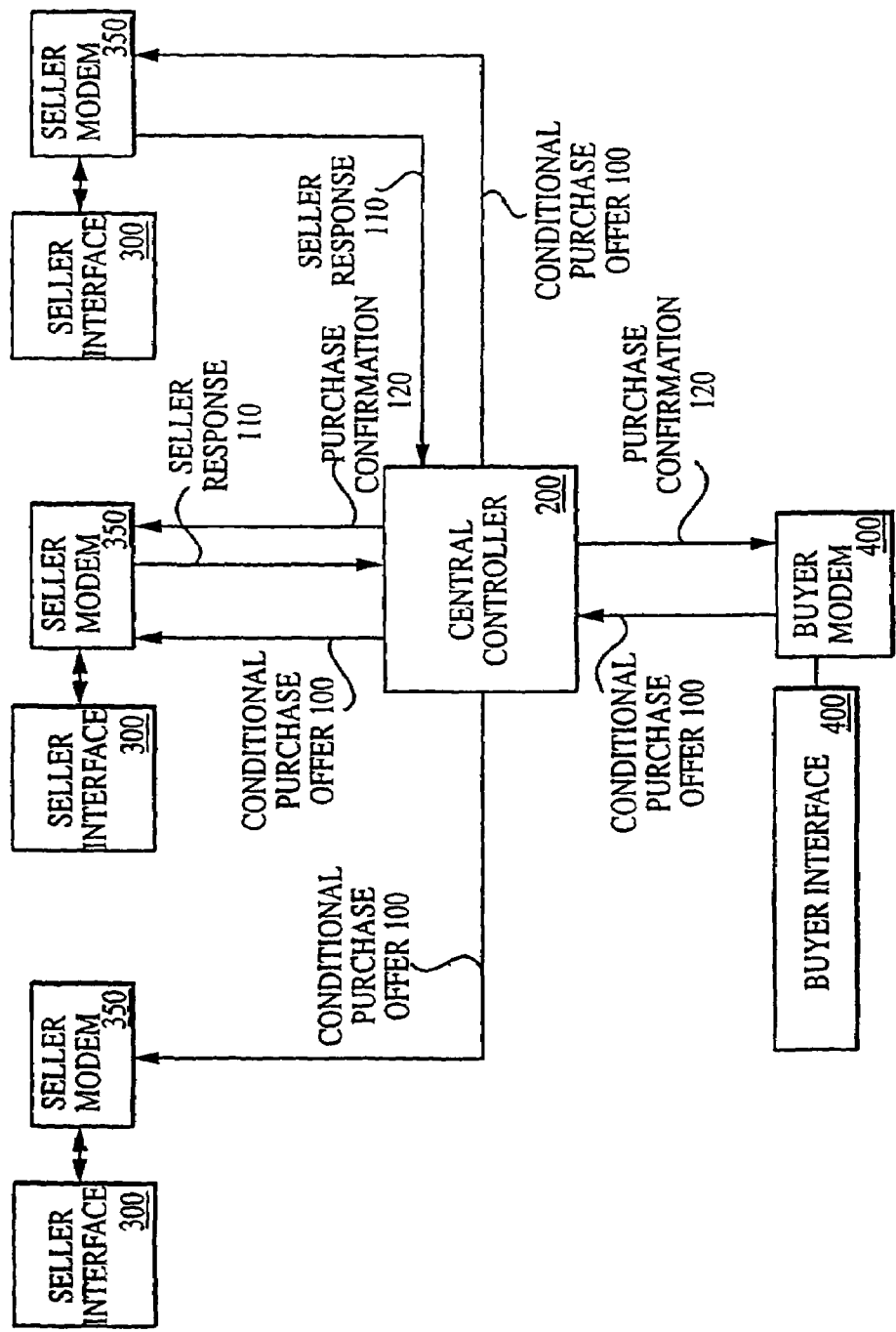
FIG. 6 is an illustration of a prior art method and apparatus for a cryptographically assisted commercial network system designed to facilitate buyer-driven conditional purchase offers.
Figure 7:
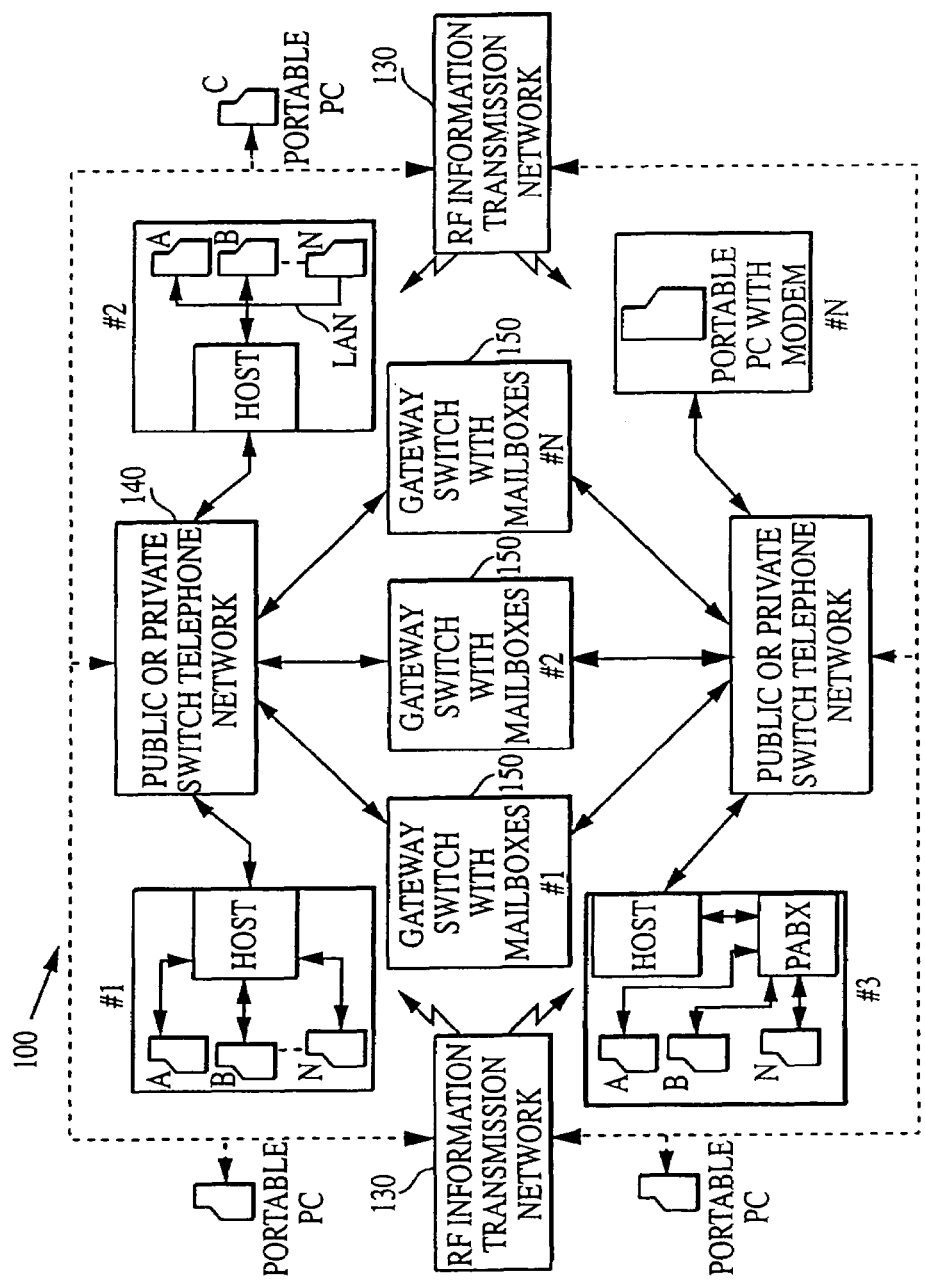
FIGS. 7–9 show a prior art radio frequency (RF) transmission system.
Figure 8:
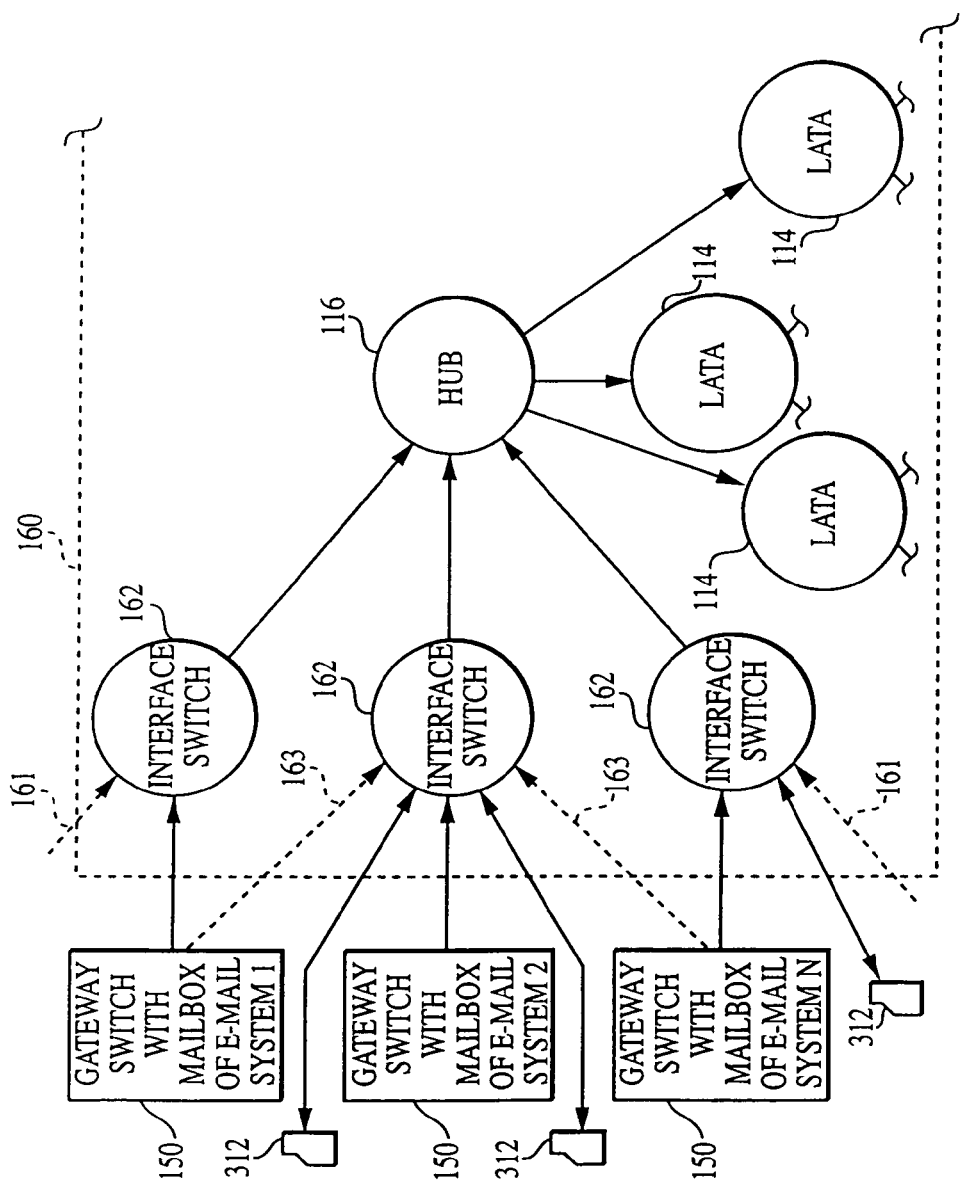
Figure 9:
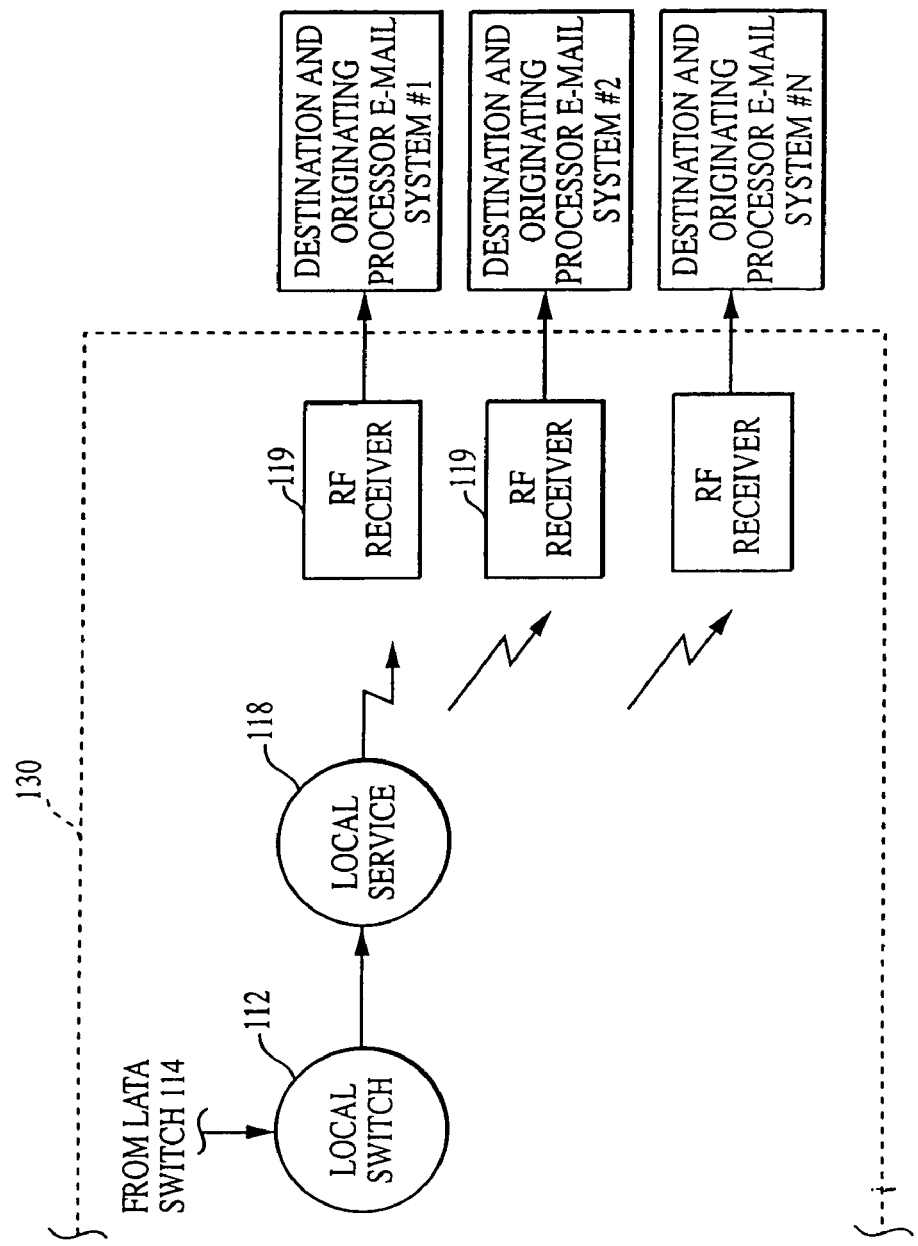
Figure 10:
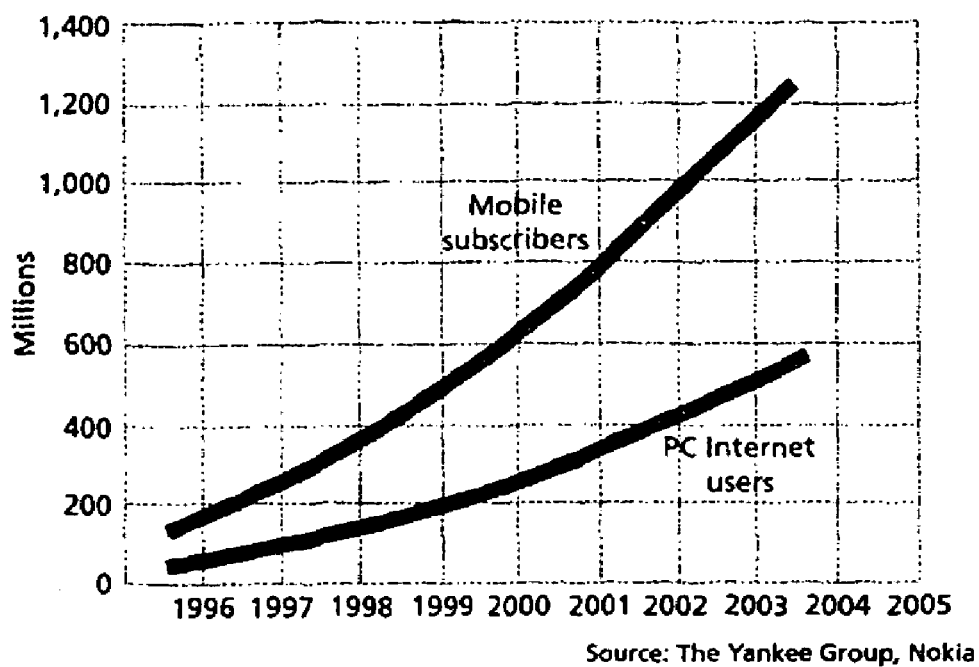
FIG. 10 is an illustration of Yankee Group projections for an installed base of PCs that will reach 500 million by 2003.

Internet use has grown on the strength of PC networks. According to Yankee Group projections, the installed base of PCs will reach 500 million by 2003, as FIG. 10 shows. This huge base is essential to continued growth in electronic commerce and other communications applications. Moreover, because these systems will have greater power and storage capability, as well as the best ever price-performance ratios, more powerful and sophisticated applications will likely emerge for desktop computing and the Internet.

Although these expectations are impressive, PCs still have two limiting characteristics. First, users must sit in front of them. Second, even portable-notebook PCs have to load software, dial into and connect with a network service provider, and await completion of the handshaking process before they can launch an Internet application. This sequence is understandable, but at best it seems a tolerable nuisance. Hence, the dominant applications are still those that are worth the trouble it takes for a user to follow this access sequence or, at least, to keep the computer and applications running.

The aggregate PC installation is substantial, but even more mobile communication devices are in use. The Gartner Group and other research firms project that by 2004, the installed base of mobile phones worldwide will exceed 1 billion more than twice the number of PCs. In addition, the number of other wireless mobile devices will also increase dramatically. Wireless PDA use will more than triple in the next three years. Unlike PCs, these wireless devices require no boot sequence, so people can use them as soon as they turn them on-making them attractive for quick-hit applications.

Figure 11:
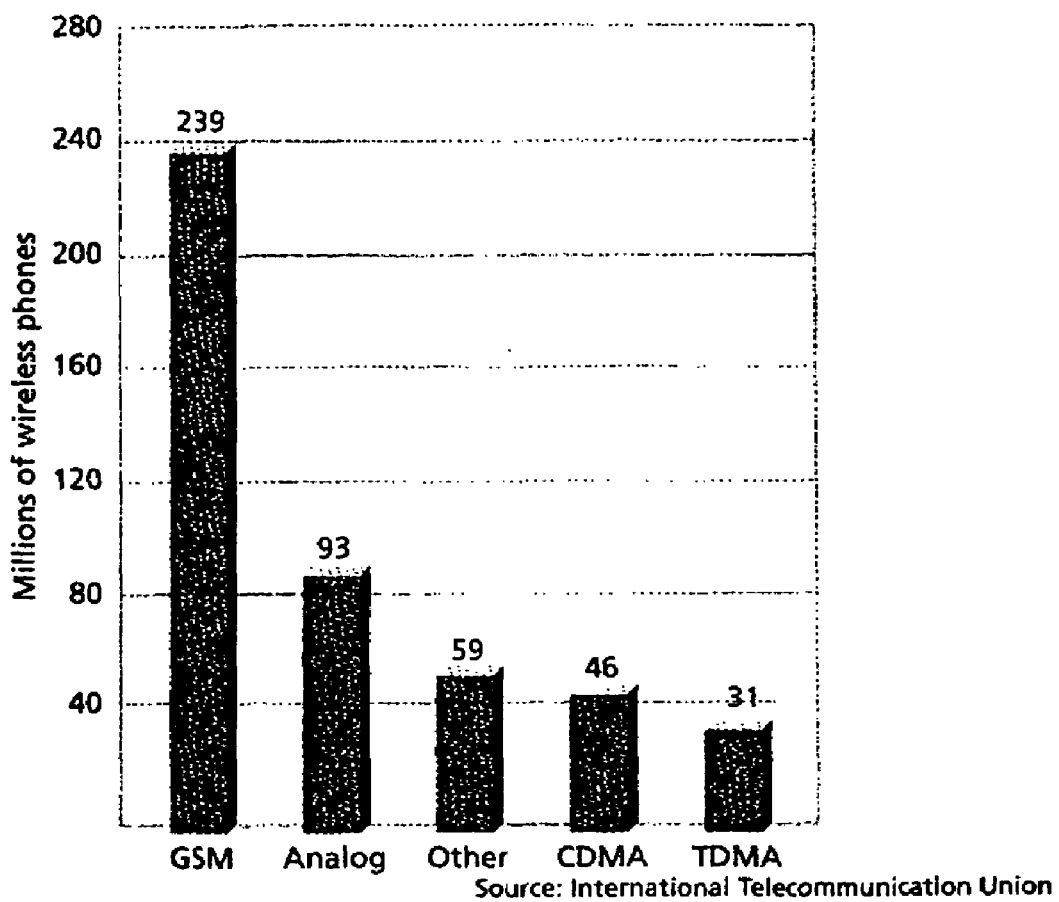
FIG. 11 shows that mobile network carriers have relied on a variety of incompatible wireless access standards.

Just as the transmission control protocol/Internet protocol and the general purpose browser were principal drivers of Internet growth, letting disparate devices interconnect and communicate, similar factors will simplify the interconnectivity and communication of heterogeneous wireless devices. As FIG. 11 shows, mobile network carriers have relied on a variety of incompatible wireless access standards. Recently, however, a common communications technology and uniform interface standard for presenting and delivering wireless services on mobile devices-wireless application protocol (WAP)-have emerged.

WAP specifications include a microbrowser; scripting similar to JavaScript; access functions; and layered communication specifications for sessions, transport, and security. These specifications enable interface-independent and interoperable applications. Most wireless handset and device manufacturers, as well as several service and infrastructure providers, have adopted the WAP standard.

Current access technologies, including TDMA (time division multiple access), CDMA (code division multiple access), and GSM (Global System for Mobile Communication), transmit at 9.6 to 19.2 Kbps. These speeds are dramatically slower than the dial-up rates of desktop PCs connecting to the Internet. Although m-commerce is possible at these bandwidth rates, the slow speeds are not conducive to creating widespread business or consumer participation.

3G (third-generation) wireless technology will also be available. In addition to having greater bandwidth rates, with speeds up to 2 Mbps, 3G will support multimedia transmission. Integrating voice, data, and one- or two-way video will let m-commerce run over any wireless device.

M-commerce applications fall into three main categories: transaction management, digital content delivery, and telemetry services. Users will increasingly initiate a wide range of business transactions from mobile devices. Online shopping sites tailored to mobile phones and PDAs including browsing, selection, purchase, payment, and delivery-have already emerged. These sites include all the necessary shopping features, such as online catalogs, shopping carts, and back office functions. Online booksellers are among the firms that have already implemented wireless shopping transactions. Another class of m-commerce transactions involves using wireless devices to initiate and pay for purchases and services in real time. These kinds of transactions will likely increase as users gain the capability-and become comfortable enough-to manage them. The highest m-commerce transaction volume will probably occur in micro transactions. When individuals reach for their e-cash-equipped mobile phones or PDAs-rather than coins-to settle transactions such as subway fees, widespread use of digital cash will be a reality.

Digital content delivery uses the wireless channel's distribution characteristics. These m-commerce activities include information browsing-instant retrieval of status information (weather, transit schedules, sports scores, ticket availability, and market prices)-and directory services. The CNN Wireless news subscription service and the UPS PDA-linked package tracking and locator service are representative of emerging content delivery services.

Digital products easily transport to and from wireless devices. Hence, downloading entertainment products-for example, MP3 music-is likely to become even more commonplace when 3G arrives. Transferring software, high resolution images, and full-motion advertising messages will also become common activities. The emergence of high-quality display screens and greater bandwidth will undoubtedly trigger the development of innovative video applications. Individuals will use wireless devices to access, retrieve, store, and display high-resolution video content for entertainment, product demonstration, and distance learning.

The transmission and receipt of status, sensing, and measurement information-telemetry services-form the basis for a wide range of new applications involving mobile devices. Innovations in this area let people use wireless phones and appliances to communicate with various devices from their homes, offices, or in the field. For instance, delivery drivers will "ping" intelligent dispensing machines or store computers to determine where their rolling inventory is needed most or which locations need immediate service. Similarly, users will transmit messages to activate remote recording devices or service systems.

Active m-commerce applications function only when someone directly initiates them by transmitting payment details, requesting information, receiving specific content, or retrieving status information. In contrast, passive applications occur without the user taking any action-for example, the automatic collection of toll charges with dedicated cash cards. Integrating digital cash into mobile devices would make these cash cards unnecessary. These wireless devices would facilitate and record payment of toll, mass-transit, fast-food, and other transactions without the user authorizing or entering identification information for each individual transaction. Users could arrange to have their cash chips update automatically by directing the wireless device to contact their money source and download additional digital cash whenever necessary.

Popular in Europe, short messages text messages, up to 160 characters in length, that show up on the recipient's display as they arrive-are examples of passive content delivery. As digital convergence becomes more commonplace, all forms of mail will passively go to wireless devices, including digitized voice mail, fax documents, and e-mail. Passive security, intrusion, and emergency telemetry services will refine the monitoring of facilities and individuals. Any unusual event or unacceptable condition will trigger user notification, regardless of location. Airlines are testing technology that will let them alert passengers, especially frequent fliers, to seat upgrades, schedule changes, and so on, through wireless devices. Some airlines already have prototype telemetry systems that transmit this kind of information to passengers as soon as they enter the airport or pass near a kiosk-like device.

Passive m-commerce telemetry is the foundation of still another form of interactive marketing. Stores will be able to market their products and services by transmitting promotional coupons and messages to passers by: "Come in and enjoy a complimentary cup of our new coffee blend," or "Get half off, if you make your purchase within the next 30 minutes." This type of marketing may give rise to a new challenge: managing m-junk messages without turning off your wireless device.

The technology to facilitate m-commerce is within reach, even as barriers to its development fall away. Applications and wireless devices promise to evolve together, each driving the introduction of innovative and powerful features in the other. The opportunity and challenge is for business to develop strategies that capitalize on the strengths of mobile commerce, thereby helping it to compete in an increasingly digital marketplace. The greatest challenge to structuring such a strategy may be creating the innovations that will meet the needs and expectations of consumers and commercial participants. Additional details regarding the above may be found in James A. Senn, The Emergence of M-Commerce, IEEE COMPUTER (December 2000), incorporated herein by reference and all references cited there incorporated herein by reference.

In accordance with one embodiment of the invention, the process begins as all tickets are checked in, for example, as the patrons enter the reserved seating area, such as a stadium or theater, through, for example, bar code readers, scanners, infrared readers, and/or manually or other method where the patron is checked in, either at the gate, seat or other location. For example, patrons can optionally check in a predetermined time before the event through a wireless device, Internet connection, manual or voice recognition telephone, or other manner. The important point is to provide a standard manner for allowing patrons to check in, and if the patron fails to check in using a predetermined procedure, to allow that seat to be provided to another willing patron in accordance with a process to be described below. The patron may check in either a predetermined time before or after the event begins. Currently, such a process is impossible and unthinkable in view of the difficulty reserved seating events have in simply getting the patrons seated prior to the beginning of the event. The present invention represents a revolutionary process to enhance event enjoyment, earn patron loyalty and optionally provide additional revenues to the theater/stadium or optionally other patrons with the desirable ticket.

The check in procedure continues for a predetermined period of time until a predetermined time period has expired, for example, 5 minutes before the event begins, 10 minutes after the event begins, after a predetermined event, such as the second act of a play, and the like. Once the predetermined time period or event has been completed, the check in procedure may be considered completed to begin the seat re-allocation process. To begin the seat re-allocation process, a re-allocation algorithm is used to re-assign seat for patrons that are willing or interested in different or better seats. Such re-allocation processes or algorithms may include a random process, a process where priority patrons are given priority for re-assignment of seat, a process where patrons are willing to pay additional for the re-assignment to either the theater or the individual patron whose seat is being provided to another patron, frequent event patrons, season ticket patrons, or other predetermined process.

If the patron that is identified by the re-allocation process is determined to be present in the theater, for example, via mobile telephone, wireless device, and/or manual verification, an optional sub-process determines whether the patron's optional profile is also satisfied with the available seating. If the optional subscriber profile is not satisfied, then the re-allocation process searches for another possible patron. If the optional profile sub-process is satisfied, then the eligible patron is notified via one or means, such as announcement, manually, wireless device, mobile telephone, bulletin board, and/or other means. The patron is then notified and presented with the option of moving for free, use of award points, additional money to the theater and/or patron to whose seat is being provided, or other predetermined criteria to obtain the seat. Optionally, a bidding process may be initiated that allows various patrons to bid against one another. Any standard bidding process may optionally be used. The patron, of course has the option to decline, and if so, the process continues and returns to the re-allocation process to attempt to locate another possible patron.

If the patron accepts, payment of money or other means may be effectuated on the spot via the wireless device, credit card, debit card, points, and the like, and the patron may now move to the other seat. The patron's seat may then optionally be made available as an empty seat to the re-allocation process. If a predetermined period of time has not expired, then the re-allocation process may be run again to optionally continuously re-allocate seats. The patron may optionally store the up-graded ticket on a wireless device for proof of entrance to the better seating area. Optionally, the seat and/or row and/or section, includes a separate reader device to receive optionally the original ticket that is now re-allocated to a better seat, or a new ticket that may optionally be received by the patron via the wireless device and/or manually via a worker in the theater or stadium.

In accordance with one observation of the present invention, mobile device and computer users increasingly face the management of many computing devices. One reason is the expansion of computing environments in the home and office, as printers, scanners, digital cameras, and other peripherals are integrated into networked environments. Another reason is the proliferation of mobile devices such as laptop and palm-sized computers, cellular phones, and pagers. Because these devices trade functionality for suitable form factors and low power consumption, they are necessarily "peripheral-poor" and must therefore establish connections to neighboring devices for storage, faxing, high-speed network access, and printing. It is easy to become frustrated when dealing with the configuration and interaction of such a multitude of devices. Service discovery technologies were developed to reduce this frustration and to simplify the use of mobile devices in a network by allowing them to be "discovered," configured, and used by other devices with a minimum of manual effort. Although most of these "service discovery suites" promise similar functionality—namely, reduced configuration hassles, improved device cooperation, and automated discovery of required services—they come at the problem from different philosophical and technical approaches. Since none of these technologies is a superset of the others and none is mature enough to dominate the market, interoperation among them will require bridging mechanisms. Five competing technologies are described that may be used in conjunction with the present invention, however, other technologies may also or alternatively be used.

Bluetooth is a low-power, short-range, wireless radio system being developed by the Bluetooth Special Interest Group, and industry consortium whose member companies include Ericsson, Nokia, and IBM. The radio has a range of 10 meters and provides up to seven 1-megabit-per-second links to other Bluetooth devices. Bluetooth operates in the 2.4-GHz industrial scientific and medical (ISM) band to maximize international acceptance and employs a frequency-hopping system to minimize interference. The low-level communications are detailed in the Bluetooth specification.

Bluetooth has a small form factor; complete systems can be as small as 2-cm square. The technology supports both isochronous and asynchronous services. A simple isochronous application might link a cellular phone and wireless headset, where the headset and base are both Bluetooth devices. More complicated applications include automatic discovery of wireless network connections and automatic synchronization of data between several Bluetooth devices.

Figure 12:
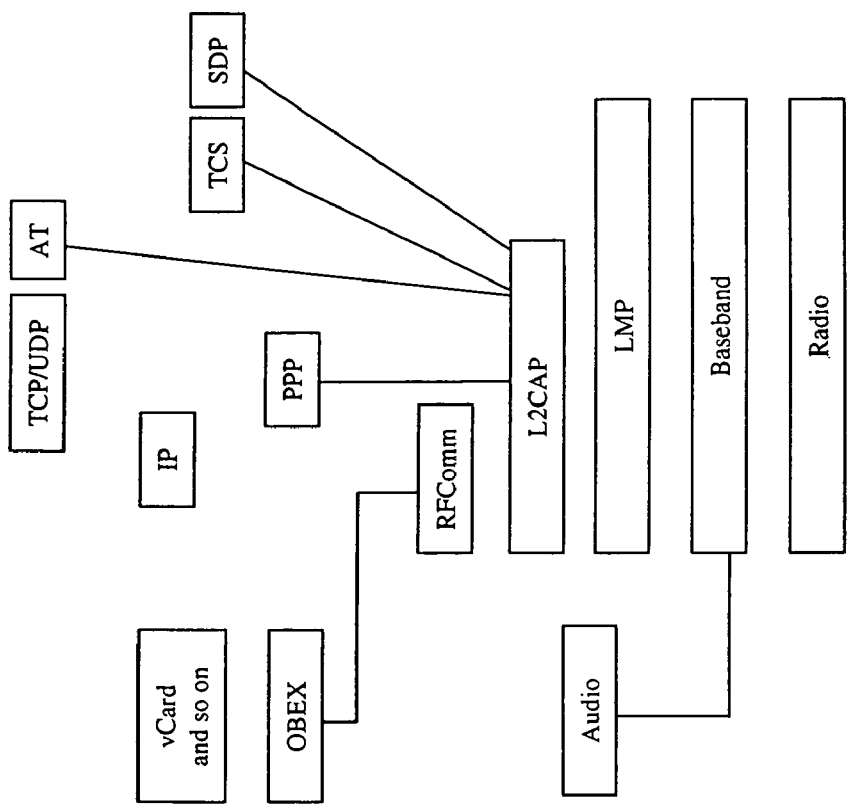
FIG. 12 shows the standard Bluetooth protocol stack.

FIG. 12 shows the Bluetooth protocol stack. At the bottom, the radio and baseband layers provide the short-range, frequency-hopping radio platform. The link manager protocol (LMP) handles data link setup and provides authentication and encryption services. The logical link control and adaptation protocol (L2CAP) supports multiplexed connectionless and connection-oriented communication over the LMP layer. L2CAP is proprietary, but other network protocols, such as IP, can be built on top of it. L2CAP is also used by higher level protocols. For example, FIG. 12 shows links to the Hayes-compatible AT (ATtention) protocol, which provides a standard interface for controlling remote cellular phones and modems; RFComm, which emulates an RS-232 serial interface; a simple object exchange protocol (OBEX), which enhances Bluetooth's interoperability with IrDA; and Bluetooth's service discovery protocol (SDP).

Groups of up to eight Bluetooth devices can form ad hoc networks called piconets to communicate, share services, and synchronize data. In each piconet, a master device coordinates the other Bluetooth devices (including setting the 1,600-hops-per-second frequency-hopping pattern). Individual devices can participate in more than one piconet at a time and can be in one of several states:

Standby—the device is conserving power and waiting to connect to another Bluetooth device.

Inquire—the device is searching for nearby Bluetooth devices.

Page—the device is connecting to another Bluetooth device.

Connected—the device is connected to another Bluetooth device.

Hold and park—the device is participating in a piconet with varying degrees of power savings.

The Bluetooth SDP provides a simple API for enumerating the devices in range and browsing available services. It also supports stop rules that limit the duration of searches or the number of devices returned. Client applications use the API to search for available services either by service classes, which uniquely identify types of devices (such as printers or storage devices), or by matching attributes (such as a model number or supported protocol). Attributes that describe the services offered by a Bluetooth device are stored as a service record and are maintained by the device's SDP server.

The distinction between service classes and descriptive attributes is not well defined, but service classes generally define broad device categories, such as Printer, ColorPrinter, and PostScriptPrinter, while attributes allow a finer level of description. Manufacturers must eventually standardize these service classes for maximal interoperability between Bluetooth devices.

Unlike higher level service discovery technologies such as Jini, Bluetooth's SDP does not provide a mechanism for using discovered services—specific actions required to use a service must be provided by a higher level protocol. However, it does define a standard attribute ProtocolDescriptorList, which enumerates appropriate protocols for communicating with a service.

Bluetooth devices provide data security through unique 48-bit identifiers, 128-bit authentication keys, and 8- to 128-bit encryption keys. Strong authentication is possible because no international restrictions prevent it, but Bluetooth devices must negotiate encryption strength to comply with laws restricting encryption. Note that Bluetooth devices must be paired to provide them with matching secret keys that will support authentication. Once paired, Bluetooth devices can authenticate each other and protect sensitive data from snooping. Regardless of encryption strength, Bluetooth's fast frequency-hopping scheme makes snooping difficult.

Jini is a service discovery and advertisement system that relies on mobile code and leverages the platform independence of the Java language. The current Jini implementation is based on TCP and UDP, but implementations based on other network protocols are certainly possible. The major requirements are reliable, stream-oriented communication and a multicast facility. Jini's language-centric approach allows a flexible definition of service; for example, a service can be implemented entirely in software and, after discovery, can be downloaded and executed entirely on the client. Examples of such algorithmic services might include an implementation of a proprietary algorithm for shading a polygon or formatting a document to meet an organizational standard. On the other hand, Jini also requires each device either to run a Java virtual machine or to associate itself with a device that can execute a JVM on its behalf. For example, a Jini "device chassis" might Jini-enable a number of "dumb" devices, making their services available to Jini clients.

Figure 13:
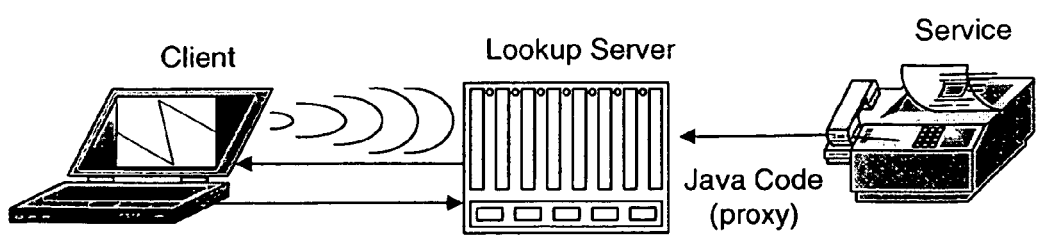
FIG. 13 illustrates the standard discovery and registration process for Jini clients and services.

Jini entities consist of services, look up servers that catalog available services, and clients that require services. A service can also be a client; for example, a telescope might provide pictures to a PDA as a service and look for printing services as a client. All service advertisements and requests go through a lookup server. FIG. 13 illustrates the discovery and registration process for Jini clients and services.

To register service availability or to discover services, a service or client must first locate one or more lookup servers by using a multicast request protocol. This request protocol terminates with the invocation of a unicast discovery protocol, which clients and services use to communicate with a specific lookup server. The unicast protocol culminates in the transfer of an instance of the ServiceRegistfar class, a "remote control" for the lookup server. A lookup server can use the multi-cast announcement protocol to announce its presence on the network. When a lookup server invokes this protocol, clients and services that have registered interest in receiving announcements of now lookup services are notified.

These three protocols are encapsulated in a set of Jini classes. For example, to find lookup services, a client or service need only create an instance of LookupDiscovery.

Jini uses Java's remote method invocation (RMI) facility for all interactions between either a client or a service and the lookup server). Once a lookup server has been discovered and an instance of ServiceRegistrar is available, services can register their availability, and clients can search for needed services by involving ServiceRegistrar methods.

Jini associates a proxy, or remote control object, with each service instance. A service advertises its availability by registering its object in one or more lookup servers via the register( ) method. This method takes several arguments, including an instance of Serviceitem, which contains a universally unique identifier for the service, its attribute set, and its remote control object. This object may either implement the service entirely (in the case of an algorithmic service such as the implementation of a polygon-shading algorithm), or provide methods for accessing the service over the network. The lease duration parameter of register( ) specifies the service's intended lifetime. The service is responsible for renewing the lease within the time specified to maintain its listing. The lookup server is free to adjust the lease time, which is returned in a ServiceRegistration object.

When a service first contacts a lookup server, the server generates a unique identifier for it; the service uses this ID in all future registrations. The service identifier lets clients request a specific service explicitly and recognize when services reported by different lookup servers are identical.

To use a service, a device must first secure an instance of the proxy object for it. From a client point of view, the location of the service proxied by this remote control object is unimportant, because the object encapsulates the location of the service and the protocol necessary to operate it.

Clients use the lookup( ) method in ServiceRegistrar to discover services. This method takes a single argument, an instance of ServiceTemplate. The ServiceTemplate constructor takes several arguments. The first is the service identifier. If the service identifier is null, then arrays of types (Java classes, typically interfaces) and attributes (attribute objects) are used to match services. A service matches if its class matches of the classes in the types array and if, for each of the attribute objects, and all non-null members match one of the service's registered attributes. The return value from lookup( ) is an instance of ServiceMatches, which contains an array of remote control objects for the services that match. Finally, the notify( ) method allows a client to request an asynchronous notification when services matching a ServiceTemplate instance become available. This method uses Jini's distributed events mechanism, which extends Java's infrastructure for eventing across JVMs.

Jini depends on Java's security model, which provides tools like digital certificates, encryptionm and control over mobile code activities such as opening and accepting socket connections, reading and writing to specific files, and using native methods Systems administrators can establish different policies depending on where the Java code originated (for example, the local file system or a remote machine).

Salutation is an architecture for service discovery under development by the Salutation Consortium, which includes members from both industry and academia. The consortium's goal is to build a royalty-free architecture for service advertisement and discovery that is independent of a particular network transport.

Figure 14:
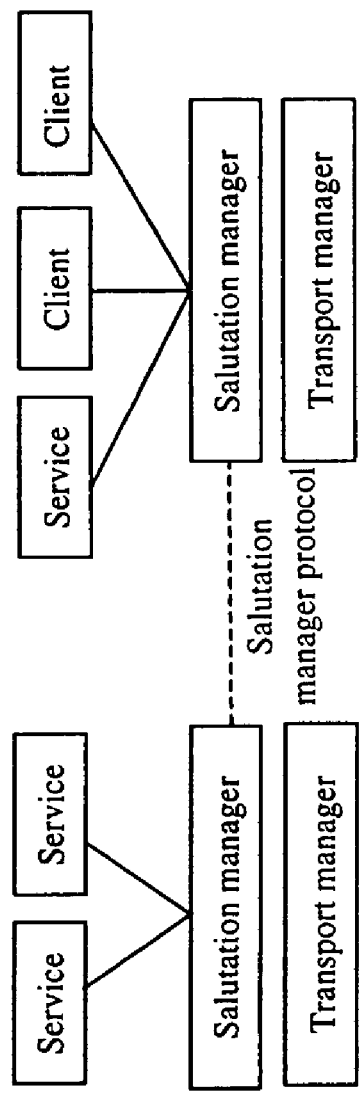
FIG. 14 shows the three fundamental components in the Salutation architecture: functional units, salutation managers, and transport managers.

FIG. 14 shows the three fundamental components in the Salutation architecture: functional units, salutation managers, and transport managers. From a client's point of view, a functional unit defines a service. Functional units already specified or under consideration by the Salutation Consortium include printing, faxing, and document storage. There is also work on a functional unit specification to allow discovery of Hewlett-Packard JetSend-enabled devices. The specifications define attributes that characterize a service (for example, in the case of a printer, double-sided capability, color, and so on).

The functional unit Doc Storage defines file attributes that can be used to find information in temporary or long-term storage. For, example, a client can search for operating system-specific drivers or software necessary to interact with a newly discovered device. The client simply queries a Salutation manager for the necessary Doc Storage functional unit, extracts the application or device driver and installs it, thus providing limited code mobility.

Salutation managers function as services brokers; they help clients find needed services and let services register their availability. Services and register and unregister functional units with the local Salutation manager by using the API calls slmRegisterCapabilities( ) and slmUnregisterCapabilities( ), respectively. A client can use the slmSearchCapability( ) call to determine if Salutation managers have registered specific functional units. Under the current version of the architecture, applications can query only the local Salutation manager. Future versions will allow remote Salutation managers to be specified. Once a functional unit is discovered, slmQueryCapability( ) can be used to verify that a functional unit has certain capabilities. The API also includes calls for initialization/version checking, availability checking, and communication between clients and services. (An API simulator is available at http://www.salutation.org/simulate.htm.)

Salutation managers fill a role similar to lookup servers in Jini, but they can also manage the connections between clients and services. A Salutation manager can operate in one of the three "personalities":

In native personality, Salutation managers are used only for discovery. They establish a connection between a client and service but perform no further operations on the data stream.

The emulated personality is similar to the native the connection, but in the case they transfer native data packets encapsulated in Salutation manager protocol format, providing a bridge when no common message protocol exists between client and service. The Salutation manager is ignorant of the semantic content of the data stream between client and service.

In Salutation personality, Salutation managers establish the connection between client and service and they also mandate the specific format of the data transferred. The Salutation architecture defines the data formats.

A transport manager isolates the implementation of the Salutation manager from particular transport-layer protocols and thereby gives Salutation network transport independence. To support a new network transport requires a new transport manager to be written, but does not require modifications to the Salutation manager. Like Jini (and UPnP), Salutation requires a network transport protocol that supports reliable, stream-oriented communication. Initial implementations are based on IP and IrDA because of their widespread use.

Transport managers also locate the Salutation managers on their respective network segments via either multicast, static configuration, or reference to a centralized directory. Discovery of other Salutation managers allows a particular Salutation managers to determine which functional units have been registered and to allow clients access to these remote services. Communication between Salutation managers is based on remote procedure call (RPC). This interaction between remote Salutation managers contrasts with other registry-based service discovery mechanisms (for example, Jini and Service Location Protocol), where clients would be responsible for locating remote registries. The Salutation specification currently does not address security issues.

A lightweight version of Salutation, called Salutation-Lite, has been developed for resource-limited devices. It is based primarily on IrDA to leverage the large number of infrared-capable devices. Salutation-Lite focuses primarily on service discovery. It uses the functional units OpEnvironment and Display to describe the operating system, processor class, amount of memory and display characteristics of palm-sized devices. By noting the particular characteristics of the device, servers can provide appropriate drivers and software wirelessly. Salutation-Lite implementations can be down-loaded free from the Salutation website at http://www.salutation.org.

UPnP is a proposed architecture for service advertisement and discovery supported by the UPnP Forum, headed by Microsoft. Unlike Jini, which depends on mobile code, UPnP aims to standardize the protocols used by devices to communicate, using XML. The UPnP specifications is still in an preliminary stage; major issues like security have not yet been addressed.

UPnP's device model is hierarchical. In a compound device (for example, a VCR/TV combo), the root device is discoverable, and a client (called a control point) can address the individual subdevices (for example, a tuner) independently. Virtual Web servers in the device act as entry points for interacting with and controlling it. Devices that don't speak UPnP directly are called bridge devices. They can be integrated into a UPnP network in a manner similar to the integration in a Jini device chassis: A bridge maps between UPnP and device-native protocols.

The UPnP specification described device addressing, service advertisement and discovery, device control, eventing, and presentation. The eventing facility allows clients to watch for significant changes in the state of a discovered service. It functions similarly to Jini's distributed event facility. Presentation allows a client to obtain a GUI for a discovered device's virtual Web servers. Several protocols support these functions:

AutoIP, a simple protocol that allows devices to dynamically claim IP addresses in the absence of a DHCP server;

Simple service discovery protocol (SSDP), the UPnP mechanism for service discovery and advertisement;

Simple object access protocol (SOAP), a protocol for remote procedure calls based on XML and HTTP that is used for device control after discovery; and Generic Event Notification Architecture (GENA), a UPnP subscription-based event notification service based on HTTP.

When devices are introduced into a network, they multicast "alive" messages to control points. When they wish to cancel availability of their services, they send "byebye" messages. In SSDP, each service has three associated IDs—service type, service name, and location—which are multicast when services are advertised. Any of these IDs can also be used to search for services.

Figure 15:
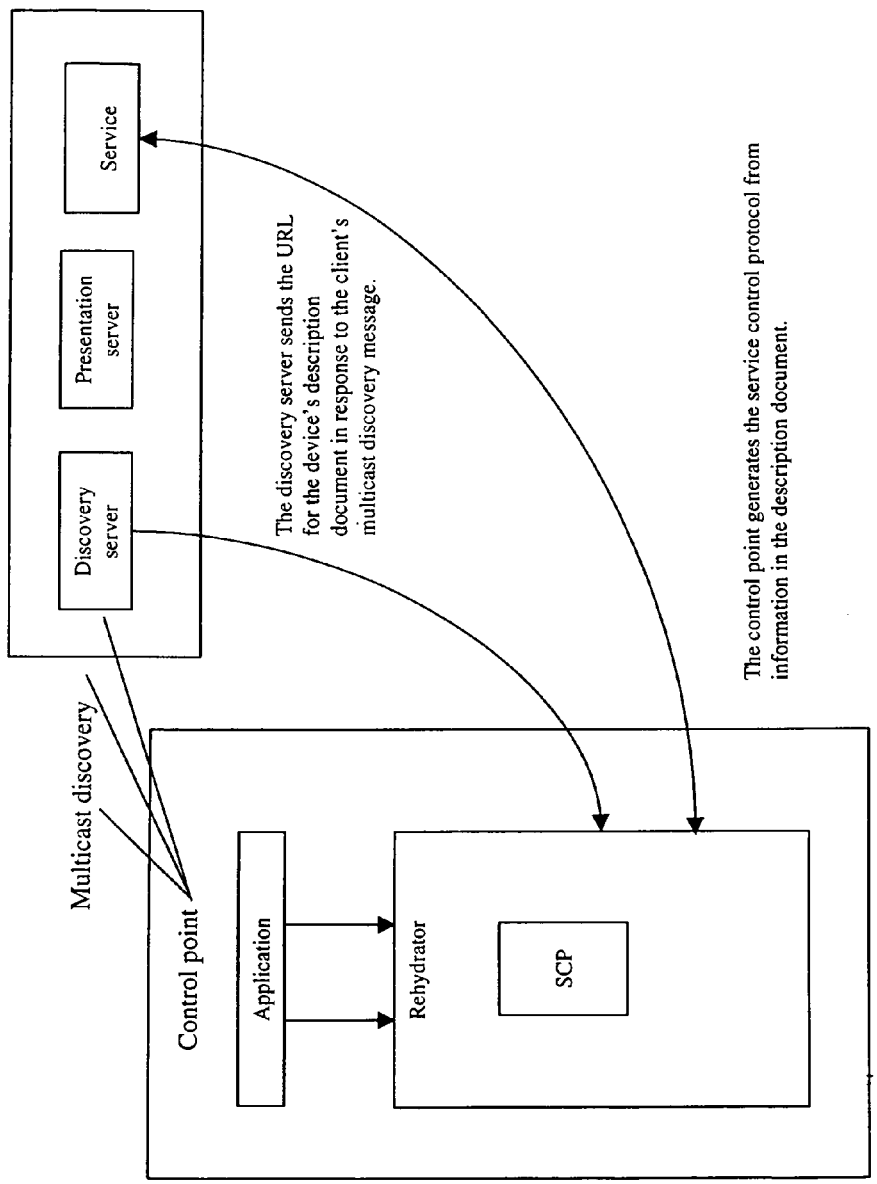
FIG. 15 is an illustration of a control point sending a multicast request to a network.

To search, a control point sends a UPD multicast request to the network, as shown in FIG. 15. Matching services send unicast responses to the client. These responses contain URLs, each pointing to a XML description document that describes a service. A description document contains several important items:

A presentation URL allows entry to a device's root page, which provides a GUI for device control.

A control URL is the entry point to the device's control server, which accepts device-specific commands to control the device.

An event subscription URL can be used by clients to subscribe to the device's event service. The client provides an event sink URL in the subscription request. Significant state changes in the device result in a notification to the client's event sink URL.

A service control protocol definition describes the protocol for interacting with the device.

The service control protocol (SCP) definition allows APIs to be converted to device-specific commands, shielding the application level from details of particular devices. After retrieving the description document, a UPnP component on the control point called the rehydrator is "plumbed" with a definition of the device's SCP. This component then sends device-specific commands via the device's control URL. SOAP is used for this interaction.

SSDP is similar to the Internet Engineering Task Force's service location protocol, but it lacks a query facility that can search for services by attributes. Further, SLP incorporates security measures and can interact with the IETF standards-track dynamic host configuration protocol (DHCP) and the lightweight directory protocol (LDAP). Finally, SSDP specifications currently limit discovery to a single subnet. Since UPnP does not use a registry, it is also likely to generate significantly more network traffic than SLP.

Figure 16:
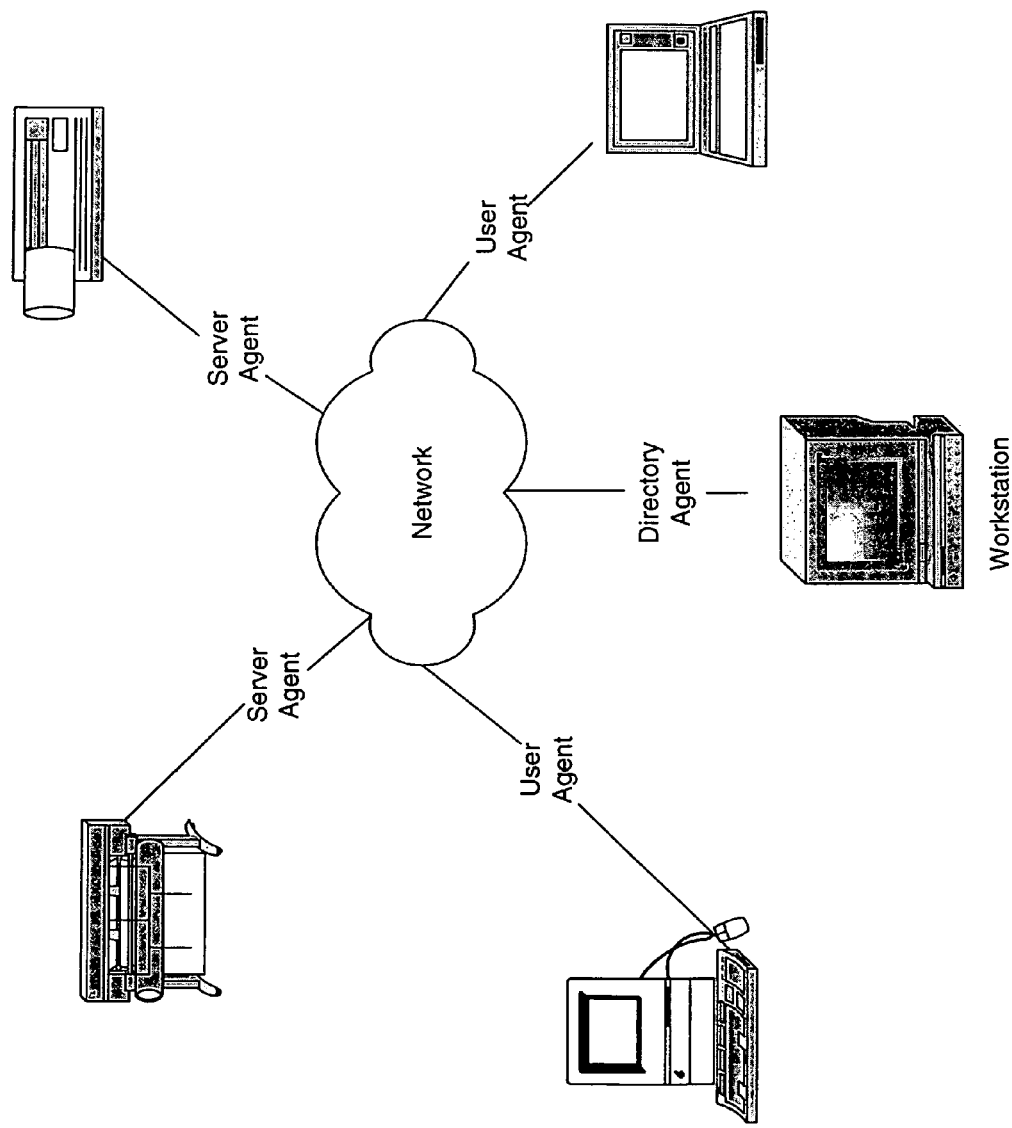
FIG. 16 is an illustration of a service location protocol (SLP) which is an IETF protocol for service discovery and advertisement.

Service location protocol (SLP) is an IETF protocol for service discovery and advertisement as illustrated in FIG. 16. It is currently at the "proposed standard" stage along the IETF standards track. Unlike Jini, Salutation, and UPnP, which all aspire to some degree of transport-level independence, SLP is designed solely for IP-based networks. It provides a set of C and Java bindings that provide service discovery and advertisement functions to application software.

SLP comprises three entities: service agents (SAs), user agents (UAs), and directory agents (DAs). SAs advertise the location and attributes of available services, while UAs discover the location and attributes of services needed by client software. UAs can discover services by issuing a directory-like query to the network. DAs cache information about available services. Unlike Jini, SLP can operate without directory servers. The presence of one or more DAs can substantially improve performance, however, by reducing the number of multicast messages and the amount of network bandwidth used. In fact, if DHCP is used to configure SLP agents with the location of DAs, then multicast is completely unnecessary. SLP also interoperates with LDAP, so services registered with an SLP DA can be automatically registered in an LDAP directory. This eliminates the need to reconfigure clients that already discover services using LDAP.

SLP has several mechanisms for discovering DAs:

In passive discovery, SAs and UAs listen for multicast announcements for DAs, which periodically repeat these advertisements.

In active discovery, SAs and UAs multicast SLP requests or use DHCP to discover DAs. When a DA is present, SAs and UAs use unicast communication to, respectively, register their services and find appropriate services.

In the absence of DAs, UAs multicast requests for service and receive unicast responses directly from the SAs that control matching services. This tends to increase bandwidth consumption, but provides a simpler model, appropriate for small networks (such as a home LAN).

SLP services are advertised through a service URL, which contains all information necessary to contact a service. Clients use the service URL to connect to the service. The protocol used between the client and server is outside the scope of the SLP specification. This separation is similar to Bluetooth, where the SDP does not specifically address how devices will communicate.

Service templates define an attribute set for each service type (a printer, for example). The attributes include a specification of the attribute types and information about default and allowed values; they are used to differentiate between services of the same type and to communicate configuration information to UAs.

SLP does not define the protocols for communication between clients and services, and so its security model concentrates on preventing the malicious propagation of false information about service locations. SAs can include digital signatures when registering so DAs and UAs can verify their identity. Digital signatures can also be required when DAs advertise their availability, allowing UAs and SAs to avoid rouge DAs (that is, those without a proper signature). As with Jini, setting up the security features of SLP requires some configuration effort, but the effort can be well worth it, particularly in open environments.

For service discovery to become pervasive, either a single service discovery technology must dominate or the most commonly used technologies must be made interoperable. Currently, bridging seems to be the most promising prospect for interoperability.

Implementations of certain low-level functions of service discovery (such as discovering registries) are interchangeable. For example, the Salutation Consortium uses SLP for service discovery beyond the local subnet. This lets the Salutation manager search for SLP DAs, and then use SLP to register functional units and search for requested services.

A Jini-SLP bridge has also been developed, which allows services lacking a JVM to participate in Jini system. The heart of the Jini-SLP bridge is a special SLP UA that registers the availability of "Jini-capable" SLP SAs. To do this, Jini-capable SLP services advertise the availability of a Jini driver factory. The UA discovers all SAs with driver factories and registers them with one or more Jini registered SAs, it downloads the driver factory from the lookup server and uses it to instantiate a Java object to drive the service. Note that the SLP SAs are not required to host a Java virtual machine—the Java code installed on the SAs is static. Similar schemes are possible for the other technologies; for example, it should be possible to Jini-enable UPnP services in this way.

Each service discovery technology has advantages and disadvantages. Currently, interoperability efforts are perhaps the most important force in service discovery, since it is very unlikely that device manufacturers will embrace multiple service discovery technologies on low-cost devices. Additional details regarding the above may be found in Golden G. Richard III, Service Advertisement and Discover, IEEE Internet Computing (September-October 2000), incorporated herein by reference and all references cited there incorporated herein by reference. Additional detail is provided herewith regarding Bluetooth protocol. The Bluetooth specifications define a radio frequency (RF) wireless communication interface and the associated set of communication protocols and usage profiles.

The link speed, communication range, and transmit power level for Bluetooth were chosen to support low-cost, power-efficient, single-chip implementations of the current technology. In fact, Bluetooth is the first attempt at making a single-chip radio that can operate in the 2.4-GHz ISM (industrial, scientific, and medical) RF band. While most early Bluetooth solutions are dual chip, vendors have recently announced single-chip versions as well. The Bluetooth specification consists of two parts: core and profiles.

Figure 17:
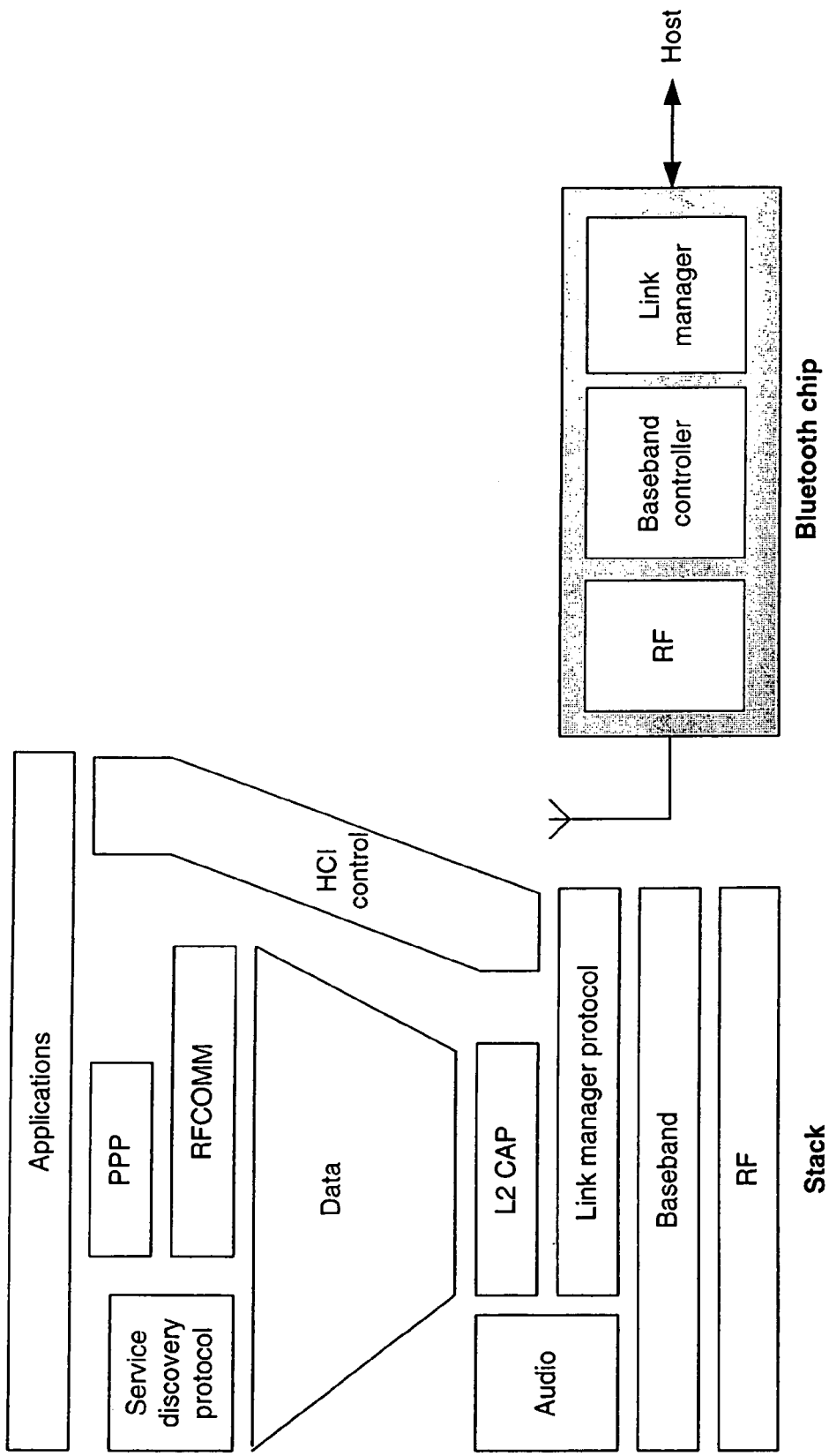
FIG. 17 is an illustration of the Bluetooth stack differing from the classical seven-layer networking model.

The core specification defines all layers of the Bluetooth protocol stack. As shown in FIG. 17, the Bluetooth stack differs from the classical seven-layer networking model in some ways. These differences are primarily to support ad hoc connectivity among participating nodes, while conserving power and accommodating devices that lack resources to support all layers of the classical networking stack.

The radio is the lowest layer. Its interface specification defines the characteristics of the radio front end, frequency bands, channel arrangements, permissible transmit power levels, and receiver sensitivity level. The next layer is the baseband, which carries out Bluetooth's physical (PITY) and media access control (MAC) processing. This includes tasks such as device discovery, link formation, and synchronous and asynchronous communication with peers. Bluetooth peers must exchange several control messages for the purpose of configuring and managing the baseband connections. These message definitions are part of the link manager protocol (LMP). The functional entity responsible for carrying out the processing associated with LMP is called the link manager.

Bluetooth is unique in offering the front-end RF processing integrated with the baseband module. On-chip integration lowers the cost of the network interface, and the small size makes it easy to embed Bluetooth chips in devices such as cell phones and PDAs. A Bluetooth chip can be connected to its host processor using USB, UART, or PC-card interfaces.

The Host Controller Interface (HCI) specification defines a standard interface-independent method of communicating with the Bluetooth chip. The software stack on the host processor communicates with the Bluetooth hardware using HCI commands. Since no hardware-specific knowledge is needed, the Bluetooth stack software can easily be ported from one Bluetooth chip to another. The HCI layer is part of the Bluetooth stack, but it does not constitute a peer-to-peer communication layer since the HCI command and response messages do not flow over the air link.

The logical link control and adaptation protocol (L2CAP) specification can be viewed as Bluetooth's link layer. Usually, L2CAP and layers above it are implemented in software. L2CAP delivers packets received from higher layers to the other end of the link. Bluetooth devices can establish an L2CAP connection as soon as they are in range of each other. A client device then needs to discover the services provided by the server device. The service discovery protocol (SDP) defines the means by which the client device can discover services as well as their attributes. The SDP design has been optimized for Bluetooth. It defines only the discovery mechanisms; the methods for accessing those services are outside its scope.

The RFCOMM specification defines a method of emulating the RS-232 cable connection on top of the Bluetooth airlink. RFCOMM supports legacy applications that use the COM port to communicate with the peer host. For example, point-to-point (PPP) protocols expect a serial line interface from the lower layer. Since PPP provides a packet-oriented interface to the higher layers, all packet-based network and transport protocols, including TCP/IP, can be supported on top of PPP. More efficient methods of running IP over Bluetooth are currently under development.

Vendors can use the services offered by the Bluetooth stack to create a variety of applications. Because interoperability is crucial to Bluetooth's operation, the Bluetooth SIG has defined profile specifications to support it. The profiles specify controller and stack parameter settings as well as the features and procedures required for interworking among Bluetooth devices. All vendor implementations of these profiles are expected to be interoperable. The Bluetooth certification authority uses the profiles to test and certify compliance, and grants use of the Bluetooth logo only to products that conform to the methods and procedures defined in the profiles.

The 2.4-GHz ISM band in which Bluetooth operates is globally available for license-free use. Europe and the United States allocate 83.5 MHz to this band, but Spain, France, and Japan allocate less. To accommodate these differences, 79 channels spaced 1 MHz apart are defined for Europe and the U.S., and 23 RF channels spaced 1 MHz apart are defined for Spain, France, and Japan. Efforts are under way to open up the full width of the spectrum in Spain and France, as well as in Japan so that Bluetooth devices would function worldwide.

Bluetooth is a frequency-hopping spread-spectrum system. This means that the radio hops through the full spectrum of 79 or 23 RF channels using a pseudorandom hopping sequence. The hopping rate of 1,600 hops per second provides good immunity against other sources of interference in the 2.4-GHz band. The link speed is 1 Mbps, which is easily achieved using a simple modulation technique (Gaussian Frequency Shift Keying, or GFSK). A more complex modulation technique could achieve a higher rate, but GFSK keeps the radio design simple and low cost.

The radio front end is usually the most costly part of a wireless network interface. In typical radio receivers, the RF filters, oscillators, and image-reject mixers process input signals at high frequencies. Such circuits require expensive materials. To keep costs down, Bluetooth recommends shifting the input signal to a lower intermediate frequency (IF, around 3 MHz), which allows on-chip construction of low-power filters using CMOS material. Shifting to low IF, however, creates new problems, such as reduced receiver sensitivity. Recommended receiver sensitivity for Bluetooth is −70 dBm or better. The comparable number for IEEE 802.11 Wireless LANs is about −90 dBm). Thus, for the same transmit power, the range for Bluetooth is shorter than it is for 802.11 WLAN.

A set of Bluetooth devices sharing a common channel is called a piconet. A piconet is a star-shaped configuration in which the device at the center performs the role of master and all other devices operate as slaves. Up to seven slaves can be active and served simultaneously by the master. If the master needs to communicate with more than seven devices, it can do so by first instructing active slave devices to switch to low-power park mode and then inviting other parked slaves to become active in the piconet. This juggling act can be repeated, which allows a master to serve a large number of slaves.

Most envisioned Bluetooth applications involve local communication among small groups of devices. A piconet configuration consisting of two, three, or up to eight devices is ideally suited to meet the communication needs of such applications. When many groups of devices need to be active simultaneously, each group can form a separate piconet. The slave nodes in each piconet stay synchronized with the master clock and hop according to a channel-hopping sequence that is a function of the master's node address. Since channel-hopping sequences are pseudorandom, the probability of collision among piconets is small. Piconets with overlapping coverage can coexist and operate independently. Nonetheless, when the degree of overlap is high, the performance of each piconet starts to degrade.

In some usage scenarios, however, devices in different piconets may need to communicate with each other. Bluetooth defines a structure called scatternet to facilitate interpiconet communication. A scatternet is formed by interconnecting multiple piconets. As shown on the right side of FIG. 17, the connections are formed by bridge nodes, which are members of two or more piconets. A bridge node participates in each member piconet on a time-sharing basis. After staying in a piconet for some time, the bridge can turn to another piconet by switching to its hopping sequence. By cycling through all member piconets, the bridge node can send and receive packets in each piconet and also forward packets from one piconet to another.

A bridge node can be a slave in both piconets or be a slave in one and a master in another. For example, consider a room full of people, where each person has a cell phone and a cordless headset. When users speak into their headsets, only the cell phones paired with their headsets should pick up the signal. In this example, each headset and cell phone pair constitutes a separate piconet. Now suppose these users also want to send text messages from their cell phones to one another. This will be possible only if all piconets are interconnected to form a large scatternet.

Bluetooth uses a procedure known as inquiry for discovering other devices; it uses paging to subsequently establish connections with them. Both inquiry and paging are asymmetric procedures. In other words, they involve the inquirer and the inquired (as well as the pager or the paged) devices to perform different actions. This implies that when two nodes set up a connection, each needs to start from a different initial state; otherwise, they would never discover each other. The profile specifications play an important role here, defining the required initial state for each device in all usage scenarios. A symmetric procedure for establishing connections is an ongoing topic of research.

The inquiry and paging are conceptually simple operations, but the frequency-hopping nature of the physical layer makes the low-level details quite complex. Two nodes cannot exchange messages until they agree to a common channel-hopping sequence as well as the correct phase within the chosen sequence. Bluetooth solves this problem simply by mandating the use of a specific inquiry-hopping sequence known to all devices. During inquiry, both nodes (one is the listener and the other is the sender) hop using the same sequence; but the sender hops faster than the listener, transmitting a signal on each channel and listening between transmissions for an answer. When more than one listener is present, their replies may collide. To avoid the collision, listeners defer their replies until expiration of a random backoff timer. Eventually the sender device collects some basic information from the listeners, such as the device address and the clock offsets. This information is subsequently used to page the selected listener device.

The communication steps during the paging procedure are similar, except that the paging message is unicast to a selected listener, so the listener need not back off before replying. The sender also has a better estimate of the listener's clock, which enables it to communicate with the listener almost instantaneously. Upon receiving an ACK for the paging message, the sender becomes the master and the listener becomes the slave of the newly formed piconet, and both nodes switch to the piconet's channel-hopping sequence. Later, if necessary, the master and slave roles can be swapped.

The steps for admitting a new slave into an existing piconet are slightly more complex. The master can either start discovering new nodes in its neighborhood and invite them to join the piconet or, instead, wait in scan (listen) state and be discovered by other nodes. With both options, communication in the original piconet must be suspended for the duration of the inquiry and paging process. The latency of admitting a new node into the piconet can be large if the master does not switch to the inquiry or scan modes frequently. This latency can be reduced only at the cost of some piconet capacity. The study of this trade-off is another topic of ongoing research.

Bluetooth offers different low-power modes for improving battery life. Piconets are formed on demand when communication among devices is ready to take place. At all other times, devices can be either turned off or programmed to wake up periodically to send or receive inquiry messages. When a piconet is active, the slaves stay powered on to communicate with the master. It is possible to switch a slave into a low-power mode whereby it sleeps most of the time and wakes up only periodically.

Three types of low-power modes have been defined:

Hold mode is used when a device should be put to sleep for a specified length of time. As described earlier, the master can put all its slaves in the hold mode to suspend activity in the current piconet while it searches for new members and invites them to join.

Sniff mode is used to put a slave in a low-duty cycle mode, whereby it wakes up periodically to communicate with the master.

Park mode is similar to the sniff mode, but it is used to stay synchronized with the master without being an active member of the piconet. The park mode enables the master to admit more than seven slaves in its piconet.

As soon as a piconet is formed, communication between the master and the slave nodes can begin. The piconet channel is divided into 625-microsecond intervals, called slots, where a different hop frequency is used for each slot. The channel is shared between the master and the slave nodes using a frequency-hop/time-division-duplex (FH/TDD) scheme whereby master-slave and slavemaster communications take turns. Slave-to-slave communication is not supported at the piconet layer. If two slaves need to communicate peer to peer, they can either form a separate piconet or use a higher layer protocol, such as IP over PPP, to relay the messages via the master. At a 1-Mbps link speed, a 625 microsecond slot time is equivalent to the transmission time of 625 bits. However, a single slot packet size in Bluetooth is only 366 bits. This reserves enough guard time to let the frequency synthesizers hop to the next channel frequency and stabilize. Discounting space for the headers leaves 30 bytes for the user payload.

To transmit real-time voice, an application must reserve a slot in both directions at regular intervals. In Bluetooth terminology, this is called a synchronous (SCO) link. An SCO link can transport telephone-grade voice. The speech coder generates 10 bytes every 1.25 milliseconds. Since a baseband packet can carry up to 30 bytes in each slot, only one slot in each direction is needed every 3.75 ms (or every sixth slot). The packet type that carries 30 voice bytes is called an HV3 packet. This packet is transmitted without coding or protection, and is not retransmitted if it is lost.

To cope with bit errors when the channel conditions are not perfect, some forward error correction (FEC) should be added to the voice payload. An HV2 packet carries 20 bytes of voice plus 10 bytes of redundant data (⅔ FEC code). Since 20 bytes of speech is generated in 2.5 ms, the SCO link should reserve one slot in each direction every 2.5 ms (or every fourth slot). To cope with extreme channel conditions, the baseband specification also defines an HV1 packet that carries only 10 bytes of speech and 20 bytes of FEC code. An HV 1 SCO link uses up the entire channel capacity. This means that all data transfer sessions will be suspended when an HV 1 SCO connection is in progress. Data communication between a master-slave pair involves a different set of considerations. For example, the data payload must be protected by a cyclic redundancy check (CRC) so that the receiver can determine whether the received bits are in error. When losses occur, the baseband layer should retransmit the data. Furthermore, to make efficient use of the piconet channel, slots should be allocated on demand, instead of being reserved for the usage duration. A data path between a master-slave pair meeting all of these requirements is called an asynchronous data link (ACL). SCO links have priority over data, so ACLs can claim only unused slots. Only a single ACL can exist between a master and a slave.

The master is responsible for distributing available slots among all ACLs. This scheme has two advantages:

the master can ensure that the slave transmissions do not collide; and the slots can be allocated to satisfy the quality of service (QoS) requirement of each ACL. The master can grant more bandwidth to a slave by polling it more frequently or by changing the packet size.

The baseband specification does not mandate the use of any specific slot-allocation scheme. Chip vendors can choose any policy that fits their target applications. As with SCO packets, the payload size of singleslot ACL packets is limited to 30 bytes. After discounting space for the higher layer headers and the CRC, only 27 bytes are left to transport application data. When FEC is added, the available space goes down to 17 bytes. To improve channel efficiency, the baseband specification has defined multislot packets, which are three or five slots long and transmitted in consecutive slots. The transmitter stays fixed on a hop frequency during the length of packet transmission and skips over the missed hops after the transmission is complete. This reduces the effective channel-hopping rate, but increases the channel efficiency because of fewer hops. Although link speed is 1 Mbps, achievable aggregate throughput can range from 217.6 Kbps to 780.8 Kbps. The presence of an HV3 or HV2 SCO link significantly reduces the achievable through-put of an ACL.

Figure 18:
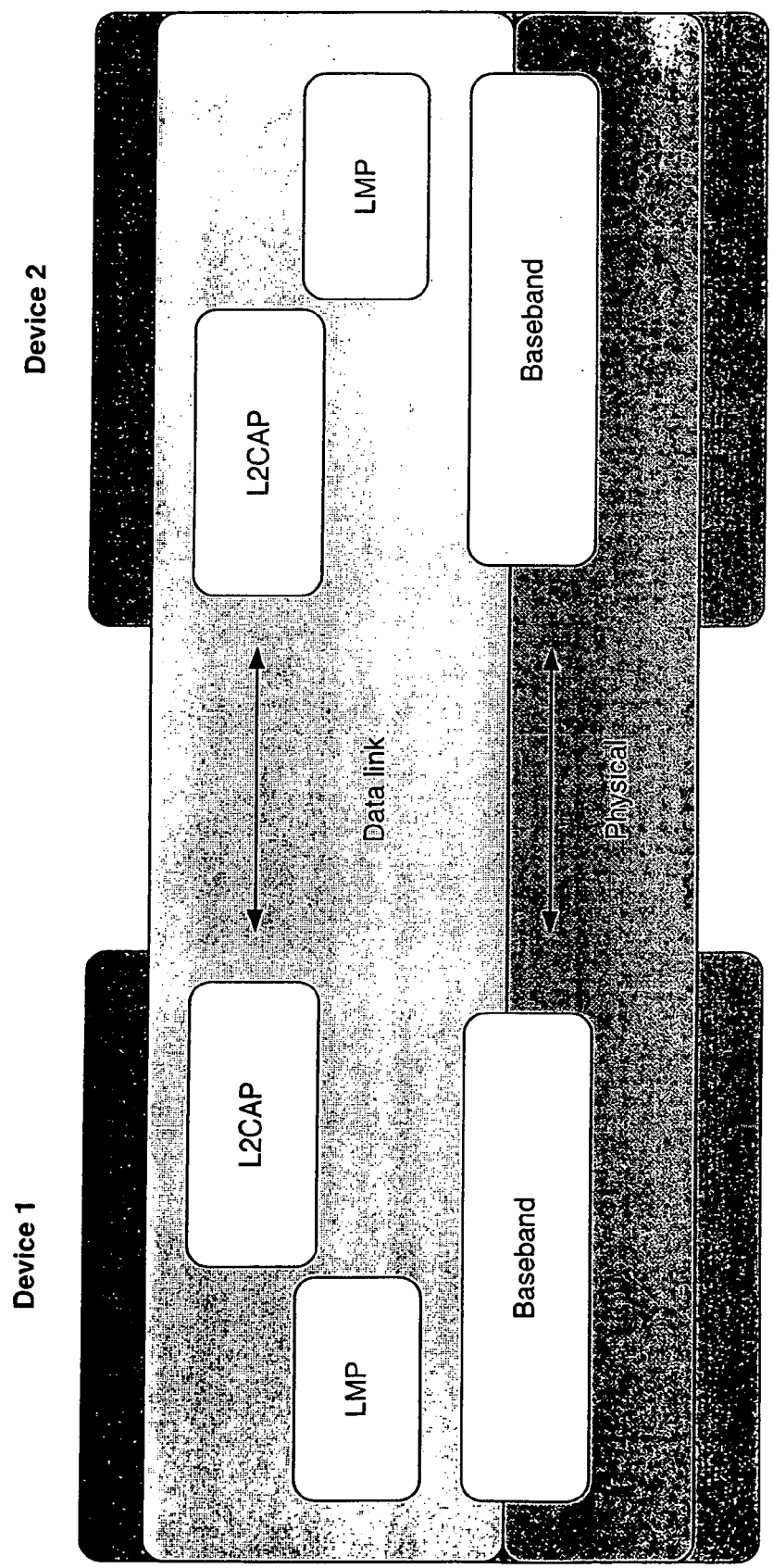
FIG. 18 is an illustration viewing standard L2CAP as the data plane of the Bluetooth link layer.

L2CAP can be viewed as the data plane of the Bluetooth link layer (see FIG. 18). Because the baseband packet size is too small for transporting higher layer packets, a thin layer is needed for exporting a bigger packet size to the higher layers. While a number of generic segmentation and reassembly protocols could be used or adapted for use over ACLs, the Bluetooth SIG instead defined L2CAP, which is highly optimized to work in conjunction with the baseband layer. For example, L2CAP does not support integrity checks because the baseband packets are already CRC protected. Likewise, it is assumed that the lower layer delivers packets both reliably and in sequence. These two assumptions significantly simplify the design of segmentation and reassembly logic. The only caveat is that L2CAP will not work if used over any media other than the Bluetooth baseband.

The multiplexing and demultiplexing of higher layer protocols is supported using channels, multiple instances of which can be created between any two L2CAP endpoints. Each higher layer protocol or data stream is carried in a different channel. The L2CAP channels are connection oriented in the sense that they require an explicit phase to establish the channel, during which both ends choose a local name (channel identifier) and communicate it to the other end. Subsequently, each packet sent over the channel is tagged with the channel identifier, which-within the context of the receiver-uniquely identifies the source as well as the protocol being transported over the channel. The L2CAP specification also defines a connectionless channel for supporting broadcast and multicast group communication, but this feature is not yet fully developed.

Both ends of a Bluetooth link must support compatible sets of protocols and applications to successfully exchange data. In some cases it may also be necessary to configure protocol and stack parameter settings before applications can be started. Such configuration settings cannot be chosen statically, since some parameters may require adjustment to match the features and services supported by the peer Bluetooth device.

Bluetooth's SDP provides a standard means for a Bluetooth device to query and discover services supported by a peer Bluetooth device. SDP is a client-server protocol. The server maintains a list junction with the baseband layer. For example, of service records, which describe the characteristics of services hosted at the server. By issuing SDP queries, a client can browse all available service records maintained at the server or retrieve specific attribute values from a service record.

In addition to defining query and response protocol formats, the SDP specification also defines a standard method for describing service attributes. Service attributes are represented using an <identifier, value> pair. The 1.1 Bluetooth specification defines some of the commonly used services, but developers have the freedom to define new subclasses of the standard services or to create new services on their own.

Since new service definitions do not require any coordination with the Bluetooth SIG numbering authority, it is necessary to ensure that two independently created service definitions do not conflict. Collisions are avoided by associating each service definition with a universally unique identifier (QUID) which is generated once at the time a service is defined. UUIDs of the services defined by the Bluetooth SIG are included in the assigned numbers document.

If the client already knows the QUID of the service it is looking for, it can query the SDP server for specific service attributes. Alternatively, the client can browse the list of available services and select from the list. These are the only two search options supported in SDP. Although other IP-based service discovery protocols, such as SLP and Jini, provide richer service description schema and more powerful search capabilities, the Bluetooth SDP has two advantages:

The majority of version-1.1-compliant Bluetooth devices will be non-IP devices. Requiring them to support IP only for the sake of supporting SLP would be costly.
SDP is optimized to run over L2CAP. Its limited search capabilities and non-text-based attribute-id and attribute-value descriptions lend an efficient and small footprint implementation for small devices.

SDP provides a mechanism only for retrieving service information from other devices. Methods of invoking those services are outside the scope of SDP. Before a device can establish the L2CAP channel, the link manager must carry out a number of baseband-specific actions, such as piconet creation, master-slave role assignments, and link configuration. These functions belong to the control plane of the Bluetooth link layer and require the link manager to exchange LMP messages over the air link. Depending on the operating environment, the link manager must adjust a number of piconet and link-specific parameters. For example, the peer-link controller can be instructed to switch to a low-power mode, adjust its power level, increase the packet size, and change the requested QoS on an ACL.

Security can also be configured using LMP messages. Before a data or voice exchange can begin, Bluetooth devices should be able to authenticate each other. Likewise, transmission over the air link must be encrypted to provide protection from eavesdroppers. Both objectives are easy to achieve when a security association already exists between a pair of devices. The link manager can use the shared secret key to verify the peer device's authenticity as well as to negotiate a link key for encryption. A typical session between two Bluetooth devices begins with the formation of a piconet, followed by the exchange of LMP messages first to authenticate and then to negotiate new encryption keys with the peer device. Only upon successful completion of the LMP handshake can further data exchange or voice communication take place.

The level of security built into the version 1.1 specifications is satisfactory so long as the initial security associations are computed in a secure fashion. The baseband and LMP specifications also define a method, called pairing, for creating a new security association between two devices when they pair for the first time. The method uses an out-of-band channel for creating a security association, which is then used as a seed to compute a cryptographically secure shared secret key. By out-of-band channel a user typing a randomly chosen PIN number on both devices is meant. The security of a pairing phase is limited by a user's ability to choose good PIN numbers. In scenarios when one device in the pair does not have a keypad, security can be further compromised if the chosen PIN is transmitted to the other device in clear text.

The ultimate objective of the Bluetooth specifications is to allow multivendor applications to interoperate. Different applications may run on different devices, and each device may use a protocol stack from one vendor and a Bluetooth chip from another. Yet interoperability among applications is achieved when different implementations comply with the same core and profiles specifications. At the lowest layer, Bluetooth chips from different vendors interoperate over the air link because all Bluetooth chips implement the baseband and LMP specifications. Bluetooth stacks, which can be implemented as either firmware or software, include the L2CAP, SDP, and RFCOMM layers. It is relatively easy to port a Bluetooth stack from one platform to another because the lowest layer of a Bluetooth stack interfaces with a Bluetooth chip via a standard HCI interface which is also a part of the 1.1 specifications.

Porting a Bluetooth application from one stack to another, however, is more difficult. The application can use any standard API to access 1P, PPP OBEX, or RFCOMM layers of the Bluetooth stack, but there is no standard API to access the control functions provided by the Bluetooth stack. For example, if an application were to initiate a Bluetooth inquiry to discover other devices in its neighborhood, it must use an API specific to the stack vendor to access those functions. Additional details regarding the above may be found in Ron Schneiderman, Bluettoth's Slow Dawn, IEEE Spectrum (November 2000), incorporated herein by reference and all references cited there incorporated herein by reference.

Figure 19:
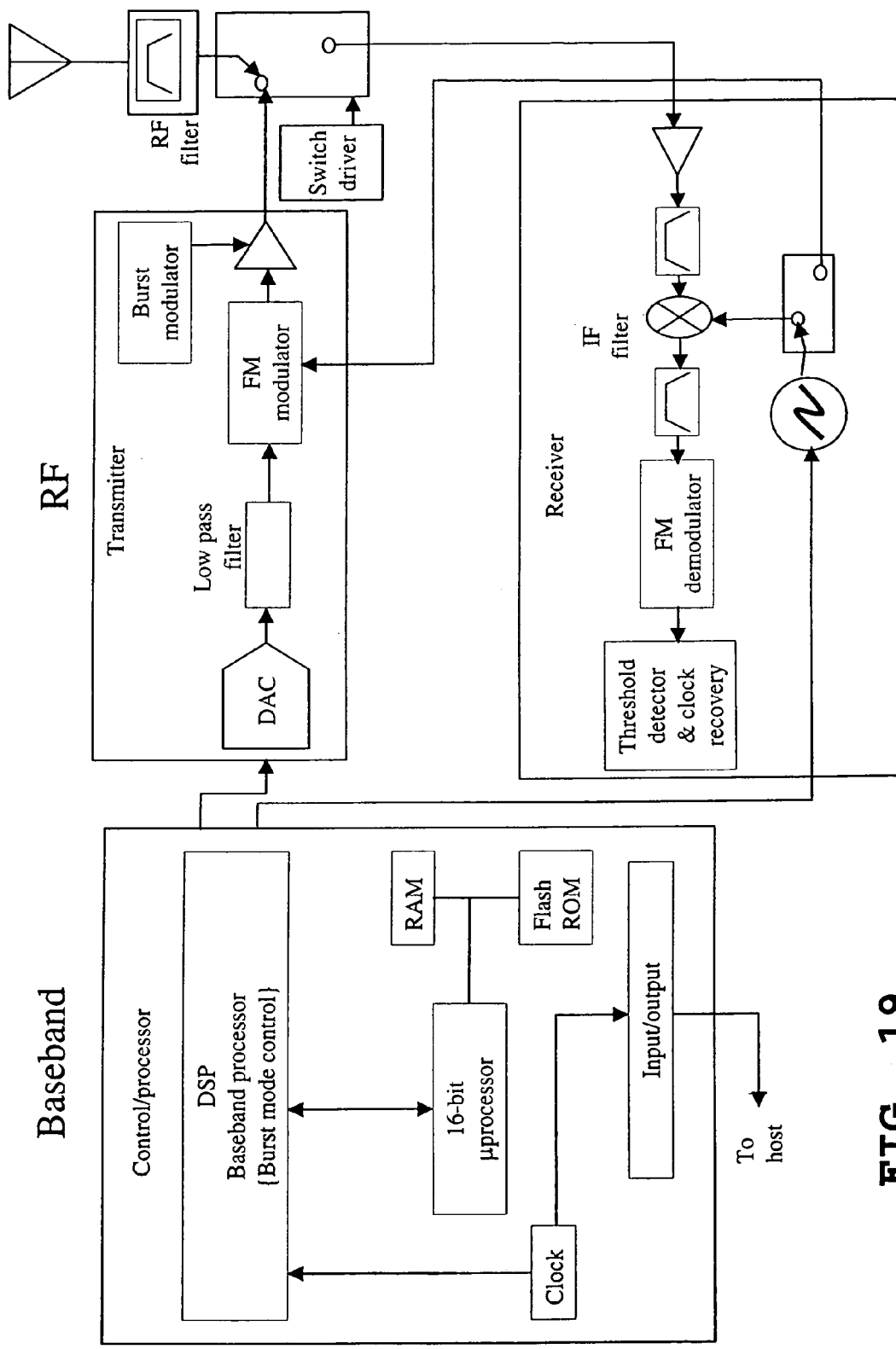
FIG. 19 is an illustration of a Bluetooth transmitter that upconverts the baseband information to the frequency-modulated carrier.

FIG. 19 is an illustration of a Bluetooth transmitter that upconverts the baseband information to the frequency-modulated carrier. Frequency hopping and bursting are performed at this level. Conversely, the Bluetooth receiver downconverts and demodulates the RF signal as illustrated in FIG. 19. The Bluetooth channels are each 1 MHz wide. Frequency hopping occurs over 79 channels.

Although originally thought of simply as a replacement for the unseemly nest of wires that connects PCs to keyboards and printers, Bluetooth quickly evolved into a system that will allow people to detect and communicate with each other through a variety of mainly portable devices without their users' intervention. Bluetooth-enabled devices will be able to "talk" to each other as they come into range, which is about 10 meters, although this figure can be extended to more than 100 meters by increasing the transmit power from a nominal 1 mW to as much as 100 mW.

With Bluetooth technology, you can send e-mail from the computer on your lap to the cellular phone in your briefcase. Your Bluetooth-linked cell phone or similarly equipped PDA can automatically synchronize with your desktop PC whenever you pass it within Bluetooth range. Or, you can have hands-free communications between a Bluetooth-enabled headset and a cell phone, or you can download images from a digital camera to a PC or cell phone.

Critical mass is critical to Bluetooth's success. Bluetooth technology is expected to make its debut in cell phones and PDAs, but then will move quickly into notebook and laptop computers, printers, scanners, digital cameras, household appliances, security/remote access, games, toys, and more. Ericsson, which started it all with the development of the Bluetooth concept, has already announced several Bluetooth products, including a headset, a PC Card for laptops and PDAs, and two Bluetooth cell phones. A Bluetooth keyboard and mouse are on the drawing board.

Nokia and Fujifilm are working on a mobile imaging technology they believe would enable Nokia to add a Bluetooth chip to its clamshell-shaped 9110 Communicator so that it could receive images taken on a Bluetooth-equipped Fujifilm digital camera. After the addition of a few lines of text, the received photographs can be sent to another Nokia Communicator, or to the Fujifilm Web service, where it can be viewed, printed, or burned into a CD-ROM. Finnish telecom operator Sonera has even demonstrated a Bluetooth-enabled vending machine-consumers buy products out of the machine by simply signaling an account code from a Bluetooth cell phone or PDA. The code would debit the user's account based on the code. Eventually, cell phones and PDAs are expected to be able to display personal bar codes, which can be read by a vending machine scanner.

The Gartner Group calls it the Supranet-the wireless connection of data and transactions between the hard-wire Internet, wireless devices such as cell phones and PDAs, and the "papernet," meaning the physical world of business cards and legal documents. Emerging seamless connections will deliver a whole host of new technologies, according to Gartner, with one of the first integral technologies to be tied to the Supranet being Bluetooth. By 2004, according to Gartner, 70 percent of new cell phones and 40 percent of the new PDAs will use wireless technology for direct access to Web content and enterprise networks. Gartner believes that Bluetooth is set to become a defining force in portable electronic products.

In what the Bluetooth community calls "unconscious" or "hidden" computing, Bluetooth-enabled products will automatically seek each other out and configure themselves into networks-most often, with just two nodes. Though small, such networks can be quite useful. They can forward e-mail received on a cellular phone in a person's pocket to the notebook or laptop computer in his or her briefcase; they can download data from a digital camera to a PC or cell phone; or they can alert their owners as they pass a Bluetooth-enabled vending machine. Bluetooth can serve as a means for connecting laptop computers or other devices to the public Internet in airport lounges and conference centers through permanent access points. It can also enable its user to exchange business cards with everyone passed on the street through a Bluetooth-enabled Palm-but not unless it has been given permission to identify the user to anyone or anything, which, according to a Merrill Lynch report on Bluetooth, "opens up whole new blind dating opportunities."

More than 2000 organizations have joined the Bluetooth Special Interest Group (SIG) and most of them are currently developing Bluetooth-enabled products under a specification developed by the group. The IEEE 802.15 Personal Area Network (PAN) Working Group, formed early last year, has made Bluetooth the foundation for a range of consumer network products, most of them portable. The PAN Working Group is currently developing a 1-Mb/s standard based on the work of the Bluetooth SIG, and hopes to define a "consumer-priced," 20-Mb/s or faster wireless personal area network that can be widely deployed for short-range information transfer.

The principal issue with Bluetooth is interoperability. Few of these products have met the Special Interest Group's requirements for interoperability or been tested under actual use conditions. One reason is that the qualification program was launched before conformance-test systems had been validated and were available. Not surprisingly, Bluetooth components are coming out later than expected and manufacturing capacity is limited. Another obstacle: Bluetooth products must be tested at a qualified test facility to ensure compliance with the Bluetooth specification. But no qualification test facilities are currently listed on the official Bluetooth Web site, as required by the Bluetooth consortium. True, some test equipment has been delivered with Bluetooth test features-Teradyne's MicroWAVE6000 instrumentation suite, for example. But no "official" or validated test hardware was available to manufacturers as of early October. Since interoperability is the be-all and end-all of Bluetooth, there is no point in coming out with a product until the spec is finalized or until some other means is in place for verifying that the item has a very good chance of working with other Bluetooth products when they become available.

Few of those involved are more frustrated than the Special Interest Group's Promoter Group. It was formed late last year by 3Com, Lucent Technologies, Microsoft, and Motorola, and joined by SIG's original founders-Ericsson, IBM, Intel, Nokia, and Toshiba. Its charter is to lead the Special Interest Group's development of Bluetooth technology and promote interoperability among members' products. Investments of resources have been huge-Microsoft Corp., Redmond, Wash., for example, reportedly has at least 60 people working on Bluetooth issues at least some of the time. To help speed Bluetooth products to market, the Interest Group has created what amounts to an interim qualification program with somewhat relaxed interoperability testing.

Tests of Bluetooth products and devices are now being done against designated protocol test products called Blue Units. These are based on development kits designed by the Cadence Symbionics Group, Cambridge, UK (part of Cadence Design Systems, San Jose, Calif.) and available through Symbionics and Sweden's Ericsson Microelectronics AB, AU System, and Sigma ComTec. The development kits comprise baseband and radio boards, interfaces (universal serial bus ports, phone jacks, and RS-232-C ports), host software, accessories, and documentation. They were created to enable first-time Bluetooth design engineers to accelerate the development of prototype products and devices.

But Blue Units do not carry the weight of full compliance with the Bluetooth spec; they are simply test beds to be used to establish confidence in key Bluetooth protocols. While they can test a number of key functions, their use is limited to partial testing of the baseband and link manager software. Blue Units cannot, for example, be used to test the logical link control and adaptation protocol, which adapts upper-layer protocols over the baseband; nor can it test the service discovery protocol, which Bluetooth units use to learn about the capabilities of other Bluetooth units.

The tests a product manufacturer has to pass to qualify a product for a Bluetooth trademark are divided into four areas:

Radio frequency qualification testing.
Protocol conformance testing.
Profile conformance testing.
Profile interoperability testing.

Protocols describe how Bluetooth-enabled devices perform such basic tasks as service discovery, telephony signaling, and link management. Profiles specify which basic protocols and procedures are required for specific categories of Bluetooth devices and applications, like cordless telephones, headsets and faxing. Profiles are the primary means for achieving interoperability among Bluetooth-enabled devices.

Currently available profiles cover cordless telephony, intercoms, serial ports, headsets, fax machines, local-area network access, file transfer, and dial-up networking. One group, chaired by Philips Semiconductor, Sunnyvale, Calif., expects to complete a written specification on three audio and three video applications by mid-2001. More than simply replacing cables for wireless speakers using Bluetooth technology, the group aspires to create applications that will make audio/video equipment interoperable with assorted consumer electronic products, as in moving data between a Bluetooth-enabled cell phone and a PC, or remotely changing channels and controlling the volume on television sets. Bluetooth accessories, such as PC Cards and USB dongles (security devices), are treated differently: they may be submitted for complete qualification testing only when they are installed in a host product.

Other working groups within the Special Interest Group are writing profiles for printing, imaging, location positioning, human interface devices, and personal area networks. Medical, automotive, and some other Bluetooth applications will require additional product certification. Naturally, qualification requirements are expected to evolve as test equipment and procedures become available. In the meantime, designers must pass a series of tests based on four test reference categories established by the Bluetooth consortium. The categories range from merely informative, through self-testing, to full testing by a certified test facility using a validated reference test system. Since no validated test systems are yet available, the Special Interest Group is for the time being waiving the most rigorous category for manufacturers who pass the less strict of the categories and who successfully test their products against a Blue Unit.

Even that may not do the trick, though. The Category A [most rigorous] test gives a certain level of confidence that you will be interoperable with other Bluetooth devices, said Cedric Paillard, product marketing manager of Conexant Systems Inc. "It doesn't guarantee that you will be interoperable in the real world." Conexant acquired Ontario-based Philsar Semiconductor earlier this year to help speed its entry into the Bluetooth chip market. At some point, when the necessary tools are in place, Bluetooth products will show that they are interoperable with what is called a "Golden Unit"—a SIG-designated unit that has passed all the required qualification and conformance tests.

Because Bluetooth is still in its early development stages, test methodologies differ from those typical of more highly developed technologies. A Bluetooth application note suggests that Bluetooth test procedures may require manual intervention or custom software control, as opposed to mature technologies in which easy-to-use, one-button measurements are available. Part of the problem is that it has taken a long time for test houses to develop equipment with Bluetooth features, so that many Bluetooth designers have been forced to create their own test sequences and methods based on Bluetooth specifications.

A Bluetooth Design-Guide is essentially an application layer that may be added to Agilent's Advanced Design System. It contains system test benches and reference designs, such as an optimal low-intermediate frequency (IF) receiver, for part of the RF portion of the Bluetooth physical layer. The Tektronix CMU200 universal radio communications tester is a multi-standard test set for mobile phones with Bluetooth test features. Teradyne has shipped its Micro-WAVE6000 instrumentation suite for testing Bluetooth radios and ICs to Ericsson, Oki, and Cambridge Silicon Radio, and has said it has several other customers lined up.

Qualification grants companies the worldwide right to incorporate Bluetooth wireless technology in their products, and to use the Bluetooth trademark; but even the trademark does not guarantee that a product complies fully with Bluetooth specifications. Passing the qualification program demonstrates a certain measure of compliance and interoperability, but as the Bluetooth SIG notes in its own literature-because products are not tested for every aspect of the Bluetooth specification, qualification does not guarantee compliance. In the final analysis, each manufacturer is responsible for ensuring that its products will intemperate with products from other Bluetooth manufacturers.

In accordance with one embodiment of the invention, an access Control and Session Management in the HTTP Environment is provided where a role-based access-control model is stored as LDAP objects in a security architecture. As the only ubiquitous public data network, the Internet offers business partners a communications channel that previously existed only in unique situations with private, special-purpose networks. Well-publicized security risks, however, have limited the deployment of business-to-business extranets, which typically use the Internet's public data network infrastructure. These risks extend behind firewalls to intranets, where any user gaining entry to a facility is often implicitly authenticated to access unprotected services by simply plugging a portable computer into an unused network port.

Role-based access controls (RBACs) and Web session management to protect against network security breaches in the HTTP environment is providede. The RBAC and session management services augment network-level security, such as firewalls, inherent in the deployment of any Web-based system with untrusted interfaces. The RBACs are implemented through the Internet Engineering Task Force's Lightweight Directory Access Protocol (for IETF documents relevant to LDAP and other Internet protocols. Session management is implemented through cryptographically secured, cookie-based ticket mechanisms.

Role-based access controls are not part of the typical Web server software set. The HTTP RFCs specify a "401:WWW-Authenticate" server response-essentially a logon challenge-for authentication and access control. The notion of a security realm applies: a typical security realm comprises a tree or subtree of URLs for a given server. Because each realm must map to unique URL prefixes, security realms are mutually exclusive. When a Web client requests a URL from a server, the server checks the URL against its list of realms for a prefix match. For each realm, there is a corresponding access control list (ACL) that specifies—either explicitly or through a set of rules-which users are allowed access to URLs in the realm, and which users are denied.

Secure realms are useful for gross access control to a Web site. But each realm requires authentication for access, so the user task of supplying a name and password quickly becomes burdensome. The need to differentiate user roles magnifies the problem: few businesses want to maintain distinct and largely redundant Web sites and content for each user role in their authorization base. An additional, more subtle problem arises with the need to dynamically generate content and control the visible link set (that is, those URLs that we know in advance a user is authorized to access, as in a search result). Given the issues of user complexity and Web site maintainability, secure realms are not feasible in the implementation of an RBAC security model. the approach described in this article shows how to address these issues by using network authentication services-such as LDAP, Sun Microsystems NIS, and Microsoft's NT domains-together with an RBAC model stored as LDAP objects and secured session ticket.

The problems of entity authentication, resource-access authorization, and session management are not unique to the HTTP environment. In custom client-server systems. sessions are explicitly maintained by persistent network connections and state information shared between client and server applications. the request-response-disconnect nature of HTTP precludes any shared, connection-oriented state between client and Web server, inso-far as that state is based on the protocol itself.

RFC 2109 describes a state management mechanism more generally known as a session ticket. RFCs 2068 and 2616 specify HTTP's basic authentication mechanism, which is simply a user-ID and password encoded in Base64 and included as part of the HTTP request headers. From a security viewpoint, Base64 is essentially cleartext. Unless transport layer security (TLS, RFC 2246) or secure sockets layer (SSL) encryption is used, this is not a secure method for authentication.

RFC 2595 recently proposed starting a TLS session to protect what would otherwise be cleartext password authentication for three Internet standard protocols. Following this proposal, a server would augment its advertised capability set to include a "start TLS" capability. A client would issue this start command, re-determine the server's capabilities, and then perform the authentication steps of the protocol with the transport layer encryption protecting the exchange. The message digest authentication proposed in RFC 2617 is a type of challenge-response authentication protocol that does not transmit any cleartext passwords.

Role-based access control provides a rich model for managing information and its accessors. Many other security models can be represented as subsets or simplifications of an RBAC model. A role-based access without hierarchical control is implemented where session termination is system-enforced instead of user-elected, and all users have a single role (both of these are constraints under $RBAC_2$). Furthermore, the notion of sessions is limited in the HTTP environment because of the single request-response nature of the protocol. $RBAC_0$ includes:

U, a set of users

R, a set of roles

P, a set of permissions

PA, a many-to-many permission-to-role assignment relation

UA, a many-to-many user-to-role assignment relation

S, a function mapping a session to a set of roles, possibly dynamically

This was the approach used to implement LDAP-based RBAC. The permissions are treated like uninterpreted symbols in the model definition. The symbol interpretation service is implemented either as an application-level service-access meditation function-which was the case with the insurance company implementation-or as an HTTP server-request intercepts filtering function-which was the case in subsequent implementations. (It may also be possible to implement RBAC, (role hierarchies) using the object class hierarchy that is part of the X.500 schema employed by LDAP directory servers.)

Figure 20:
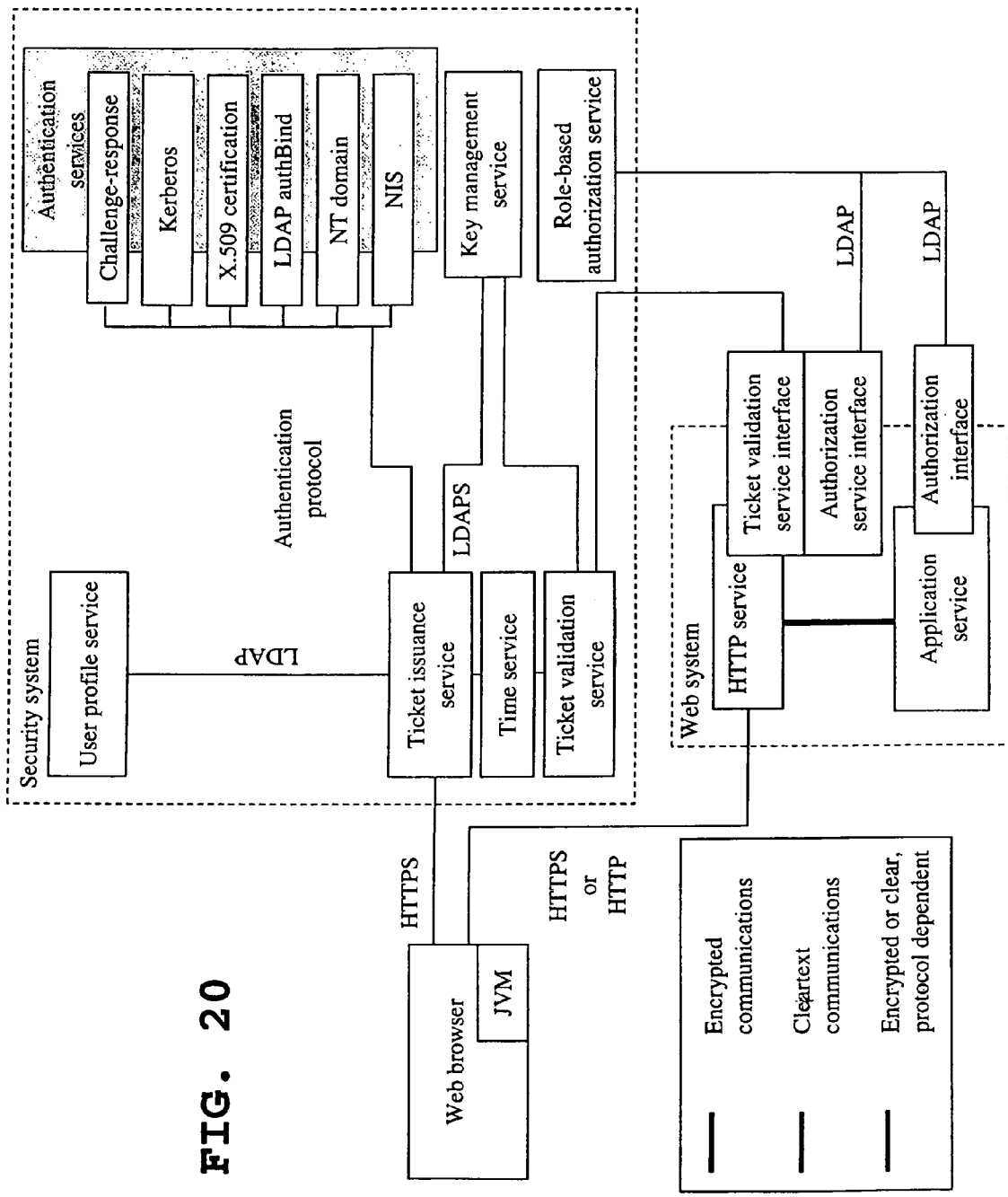
FIG. 20 illustrates one embodiment of the logical architecture for the security services, where authentication verifies a claimant's identity.

FIG. 20 illustrates one embodiment of the logical architecture for the security services. Other approaches are also possible. Authentication verifies a claimant's identity. The architecture in FIG. 20 shows authentication services as a configurable service element. In the fielded implementation, an LDAP bind operation with a simple password provided the back-end authentication service with parameters obtained from the user in an HTTP form submitted over TLS. FIG. 20 shows several other common authentication services that may already exist in an enterprise and could also be used. For a generic HTTP client, the authentication possibilities are limited to what can be accomplished with HTTP Basic Authentication or form submission. Form submission by the HTTP client causes the HTTP server to act as a proxy for the client in executing one of the authentication protocols. This implies that the client trusts the HTTP server in this proxy authentication role.

Session management services are shown in FIG. 20, and detailed below.

Time service. The session management services related to session duration and time-out require agreement on the time. Some authentication protocols also use time-varying sources, such as challenge-response types. The required precision of time measurement is usually on the order of a few minutes for session idle time-out. The network time protocol (RFC 1305) and simple network time protocol (RFC 2030) provide close synchronization of system clocks.

User profile service. This service provides user attributes, particularly security roles and distinguished names. Other information that may be useful in the applications or content-tailoring environment may he provided, such as given name, common name, application preferences, and so on.

Ticket issuance service. This service h rants a session ticket to an authenticated user. The session ticket stores information about the Web site user in a tamper- and spoof-proof format and utilizes session tune-out in the normally stateless HTTP environment (for session ticket specifications, see Bellovin[2]).

The session ticket based on HTTP cookies is the only standards-based. scalable method for maintaining state in the HTTP environment. The ticket can be represented either as a single cookie within which a number of values have been catenated or as a collection of distinct cookies. In our fielded implementation, a set of related session tickets was used. For implementation purposes, this collection is referred to as the session ticket (in other words, it is a set of related cookies).

The session ticket comprises a payload, consisting of several distinct variables and their values:

User_IP: the client IP address to which the session ticket was issued. This is used in session ticket validation to detect source spoofing. Note that firewalls should not be configured to hide or rental) the requestor address for this to he of use.

User_ID: the username or distinguished name (DN) that was correctly authenticated to the site.

Login_Expires: the session time-out and automatic logout function that Web browsers do not inherently support.

Login_Expires_Absolute: the stated absolute expiration time of a session, even if it has not expired due to idleness time-out.

Other attributes as required for the particular implementation.

Ticket_MAC: a digital signature or message authentication code (MAC) computed against the catenation of the session ticket values.

Figure 21:
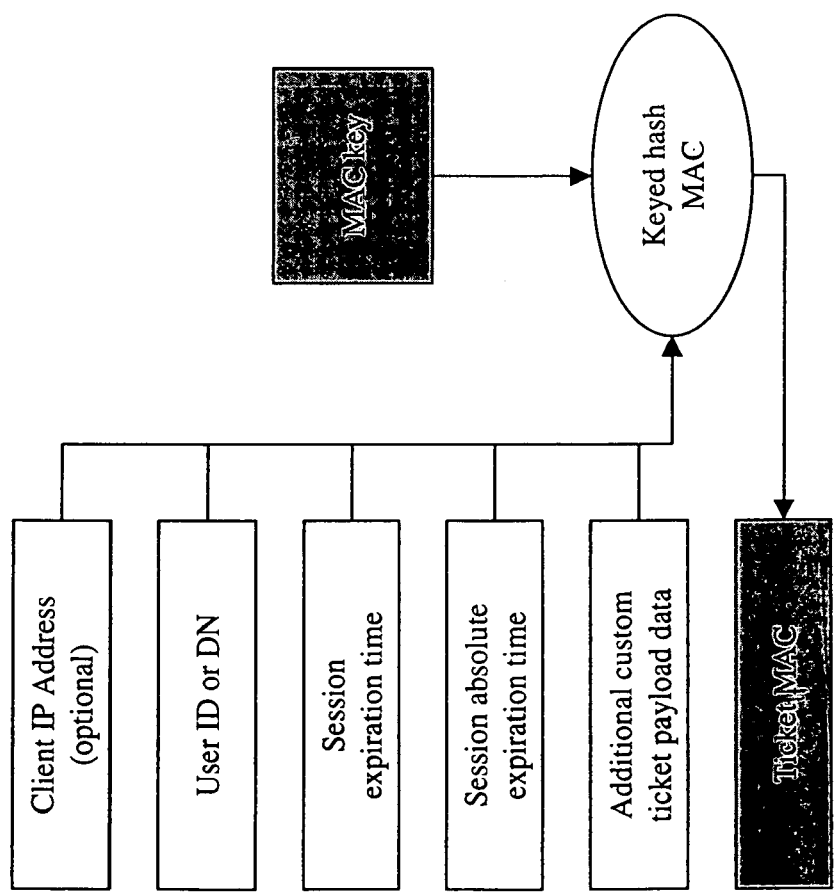
FIG. 21 is an illustration showing once the ticket arrives at the Web browser, it must be secured from tampering.

The server issues the session ticket after a successful authentication protocol execution, which in most cases transpires over an encrypted SSL connection between the Web client and the Web server. Once the ticket arrives at the Web browser, it must he secured from tampering, as shown in FIG. 21. A digital signature or Message Authentication Code (MAC) across the session ticket makes tampering detectable. If, for example, a user attempts to maliciously modify his role, the message represented by the session ticket will not be authentic.

The insurance company implementation used a hash-based MAC referred to as HMAC-SHA-1-160, as all 160 hits of the SHA-1 output are retained. Alternative implementations of the secured session ticket are possible using symmetric cookie encryption or public key methods for digital signature. This session ticket expiration time is determined by the earlier of the Login_Expires or Login_Expires_Absolute values in the secure session ticket. These values are determined at the time the session ticket is generated by adding the system configuration parameters of Session_Duration and Session_Duration_Absolute to the current time, obtained from the time service.

Figure 22:
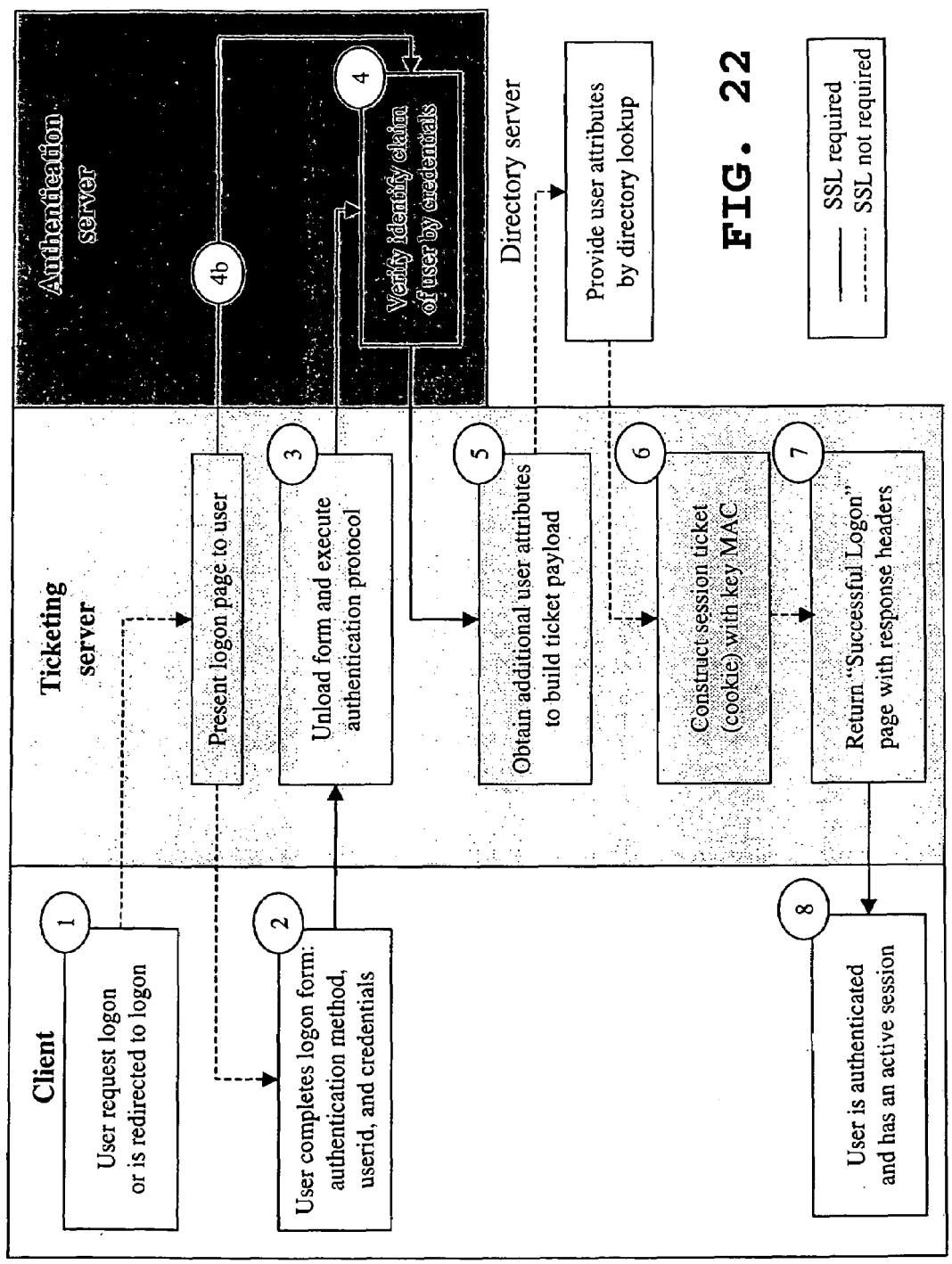
FIG. 22 illustrates the logic for implementing the ticket-issuance service and its interaction with the authentication and user profile services.

A valid session ticket is refreshed as it is used: this involves the update of the Login_Expires and Ticket_MAC values. The values are validated by a server and returned to the user in response to an HTTP request, which prevents ticket expiration while a user is active. Users would otherwise need to re-authenticate unnecessarily. FIG. 22 illustrates the logic for implementing the ticket-issuance service and its interaction whit the authentication and user profile services.

Ticket validation service. After a ticket is issued, the HTTP server must validate it as presented in the request headers. Three checks are performed to validate a session ticket transmitted from a browser user to a server:

The IP host address from which the session ticket was transmitted must match the User_IP value.

The Ticket_MAC value (as a cookie header) in the request from the browser user must match the result of the same server-side calculation performed on the presented session ticket using the MAC key (excluding the Ticket_MAC value).

The time provided by the time service must he earlier than the times specified in the ticket's Login_Expires and Login_Expires_Absolute values.

If a session ticket is not valid, the user is asked to reauthenticate and thereby establish a valid session. When a user successfully authenticates, the session ticket transitions state to "Valid and Not Expired." From this state, a number of possible transitions can be made:

A ticket refresh may retain the "Valid and Not Expired" state. This is most common event.

If the ticket is deleted (for example, the representative cookie tile is deleted, or the browser application execution terminated and restarted), it arrives in a "No Ticket" state.

If the ticket is tampered with or the machine IP address does not match the User_IP value, it arrives in an "Invalid Ticket_MAC" state.

If the ticket is presented after it has expired, it arrives in an "Expired" state.

A tampered and expired ticket arrives in the "Invalid and Expired" state.

From any invalid state, a transition back to the same state based on a failed reauthentication is possible. If reauthentication is successful, the state transitions back to "Valid and Not Expired."

The User_IP may have been established by a dynamic host configuration protocol (DHCP) service (RFC 2131); this occurs if sessions time out or expire in a much shorter time than a DHCP address lease does. Session time-outs are usually in the range of 5 to 20 minutes, while DHCP leases tend to have durations of 24 to 72 hours (a few environments with very short leases provide exceptions to this). If a DHCP lease is lost and renewed with a different IP address while a session is active, then the user will need to re-authenticate. (In other words, the user will have been logged off by the address change; this would be true for any socket-based services in use as well).

The use of proxy servers raises another issue related to User_IP. In the case of many users and a single shared proxy, all users appear to have the same IP address-that of the proxy. This limits the effectiveness of User_IP in binding a session ticket to a particular host. In the case of many users and an array of proxy servers with different IP addresses, the User_IP generally will not match the actual IP address of the rotating proxies. In a case where you can control the proxy systems, one solution is to activate proxy generation of the Client IP HTTP request header and use this value instead of the host IP address.

The keyed message authentication code stored as the Ticket_MAC value requires the provision of some key management services. Key management services required for this approach are:

secure distribution of the MAC key to all servers requiring it, and

MAC key renewal or regeneration.

MAC key updates cause all currently valid session tickets to become invalid. This forces users to reauthenticate, which can be irksome if key updates are frequent. In practice, a nightly key update schedule is often adequate for typical business-oriented-as opposed to military or diplomatic-security policies. In a network of servers requiring MAC key knowledge and renewal, more elaborate key distribution methods are needed to protect the key during transmission.

The Authorization Service mediates user access to resources; its primary clients are HTTP servers and other network-based, LDAP-aware applications. When a user requests resources, the HTTP server asks the authorization service if the user is authorized for them. The response is either true or false, and the HTTP server or application processes the request accordingly. In this way, the HTTP server acts like an application access firewall, where filtering rules are based on an RBAC model accessed over LDAP.

LDAP is defined in several IETF documents. RFC 1487 (July 1993) was the earliest definition of a lightweight access protocol for X.500 directories. RFC 1777, released in March 1995, is known as LDAPv2 and remains the current draft standard. RFCs 2251 through 2256 are proposed standards and collectively constitute what is known as LDAPv3.

The LDAP RFCs describe a network protocol for communication between directory user agents (DUAs) and directory server agents (DSAs), supported by an underlying set of data structures referred to as a directory. The directory data structures are in accordance with the CCITT X.500 standards and provide a simple, obbject-oriented organization. The objects are not complex and do not have any executable code attached to them; they often look like simple database rows with the exception that attributes or columns may be designated as required or allowed. Objects may be designated distinct classes, the attributes of which may be inherited by any object therein.

Using a compliant LDAP DSA and domains example. (a Netscape Directory Server in the implementation described here), the $RBAC_0$ model defined previously can be implemented by making two schema extensions. First, the default user object is subclassed to a new object class with at least one additional required attribute: securityRole. At this point, if the client has outer attribution requirements, those attributes are also definers for the new default user object.

Second, the object class securityRoleObject is defined. There is one instance of securityRoleObject for each defined role in the system. This collection of objects defines the relation PA, as described for $RBAC_0$ (a many-to-many permission-to-role assignment relation). In practice, PA may be represented as a Boolean matrix of dimensions corresponding to the number of roles (rows) and permissions (columns) in the system. Each securityRoleObject then corresponds to a row of the permission matrix.

Next, users are created in the LDAP directory using the new object class. This object class inherits all the usual attributes-e-mail address, fax number, street address, first name, last name, and so on-plus any additional new attributes the client requires. A typical distinguished name (DN) for a user would have the form uid=userid, o=organization, c=countryName.

After all of the information access functions are identified, user roles are defined. An instance of the object class securityRoleObject with an identifier that included the role name and true or false values for each attribute that matched an information-access function was created in the insurance company implementation.

Because HTTP cookies contain a return domain that may include a wild-card type of specification, it is possible to use this session ticket scheme for a single Web sign-oft (SWSO) capability. SWSO allows a user to authenticate once to the ticket-issuing service and obtain a session ticket that establishes the user's session and authentication throughout an entire DNS subdomain of hosts. An HTTP cookie contains a name, a value, a path, a domain, an expiration, and a secure-only attribute. By designating the domain to be, for example, *.computer.org, the cookie will be returned to any server in the subdomain of computer.org, such as www.computer.org, dlib.computer.org, ftp.computer.org, and so on. A single cession ticker thereby provides the user's authentication and session management across a number of hosts related by domain name.

The example outlined below describes how a user sees the interaction with Web-based systems employing this approach to security. The initial login form includes possibilities for authentication service selection and domains for SWSO; in practice, this login form would be simpler.

The following steps describe this hypothetical session, illustrating the user's view of the system's security aspects:

The user launches a Web browser and enters a URL, such as http://dlib.computer.org.

Any cookies representing session tickets from previous sessions have expired, so no cookies are presented in the request headers. (Expired cookies may be present in the request, but the user does not see this.)

The Web server examines the request headers looking; for a name-value pair. which serves as the session ticket. If the session ticket is invalid or expired. or if none is found. the user is redirected to an authentication HTML form, delivered over a secured SSL HTTP connection from the ticket-issuing server. This form may he delivered by the same Web server or by a different Web server dedicated to this purpose.

The user fills in the authentication form, entering a user-ID and password, domain selections, and authentication method selection. and submits the form to the ticket-issuing server.

The ticketing server operates as a proxy for execution of file selected authentication protocol with an authentication server.

The ticketing server prepares a ticket for the user's session. The user ID, DN, session expiration time, absolute expiration, and possibly a client IP address form the ticket payload. A keyed MAC value is computed against the payload and appended to it; the payload and its MAC are then delivered in the HTTP response headers as cookies. The return domain of tile cookies corresponds to the domain selections made earlier on the form (*.computer.org in this case). The user is now authenticated and has an active Welt session with all Weft servers in the *.computer.org domain.

The user is presented with the initial navigation screen of the Computer Society's Digital Library.

Subsequent requests against any server in the *.dlib.computer.org domain will have tile session ticket cookie values in the HTTP request headers. All Web servers will extract that header and validate it using the shared MAC key. The user does not need to re-authenticate until the session expires.

The session expires after some time, say 30 minutes. A valid MAC but expired ticket results in a re-authentication as described above. Now re-authenticated, the user continues using the Digital Library.

Finally, the user is done with the session, and instead of telling it time out, she logs out explicitly. The logout establishes a session ticket with the expiration time so that any re-use of the computer's currently running browser will require re-authentication.

A comprehensive approach to security must consider numerous potential attacks on network services. Relevant issues include security policy, information labeling, user administration, physical security, operation system confirmation and hardening, network topologies for service locations, firewall configuration and filtering rules, intrusion detection penetration testing, and more. The following analysis of threats is restricted to those specific to the security services identified in tile service architecture presented here.

Both SHA and MD5 produce a fixed number of hits from an arbitrary size input: SHA produces 160 bits and MD5 produces 128 hits. The MAC can be defeated only by a forgery. To succeed, an attacker must find a useful hash collision-a computationally daunting task. To guard against this attack, the MAC key is regenerated daily, thus limiting the time available for calculating a useful hash collision to 24 hours. This interval may be reduced as computer power available to attackers increases.

The primary defenses against session ticket theft attacks arc the Login_Expires and User_IP elements. An attacker has only until the Login_Expires time to steal the session ticket and move it to another machine: in practice, this window of opportunity is usually between 5 and 20 minutes. (If the attacker were in possession of the victim's password, this session ticket theft attack would he unnecessary.)

The attacker's machine must also engage in an IP address spoof so that it appears to have the same network IP address as the victim's machine. Since both machines are active at the same time, this routing issue poses an additional problem for the attacker. A successful session ticket theft requires that an attacker read a user's disk-based cookie tile, change the victim's IP address or take the victim's machine off the network, assume the victim's IP address oil a subnet such that the IP routing of the stolen address will operate correctly, and finally, access the Web-based resources while impersonating the victim. This is a relatively complicated attack, which would generally require physical proximity to the victim's network and execution within a short timespan.

This attack is very unlikely to succeed when the cookies are memory-resident, that is, if they are never written to the cookie file by the browser software. This memory-only cookie treatment by browsers is not guaranteed, however. If SSL is used only access to the ticket-issuance service and the session tickets are subsequently transmitted in cleartext over the network, the tickets are vulnerable to recovery by an eavesdropper. When the HTTP traffic is SSL-encrypted, successful eavesdropping to steal a session ticket is unlikely.

If an attacker tries a different approach, such as extending the Login_Expires attribute or changing the User_IP of the session ticket, this will be detected in a Ticket_MAC computation mismatch. (The attacker does not have access to the MAC key secret used in the signature-generation algorithm, as it is protected by a firewall and operating system security measures.) A Ticket_MAC mismatch causes the server to immediately request re-authentication with the correct user ID and password, and generates an auditable event. Similarly, if an authenticated user seeks to modify some signed attribute, this will also be detected by a Ticket_MAC mismatch.

The function that generates the session ticket is another point of attack. Direct execution of this function would allow all attacker to revive an expired session on a machine that an authenticated user has left unattended. This function is protected by operating system methods, application server methods, and Web server access controls. No unauthenticated or direct execution or viewing of the session ticket generator is permitted.

LDAP-based authentication and authorization services are also vulnerable to attack. This could involve repeated attempts to guess a user-ID and password for an LDAP bind with simple password operation. Discovery of a user's password would allow an attacker to impersonate an authorized user. An attacker might also discover a system administration account, and thereby be able to change security role definitions. Further, a user may seek to modify his security role attribute to gain greater access to resources.

Additional details regarding the above may be found in Kurt Gutzmann, Access Control and Session Management in the HTTP Environment, IEEE Internet Computer (January-February 2001), incorporated herein by reference and all references cited there incorporated herein by reference.

Figure 23:
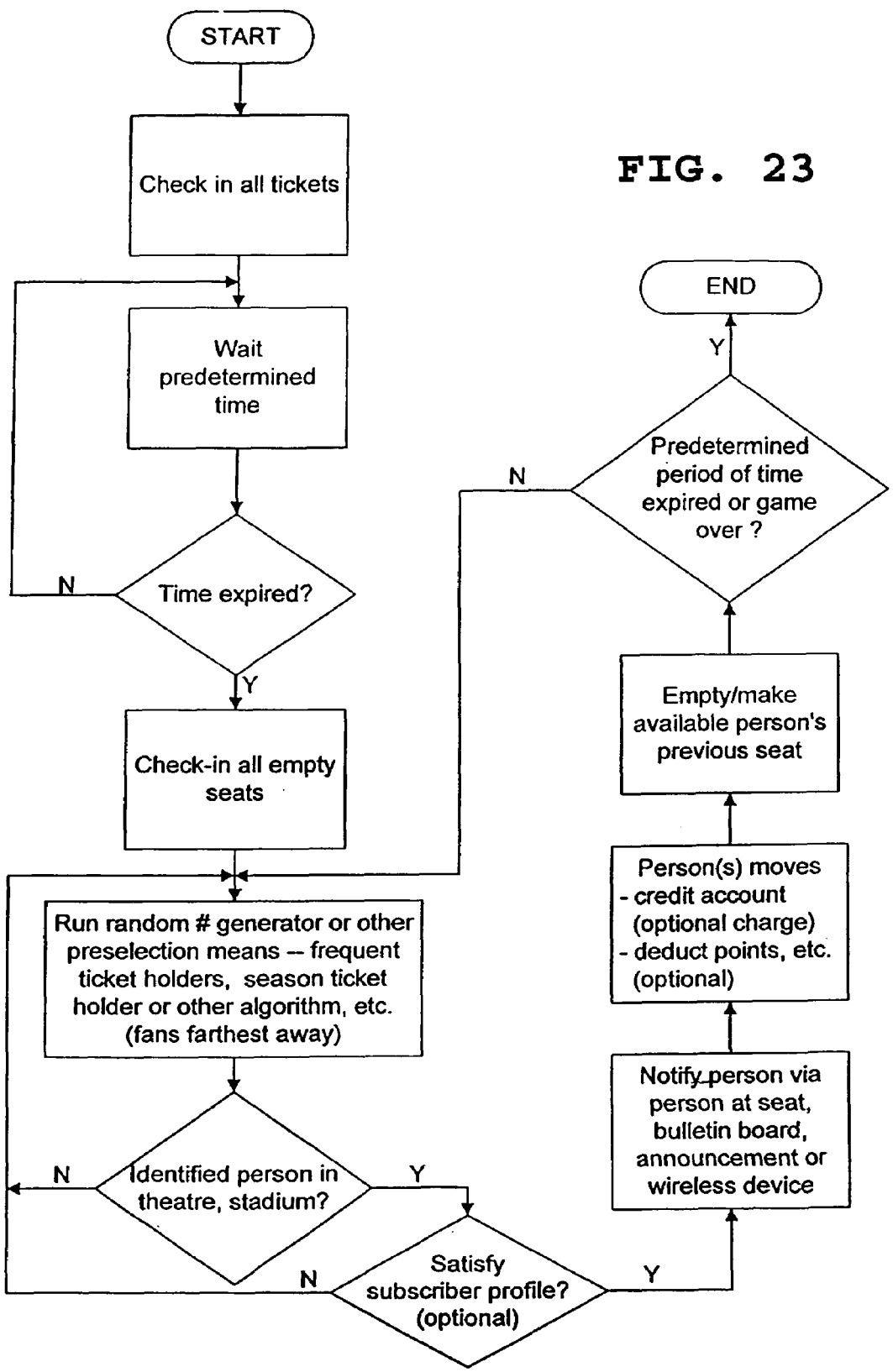
FIG. 23 is a flowchart of an embodiment of the invention that incorporates one or more of the architectures or communications methods described above.

FIG. 23 is a flowchart of a first embodiment of the invention that incorporates one or more of the architectures or communications methods described above. In FIG. 23, the process begins as all tickets are checked in, for example, as the patrons enter the reserved seating area, such as a stadium or theater, through, for example, bar code readers, scanners, infrared readers, and/or manually or other method where the patron is checked in, either at the gate, seat or other location. For example, patrons can optionally check in a predetermined time before the event through a wireless device, Internet connection, manual or voice recognition telephone, or other manner. The important point is to provide a standard manner for allowing patrons to check in, and if the patron fails to check in using a predetermined procedure, to allow that seat to be provided to another willing patron in accordance with a process to be described below. The patron may check in either a predetermined time before or after the event begins. Currently, such a process is impossible and unthinkable in view of the difficulty reserved seating events have in simply getting the patrons seated prior to the beginning of the event. The present invention represents a revolutionary process to enhance event enjoyment, earn patron loyalty and optionally provide additional revenues to the theater/stadium or optionally other patrons with the desirable ticket.

The check in procedure continues for a predetermined period of time until a predetermined time period has expired, for example, 5 minutes before the event begins, 10 minutes after the event begins, after a predetermined event, such as the second act of a play, and the like. Once the predetermined time period or event has been completed, the check in procedure may be considered completed to begin the seat re-allocation process. To begin the seat re-allocation process, a re-allocation algorithm is used to re-assign seat for patrons that are willing or interested in different or better seats. Such re-allocation processes or algorithms may include a random process, a process where priority patrons are given priority for re-assignment of seat, a process where patrons are willing to pay additional for the re-assignment to either the theater or the individual patron whose seat is being provided to another patron, frequent event patrons, season ticket patrons, or other predetermined process.

If the patron that is identified by the re-allocation process is determined to be present in the theater, for example, via mobile telephone, wireless device, and/or manual verification, an optional sub-process determines whether the patron's optional profile is also satisfied with the available seating. If the optional subscriber profile is not satisfied, then the re-allocation process searches for another possible patron. If the optional profile sub-process is satisfied, then the eligible patron is notified via one or means, such as announcement, manually, wireless device, mobile telephone, bulletin board, and/or other means. The patron is then notified and presented with the option of moving for free, use of award points, additional money to the theater and/or patron to whose seat is being provided, or other predetermined criteria to obtain the seat. Optionally, a bidding process may be initiated that allows various patrons to bid against one another. Any standard bidding process may optionally be used. The patron, of course has the option to decline, and if so, the process continues and returns to the re-allocation process to attempt to locate another possible patron.

If the patron accepts, payment of money or other means may be effectuated on the spot via the wireless device, credit card, debit card, points, and the like, and the patron may now move to the other seat. The patron's seat may then optionally be made available as an empty seat to the re-allocation process. If a predetermined period of time has not expired, then the re-allocation process may be run again to optionally continuously re-allocate seats. The patron may optionally store the up-graded ticket on a wireless device for proof of entrance to the better seating area. Optionally, the seat and/or row and/or section, includes a separate reader device to receive optionally the original ticket that is now re-allocated to a better seat, or a new ticket that may optionally be received by the patron via the wireless device and/or manually via a worker in the theater or stadium.

Figure 24:
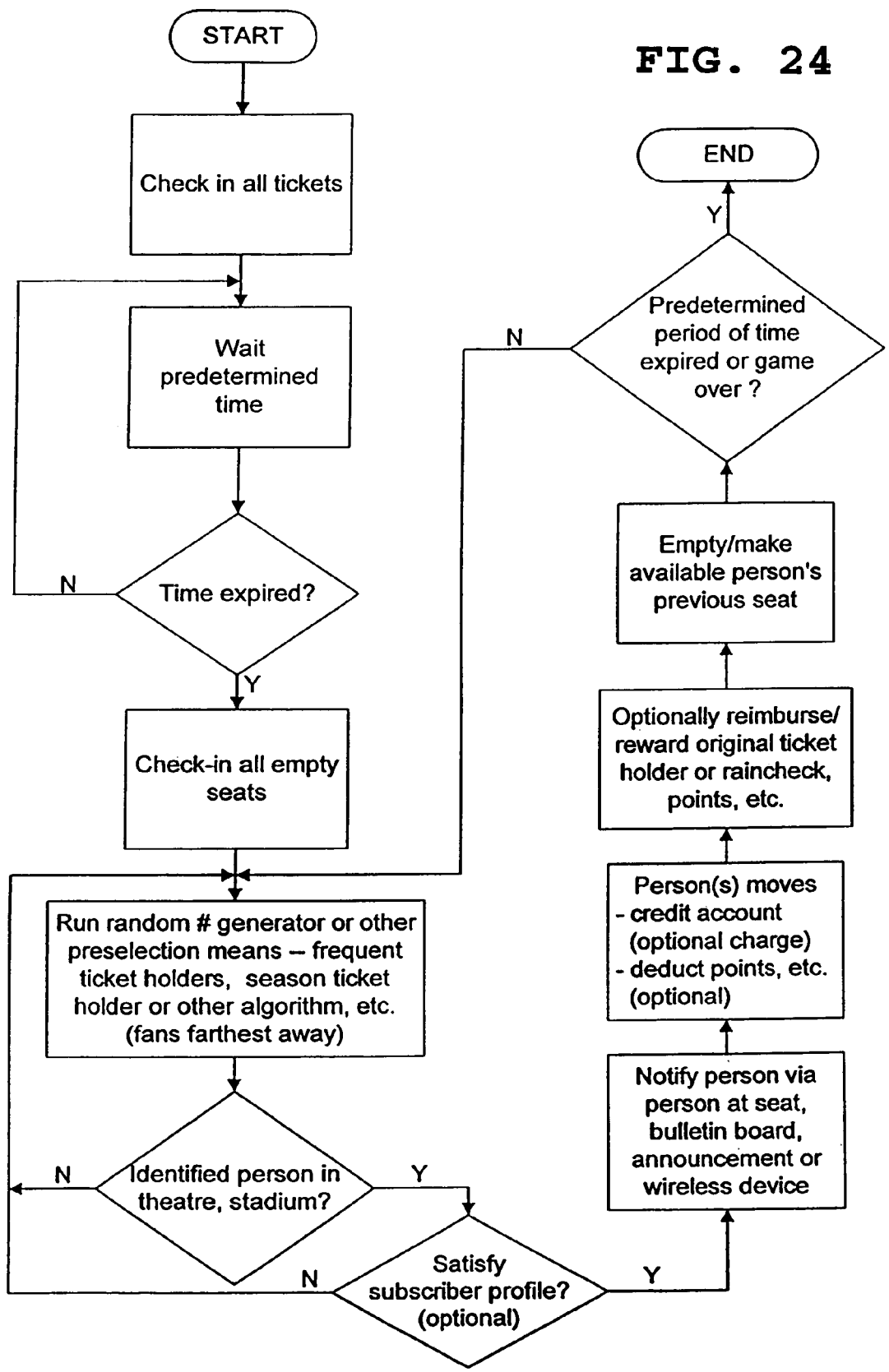
FIGS. 24–37 are flowcharts of various embodiment sof the process of the present invention.

FIG. 24 is a flowchart of a second embodiment of the invention. In FIG. 24, the process begins as all tickets are checked in, for example, as the patrons enter the reserved seating area, such as a stadium or theater, through, for example, bar code readers, scanners, infrared readers, and/or manually or other method where the patron is checked in, either at the gate, seat or other location. For example, patrons can optionally check in a predetermined time before the event through a wireless device, Internet connection, manual or voice recognition telephone, or other manner. The important point is to provide a standard manner for allowing patrons to check in, and if the patron fails to check in using a predetermined procedure, to allow that seat to be provided to another willing patron in accordance with a process to be described below. Currently, such a process is impossible and unthinkable in view of the difficulty reserved seating events have in simply getting the patrons seated prior to the beginning of the event. The present invention represents a revolutionary process to enhance event enjoyment, earn patron loyalty and optionally provide additional revenues to the theater/stadium or optionally other patrons with the desirable ticket.

The check in procedure continues for a predetermined period of time until a predetermined time period has expired, for example, 5 minutes before the event begins, 10 minutes after the event begins, after a predetermined event, such as the second act of a play, and the like. Once the predetermined time period or event has been completed, the check in procedure may be considered completed to begin the seat re-allocation process. To begin the seat re-allocation process, a re-allocation algorithm is used to re-assign seat for patrons that are willing or interested in different or better seats. Such re-allocation processes or algorithms may include a random process, a process where priority patrons are given priority for re-assignment of seat, a process where patrons are willing to pay additional for the re-assignment to either the theater or the individual patron whose seat is being provided to another patron, frequent event patrons, season ticket patrons, or other predetermined process.

If the patron that is identified by the re-allocation process is determined to be present in the theater, for example, via mobile telephone, wireless device, and/or manual verification, an optional sub-process determines whether the patron's optional profile is also satisfied with the available seating. If the optional subscriber profile is not satisfied, then the re-allocation process searches for another possible patron. If the optional profile sub-process is satisfied, then the eligible patron is notified via one or means, such as announcement, manually, wireless device, mobile telephone, bulletin board, and/or other means. The patron is then notified and presented with the option of moving for free, use of award points, additional money to the theater and/or patron to whose seat is being provided, or other predetermined criteria to obtain the seat. The patron, of course has the option to decline, and if so, the process continues and returns to the re-allocation process to attempt to locate another possible patron.

If the patron accepts, payment of money or other means may be effectuated on the spot via the wireless device, credit card, debit card, points, and the like, and the patron may now move to the other seat. In addition, the original ticket holder is optionally reimbursed with award points, a percentage of the revenue, a flat fee, an additional event ticket that might also be upgradable, and/or any other means for rewarding the original ticket holder. The patron's seat may then optionally be made available as an empty seat to the re-allocation process. If a predetermined period of time has not expired, then the re-allocation process may be run again to optionally continuously re-allocate seats. The patron may optionally store the up-graded ticket on a wireless device for proof of entrance to the better seating area. Optionally, the seat and/or row and/or section, includes a separate reader device to receive optionally the original ticket that is now re-allocated to a better seat, or a new ticket that may optionally be received by the patron via the wireless device and/or manually via a worker in the theater or stadium.

Figure 25:
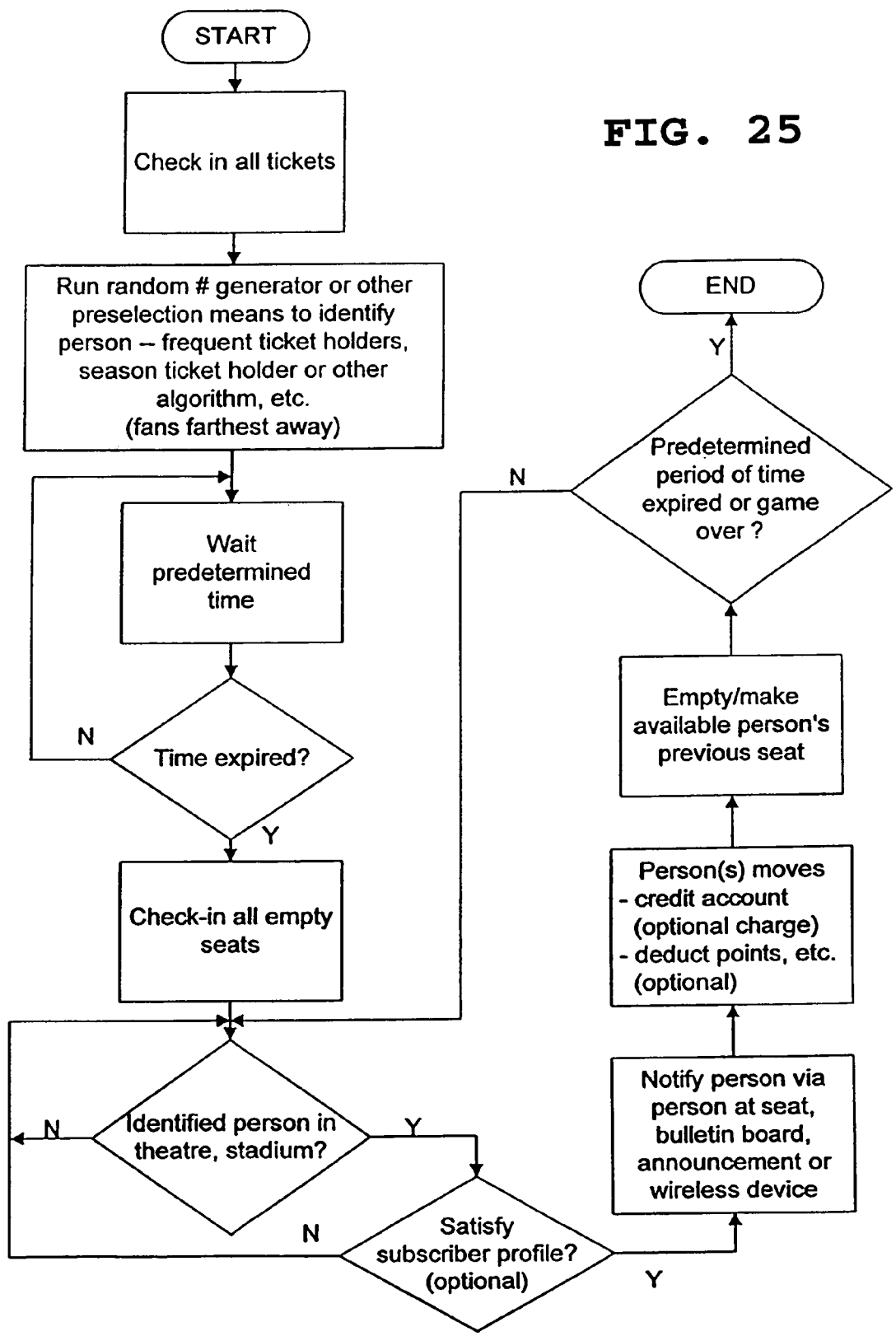

FIG. 25 is a flowchart of a third embodiment of the invention. In FIG. 25, the process begins as all tickets are checked in, for example, as the patrons enter the reserved seating area, such as a stadium or theater, through, for example, bar code readers, scanners, infrared readers, and/or manually or other method where the patron is checked in, either at the gate, seat or other location. For example, patrons can optionally check in a predetermined time before the event through a wireless device, Internet connection, manual or voice recognition telephone, or other manner. The important point is to provide a standard manner for allowing patrons to check in, and if the patron fails to check in using a predetermined procedure, to allow that seat to be provided to another willing patron in accordance with a process to be described below. Currently, such a process is impossible and unthinkable in view of the difficulty reserved seating events have in simply getting the patrons seated prior to the beginning of the event. The present invention represents a revolutionary process to enhance event enjoyment, earn patron loyalty and optionally provide additional revenues to the theater/stadium or optionally other patrons with the desirable ticket.

The seat re-allocation process is used to re-assign seat for patrons that are willing or interested in different or better seats. Such re-allocation processes or algorithms may include a random process, a process where priority patrons are given priority for re-assignment of seat, a process where patrons are willing to pay additional for the re-assignment to either the theater or the individual patron whose seat is being provided to another patron, frequent event patrons, season ticket patrons, or other predetermined process. Simultaneously or subsequently, the check in procedure continues for a predetermined period of time until a predetermined time period has expired, for example, 5 minutes before the event begins, 10 minutes after the event begins, after a predetermined event, such as the second act of a play, and the like. Once the predetermined time period or event has been completed, the check in procedure may be considered completed to begin the seat re-allocation process.

If the patron that is identified by the re-allocation process is determined to be present in the theater, for example, via mobile telephone, wireless device, and/or manual verification, an optional sub-process determines whether the patron's optional profile is also satisfied with the available seating. If the optional subscriber profile is not satisfied, then the re-allocation process searches for another possible patron. If the optional profile sub-process is satisfied, then the eligible patron is notified via one or means, such as announcement, manually, wireless device, mobile telephone, bulletin board, and/or other means. The patron is then notified and presented with the option of moving for free, use of award points, additional money to the theater and/or patron to whose seat is being provided, or other predetermined criteria to obtain the seat. The patron, of course has the option to decline, and if so, the process continues and returns to the re-allocation process to attempt to locate another possible patron.

If the patron accepts, payment of money or other means may be effectuated on the spot via the wireless device, credit card, debit card, points, and the like, and the patron may now move to the other seat. The patron's seat may then optionally be made available as an empty seat to the re-allocation process. If a predetermined period of time has not expired, then the re-allocation process may be run again to optionally continuously re-allocate seats. The patron may optionally store the up-graded ticket on a wireless device for proof of entrance to the better seating area. Optionally, the seat and/or row and/or section, includes a separate reader device to receive optionally the original ticket that is now re-allocated to a better seat, or a new ticket that may optionally be received by the patron via the wireless device and/or manually via a worker in the theater or stadium.

Figure 26:
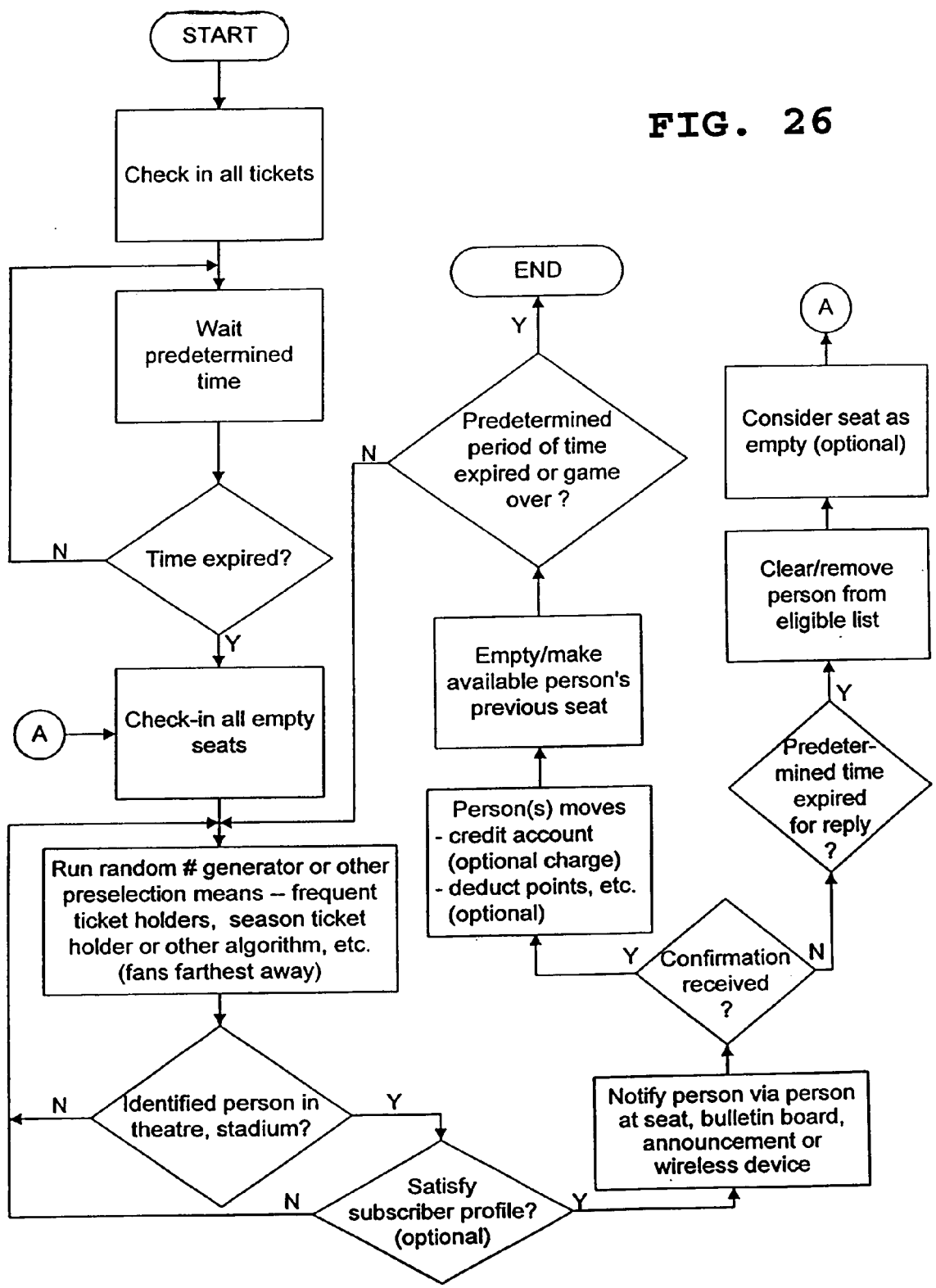

FIG. 26 is a flowchart of a fourth embodiment of the invention. In FIG. 26, the process begins as all tickets are checked in, for example, as the patrons enter the reserved seating area, such as a stadium or theater, through, for example, bar code readers, scanners, infrared readers, and/or manually or other method where the patron is checked in, either at the gate, seat or other location. For example, patrons can optionally check in a predetermined time before the event through a wireless device, Internet connection, manual or voice recognition telephone, or other manner. The important point is to provide a standard manner for allowing patrons to check in, and if the patron fails to check in using a predetermined procedure, to allow that seat to be provided to another willing patron in accordance with a process to be described below. Currently, such a process is impossible and unthinkable in view of the difficulty reserved seating events have in simply getting the patrons seated prior to the beginning of the event. The present invention represents a revolutionary process to enhance event enjoyment, earn patron loyalty and optionally provide additional revenues to the theater/stadium or optionally other patrons with the desirable ticket.

The check in procedure continues for a predetermined period of time until a predetermined time period has expired, for example, 5 minutes before the event begins, 10 minutes after the event begins, after a predetermined event, such as the second act of a play, and the like. Once the predetermined time period or event has been completed, the check in procedure may be considered completed to begin the seat re-allocation process. To begin the seat re-allocation process, a re-allocation algorithm is used to re-assign seat for patrons that are willing or interested in different or better seats. Such re-allocation processes or algorithms may include a random process, a process where priority patrons are given priority for re-assignment of seat, a process where patrons are willing to pay additional for the re-assignment to either the theater or the individual patron whose seat is being provided to another patron, frequent event patrons, season ticket patrons, or other predetermined process.

If the patron that is identified by the re-allocation process is determined to be present in the theater, for example, via mobile telephone, wireless device, and/or manual verification, an optional sub-process determines whether the patron's optional profile is also satisfied with the available seating. If the optional subscriber profile is not satisfied, then the re-allocation process searches for another possible patron. If the optional profile sub-process is satisfied, then the eligible patron is notified via one or means, such as announcement, manually, wireless device, mobile telephone, bulletin board, and/or other means. The patron is then notified and presented with the option of moving for free, use of award points, additional money to the theater and/or patron to whose seat is being provided, or other predetermined criteria to obtain the seat. The patron, of course has the option to decline, and if so, the process continues and returns to the re-allocation process to attempt to locate another possible patron.

If no confirmation is received from the patron for a predetermined period of time, the re-allocation process continues to wait until the predetermined period of time has expired. Once the predetermined period of time has expired and there is no response received from the patron provided with the option of changing their seat, the patron is cleared or removed from the eligible list, and the seat is considered or assigned empty status for the re-allocation algorithm to be again implemented.

If the patron accepts and a confirmation is received, payment of money or other means may be effectuated on the spot via the wireless device, credit card, debit card, points, and the like, and the patron may now move to the other seat. The patron's seat may then optionally be made available as an empty seat to the re-allocation process. If a predetermined period of time has not expired, then the re-allocation process may be run again to optionally continuously re-allocate seats. The patron may optionally store the up-graded ticket on a wireless device for proof of entrance to the better seating area. Optionally, the seat and/or row and/or section, includes a separate reader device to receive optionally the original ticket that is now re-allocated to a better seat, or a new ticket that may optionally be received by the patron via the wireless device and/or manually via a worker in the theater or stadium.

Of course, to re-allocation algorithm does not have to be run or implemented one patron at a time, but may be run to re-allocate or re-assign a plurality of patrons. If one patron or higher priority patron does not accept, then the next already generated patron may be queried to determine whether the next patron desires the seat re-allocation. Further, the system optionally downloads instructions on how to get to the new location, and can provide step-by-step instructions using an optional standard global positioning system (GPS) incorporated in, or as a separate accessory to, the wireless device.

Figure 27:
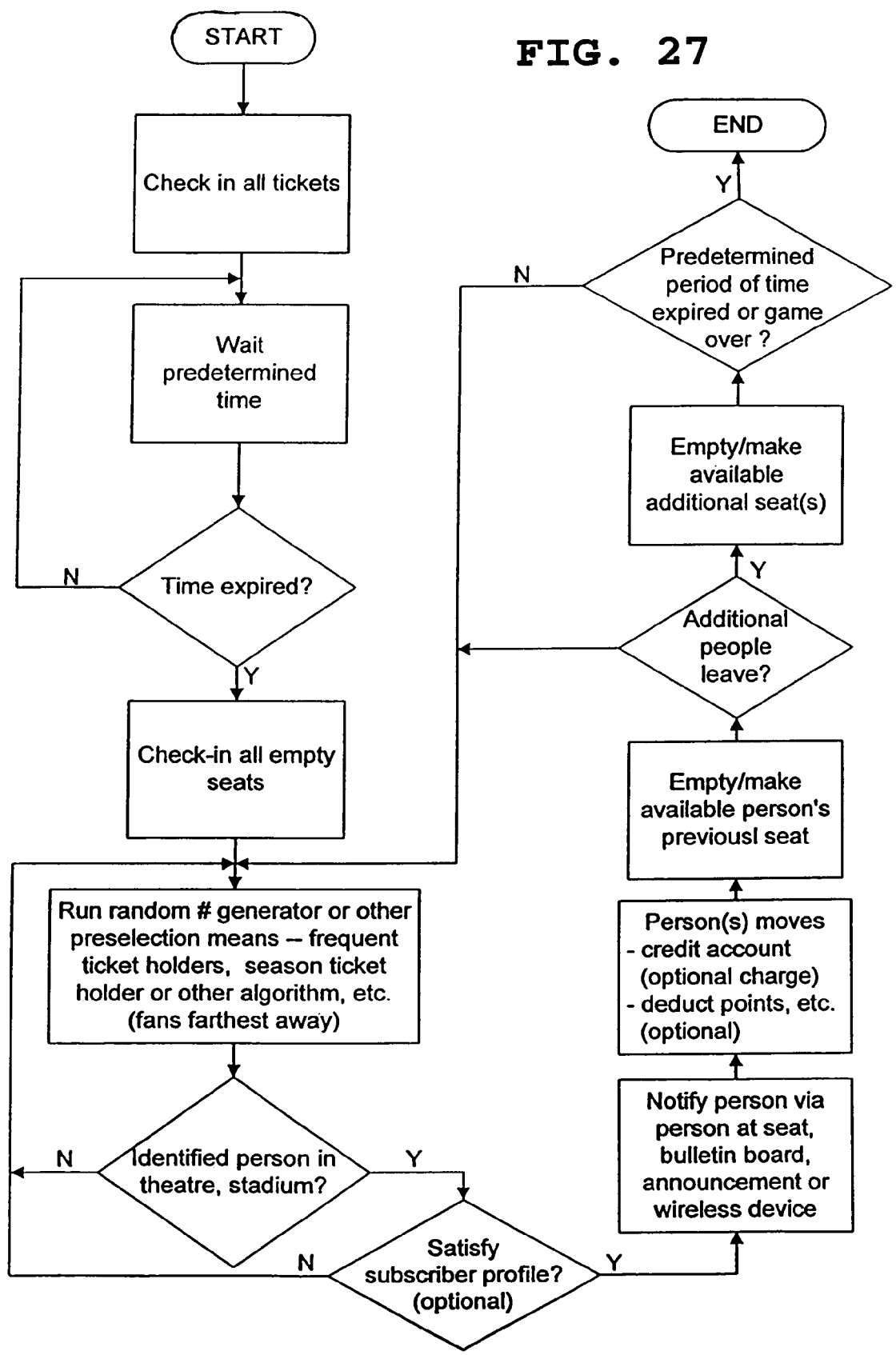

FIG. 27 is a flowchart of a fifth embodiment of the invention. In FIG. 27, the process begins as all tickets are checked in, for example, as the patrons enter the reserved seating area, such as a stadium or theater, through, for example, bar code readers, scanners, infrared readers, and/or manually or other method where the patron is checked in, either at the gate, seat or other location. For example, patrons can optionally check in a predetermined time before the event through a wireless device, Internet connection, manual or voice recognition telephone, or other manner. The important point is to provide a standard manner for allowing patrons to check in, and if the patron fails to check in using a predetermined procedure, to allow that seat to be provided to another willing patron in accordance with a process to be described below. Currently, such a process is impossible and unthinkable in view of the difficulty reserved seating events have in simply getting the patrons seated prior to the beginning of the event. The present invention represents a revolutionary process to enhance event enjoyment, earn patron loyalty and optionally provide additional revenues to the theater/stadium or optionally other patrons with the desirable ticket.

The check in procedure continues for a predetermined period of time until a predetermined time period has expired, for example, 5 minutes before the event begins, 10 minutes after the event begins, after a predetermined event, such as the second act of a play, and the like. Once the predetermined time period or event has been completed, the check in procedure may be considered completed to begin the seat re-allocation process. To begin the seat re-allocation process, a re-allocation algorithm is used to re-assign seat for patrons that are willing or interested in different or better seats. Such re-allocation processes or algorithms may include a random process, a process where priority patrons are given priority for re-assignment of seat, a process where patrons are willing to pay additional for the re-assignment to either the theater or the individual patron whose seat is being provided to another patron, frequent event patrons, season ticket patrons, or other predetermined process.

If the patron that is identified by the re-allocation process is determined to be present in the theater, for example, via mobile telephone, wireless device, and/or manual verification, an optional sub-process determines whether the patron's optional profile is also satisfied with the available seating. If the optional subscriber profile is not satisfied, then the re-allocation process searches for another possible patron. If the optional profile sub-process is satisfied, then the eligible patron is notified via one or means, such as announcement, manually, wireless device, mobile telephone, bulletin board, and/or other means. The patron is then notified and presented with the option of moving for free, use of award points, additional money to the theater and/or patron to whose seat is being provided, or other predetermined criteria to obtain the seat. The patron, of course has the option to decline, and if so, the process continues and returns to the re-allocation process to attempt to locate another possible patron.

If the patron accepts, payment of money or other means may be effectuated on the spot via the wireless device, credit card, debit card, points, and the like, and the patron may now move to the other seat. The patron's seat may then optionally be made available as an empty seat to the re-allocation process. The process then optionally determines whether there have been additional vacancies, for example, just prior to the event, during the event or as a result of predetermined processes, and empties and/or makes available these additional seats for the event. For example, if standard smart card, standard scanner, standard bluetooth, wireless, or other technology is used in the present invention, additional seats may be made available as patrons leave the event early, for example if diverted for an urgent business meeting, and the like. These additional seats may provide additional opportunities for patron satisfaction, revenue (theater or patrons), advertising, advertising sponsorship for banner advertising on the wireless device and/or in the theater, and the like. Thus, scanners posted at strategic locations, for example, at the exit of the theater or stadium will confirm that the patron is leaving, and optionally prompt the patron to confirm that they do not plan on returning. This embodiment may optionally be used in other embodiments of the present invention, and vice versa.

If a predetermined period of time has not expired, then the re-allocation process may be run again to optionally continuously re-allocate seats while advantageously including the additional seats. The patron may optionally store the up-graded ticket on a wireless device for proof of entrance to the better seating area. Optionally, the seat and/or row and/or section, includes a separate reader device to receive optionally the original ticket that is now re-allocated to a better seat, or a new ticket that may optionally be received by the patron via the wireless device and/or manually via a worker in the theater or stadium.

Figure 28:
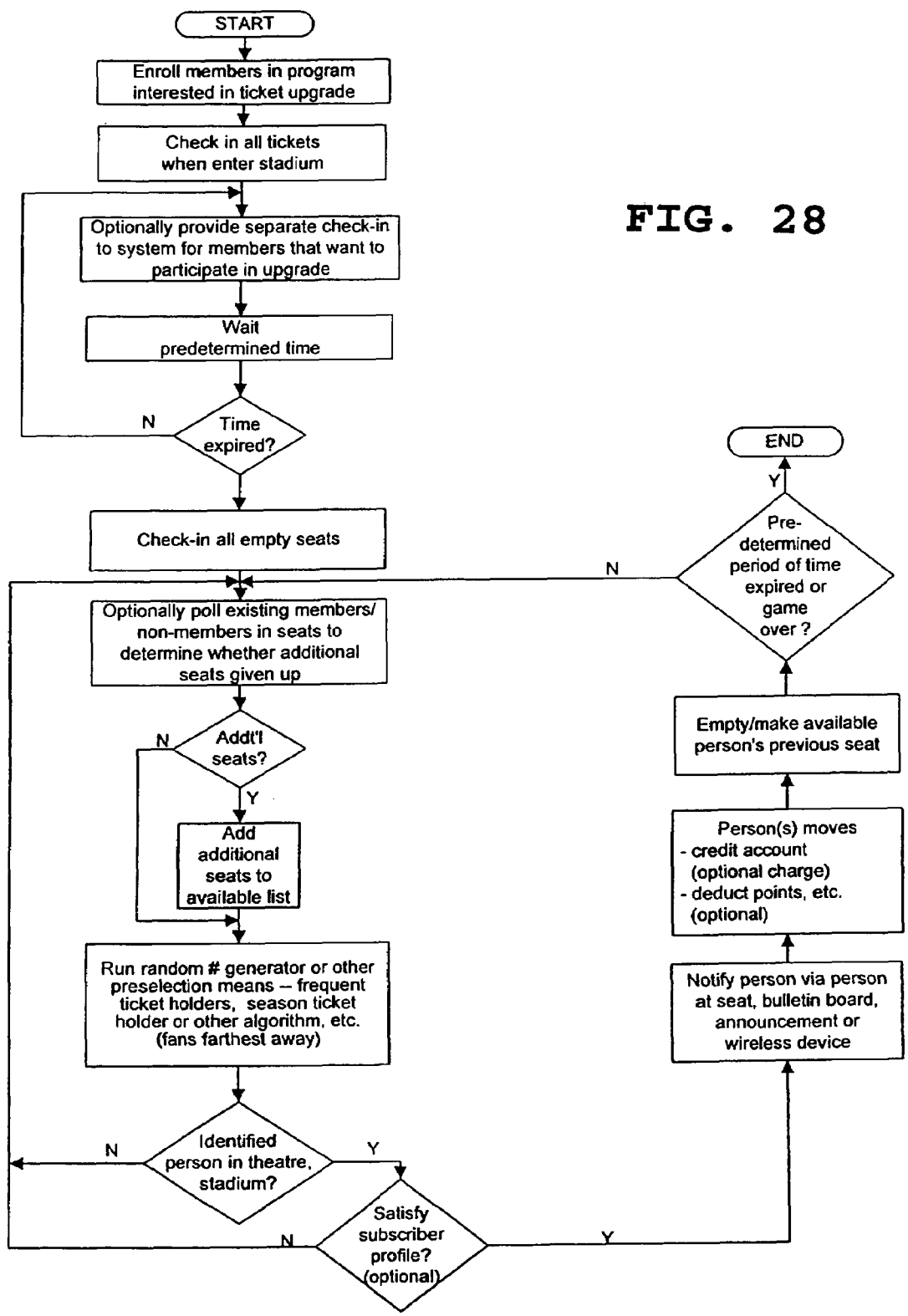

FIG. 28 is a flowchart of a first embodiment of the invention. In FIG. 28, the process begins by enrolling members in the program that are interested in the ticket upgrade. Tickets are checked in, for example, as the patrons enter the reserved seating area, such as a stadium or theater, through, for example, bar code readers, scanners, infrared readers, and/or manually or other method where the patron is checked in, either at the gate, seat or other location. An optional separate check in area is provided for patrons that want to participate in the upgrade program. For example, patrons can optionally check in a predetermined time before the event through a wireless device, Internet connection, manual or voice recognition telephone, or other manner. The important point is to provide a standard manner for allowing patrons to check in, and if the patron fails to check in using a predetermined procedure, to allow that seat to be provided to another willing patron in accordance with a process to be described below. The patron may check in either a predetermined time before or after the event begins. Currently, such a process is impossible and unthinkable in view of the difficulty reserved seating events have in simply getting the patrons seated prior to the beginning of the event. The present invention represents a revolutionary process to enhance event enjoyment, earn patron loyalty and optionally provide additional revenues to the theater/stadium or optionally other patrons with the desirable ticket.

The check in procedure continues for a predetermined period of time until a predetermined time period has expired, for example, 5 minutes before the event begins, 10 minutes after the event begins, after a predetermined event, such as the second act of a play, and the like. Once the predetermined time period or event has been completed, the check in procedure may be considered completed to begin the seat re-allocation process. To begin the seat re-allocation process, a re-allocation algorithm is used to re-assign seat for patrons that are willing or interested in different or better seats. Such re-allocation processes or algorithms may include a random process, a process where priority patrons are given priority for re-assignment of seat, a process where patrons are willing to pay additional for the re-assignment to either the theater or the individual patron whose seat is being provided to another patron, frequent event patrons, season ticket patrons, a standard bidding process, or other predetermined process.

An optional polling process to poll existing members and non-members in seats to whether additional seats are available. That is, in another optional embodiment of the present invention, non-members may also make their seats available for re-allocation/re-sale at any point in the process. In this additional polling process, the next step is to determine whether additional seats have been made available. If additional seats have been made available, then these additional seats are added to the list of available.

If the patron that is identified by the re-allocation process is determined to be present in the theater, for example, via mobile telephone, wireless device, and/or manual verification, an optional sub-process determines whether the patron's optional profile is also satisfied with the available seating. If the optional subscriber profile is not satisfied, then the re-allocation process searches for another possible patron. If the optional profile sub-process is satisfied, then the eligible patron is notified via one or means, such as announcement, manually, wireless device, mobile telephone, bulletin board, and/or other means. The patron is then notified and presented with the option of moving for free, use of award points, additional money to the theater and/or patron to whose seat is being provided, or other predetermined criteria to obtain the seat. Optionally, a bidding process may be initiated that allows various patrons to bid against one another. Any standard bidding process may optionally be used. The patron, of course has the option to decline, and if so, the process continues and returns to the re-allocation process to attempt to locate another possible patron.

If the patron accepts, payment of money or other means may be effectuated on the spot via the wireless device, credit card, debit card, points, and the like, and the patron may now move to the other seat. The patron's seat may then optionally be made available as an empty seat to the re-allocation process. If a predetermined period of time has not expired, then the re-allocation process may be run again to optionally continuously re-allocate seats. The patron may optionally store the up-graded ticket on a wireless device for proof of entrance to the better seating area. Optionally, the seat and/or row and/or section, includes a separate reader device to receive optionally the original ticket that is now re-allocated to a better seat, or a new ticket that may optionally be received by the patron via the wireless device and/or manually via a worker in the theater or stadium.

Figure 29:
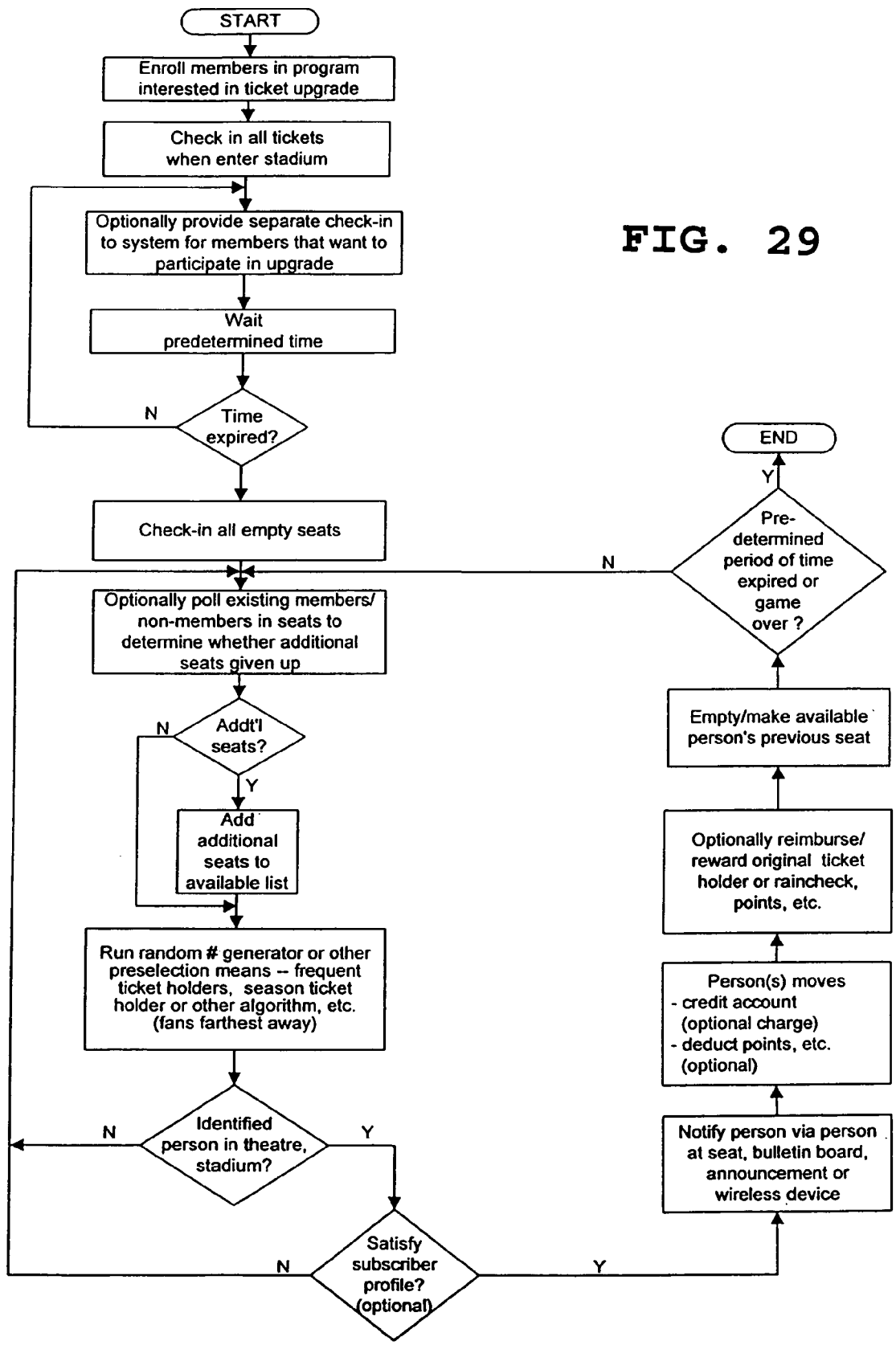

FIG. 29 is a flowchart of a second embodiment of the invention. In FIG. 29, the process begins by enrolling members in the program that are interested in the ticket upgrade. Tickets are checked in, for example, as the patrons enter the reserved seating area, such as a stadium or theater, through, for example, bar code readers, scanners, infrared readers, and/or manually or other method where the patron is checked in, either at the gate, seat or other location. An optional separate check in area is provided for patrons that want to participate in the upgrade program. For example, patrons can optionally check in a predetermined time before the event through a wireless device, Internet connection, manual or voice recognition telephone, or other manner. The important point is to provide a standard manner for allowing patrons to check in, and if the patron fails to check in using a predetermined procedure, to allow that seat to be provided to another willing patron in accordance with a process to be described below. Currently, such a process is impossible and unthinkable in view of the difficulty reserved seating events have in simply getting the patrons seated prior to the beginning of the event. The present invention represents a revolutionary process to enhance event enjoyment, earn patron loyalty and optionally provide additional revenues to the theater/stadium or optionally other patrons with the desirable ticket.

The check in procedure continues for a predetermined period of time until a predetermined time period has expired, for example, 5 minutes before the event begins, 10 minutes after the event begins, after a predetermined event, such as the second act of a play, and the like. Once the predetermined time period or event has been completed, the check in procedure may be considered completed to begin the seat re-allocation process. To begin the seat re-allocation process, a re-allocation algorithm is used to re-assign seat for patrons that are willing or interested in different or better seats. Such re-allocation processes or algorithms may include a random process, a process where priority patrons are given priority for re-assignment of seat, a process where patrons are willing to pay additional for the re-assignment to either the theater or the individual patron whose seat is being provided to another patron, frequent event patrons, season ticket patrons, a standard bidding process, or other predetermined process.

An optional polling process to poll existing members and non-members in seats to whether additional seats are available. That is, in another optional embodiment of the present invention, non-members may also make their seats available for re-allocation/re-sale at any point in the process. In this additional polling process, the next step is to determine whether additional seats have been made available. If additional seats have been made available, then these additional seats are added to the list of available.

If the patron that is identified by the re-allocation process is determined to be present in the theater, for example, via mobile telephone, wireless device, and/or manual verification, an optional sub-process determines whether the patron's optional profile is also satisfied with the available seating. If the optional subscriber profile is not satisfied, then the re-allocation process searches for another possible patron. If the optional profile sub-process is satisfied, then the eligible patron is notified via one or means, such as announcement, manually, wireless device, mobile telephone, bulletin board, and/or other means. The patron is then notified and presented with the option of moving for free, use of award points, additional money to the theater and/or patron to whose seat is being provided, or other predetermined criteria to obtain the seat. The patron, of course has the option to decline, and if so, the process continues and returns to the re-allocation process to attempt to locate another possible patron.

If the patron accepts, payment of money or other means may be effectuated on the spot via the wireless device, credit card, debit card, points, and the like, and the patron may now move to the other seat. In addition, the original ticket holder is optionally reimbursed with award points, a percentage of the revenue, a flat fee, an additional event ticket that might also be upgradable, and/or any other means for rewarding the original ticket holder. The patron's seat may then optionally be made available as an empty seat to the re-allocation process. If a predetermined period of time has not expired, then the re-allocation process may be run again to optionally continuously re-allocate seats. The patron may optionally store the up-graded ticket on a wireless device for proof of entrance to the better seating area. Optionally, the seat and/or row and/or section, includes a separate reader device to receive optionally the original ticket that is now re-allocated to a better seat, or a new ticket that may optionally be received by the patron via the wireless device and/or manually via a worker in the theater or stadium.

Figure 30:
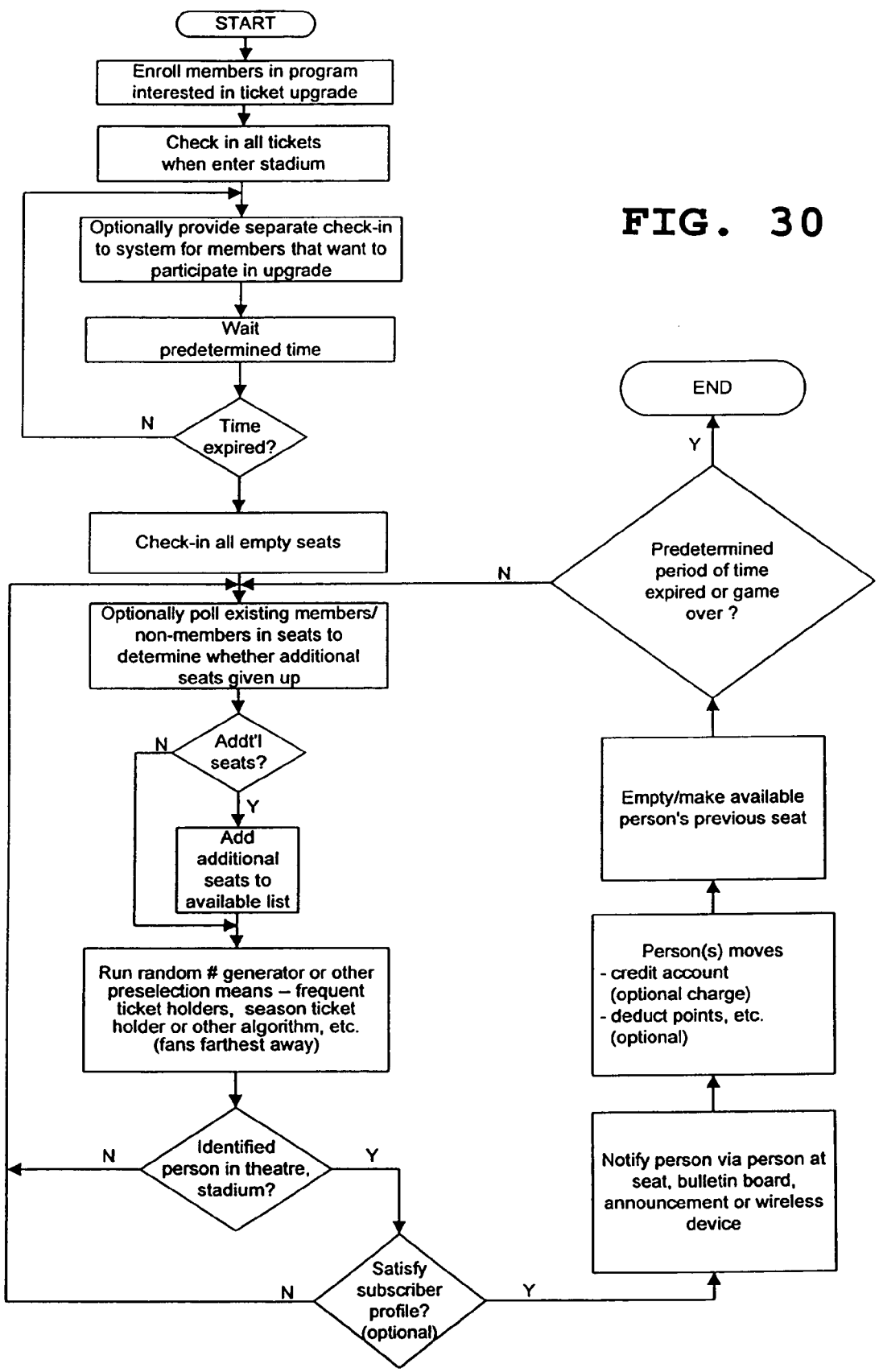

FIG. 30 is a flowchart of a third embodiment of the invention. In FIG. 30, the process begins by enrolling members in the program that are interested in the ticket upgrade. Tickets are checked in, for example, as the patrons enter the reserved seating area, such as a stadium or theater, through, for example, bar code readers, scanners, infrared readers, and/or manually or other method where the patron is checked in, either at the gate, seat or other location. An optional separate check in area is provided for patrons that want to participate in the upgrade program. For example, patrons can optionally check in a predetermined time before the event through a wireless device, Internet connection, manual or voice recognition telephone, or other manner. The important point is to provide a standard manner for allowing patrons to check in, and if the patron fails to check in using a predetermined procedure, to allow that seat to be provided to another willing patron in accordance with a process to be described below. Currently, such a process is impossible and unthinkable in view of the difficulty reserved seating events have in simply getting the patrons seated prior to the beginning of the event. The present invention represents a revolutionary process to enhance event enjoyment, earn patron loyalty and optionally provide additional revenues to the theater/stadium or optionally other patrons with the desirable ticket.

The seat re-allocation process is used to re-assign seat for patrons that are willing or interested in different or better seats. Such re-allocation processes or algorithms may include a random process, a process where priority patrons are given priority for re-assignment of seat, a process where patrons are willing to pay additional for the re-assignment to either the theater or the individual patron whose seat is being provided to another patron, frequent event patrons, season ticket patrons, a standard bidding process, or other predetermined process. Simultaneously or subsequently, the check in procedure continues for a predetermined period of time until a predetermined time period has expired, for example, 5 minutes before the event begins, 10 minutes after the event begins, after a predetermined event, such as the second act of a play, and the like. Once the predetermined time period or event has been completed, the check in procedure may be considered completed to begin the seat re-allocation process.

An optional polling process to poll existing members and non-members in seats to whether additional seats are available. That is, in another optional embodiment of the present invention, non-members may also make their seats available for re-allocation/re-sale at any point in the process. In this additional polling process, the next step is to determine whether additional seats have been made available. If additional seats have been made available, then these additional seats are added to the list of available.

If the patron that is identified by the re-allocation process is determined to be present in the theater, for example, via mobile telephone, wireless device, and/or manual verification, an optional sub-process determines whether the patron's optional profile is also satisfied with the available seating. If the optional subscriber profile is not satisfied, then the re-allocation process searches for another possible patron. If the optional profile sub-process is satisfied, then the eligible patron is notified via one or means, such as announcement, manually, wireless device, mobile telephone, bulletin board, and/or other means. The patron is then notified and presented with the option of moving for free, use of award points, additional money to the theater and/or patron to whose seat is being provided, or other predetermined criteria to obtain the seat. The patron, of course has the option to decline, and if so, the process continues and returns to the re-allocation process to attempt to locate another possible patron.

If the patron accepts, payment of money or other means may be effectuated on the spot via the wireless device, credit card, debit card, points, and the like, and the patron may now move to the other seat. The patron's seat may then optionally be made available as an empty seat to the re-allocation process. If a predetermined period of time has not expired, then the re-allocation process may be run again to optionally continuously re-allocate seats. The patron may optionally store the up-graded ticket on a wireless device for proof of entrance to the better seating area. Optionally, the seat and/or row and/or section, includes a separate reader device to receive optionally the original ticket that is now re-allocated to a better seat, or a new ticket that may optionally be received by the patron via the wireless device and/or manually via a worker in the theater or stadium.

Figure 31:
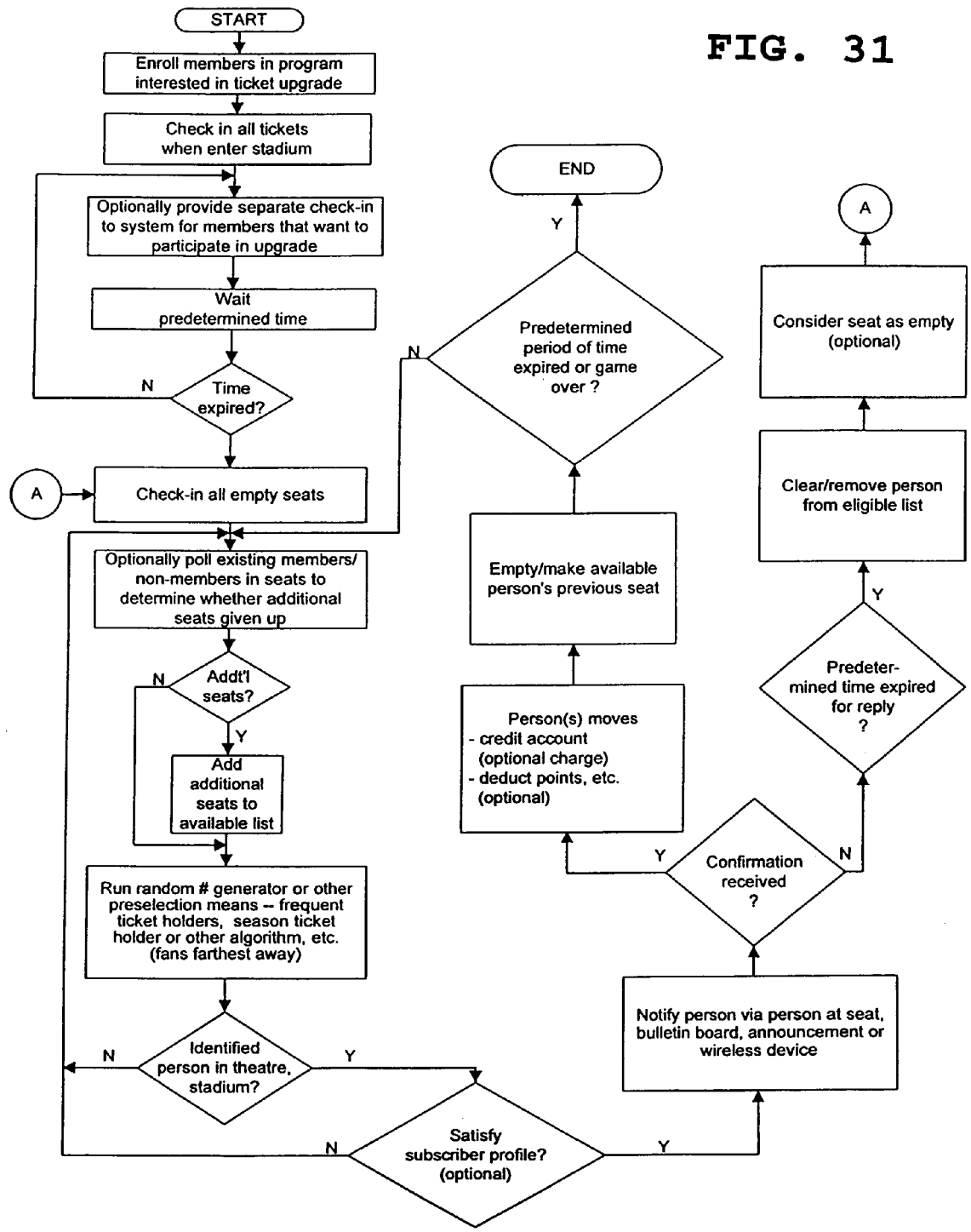

FIG. 31 is a flowchart of a fourth embodiment of the invention. In FIG. 31, the process begins by enrolling members in the program that are interested in the ticket upgrade. Tickets are checked in, for example, as the patrons enter the reserved seating area, such as a stadium or theater, through, for example, bar code readers, scanners, infrared readers, and/or manually or other method where the patron is checked in, either at the gate, seat or other location. An optional separate check in area is provided for patrons that want to participate in the upgrade program. For example, patrons can optionally check in a predetermined time before the event through a wireless device, Internet connection, manual or voice recognition telephone, or other manner. The important point is to provide a standard manner for allowing patrons to check in, and if the patron fails to check in using a predetermined procedure, to allow that seat to be provided to another willing patron in accordance with a process to be described below. Currently, such a process is impossible and unthinkable in view of the difficulty reserved seating events have in simply getting the patrons seated prior to the beginning of the event. The present invention represents a revolutionary process to enhance event enjoyment, earn patron loyalty and optionally provide additional revenues to the theater/stadium or optionally other patrons with the desirable ticket.

The check in procedure continues for a predetermined period of time until a predetermined time period has expired, for example, 5 minutes before the event begins, 10 minutes after the event begins, after a predetermined event, such as the second act of a play, and the like. Once the predetermined time period or event has been completed, the check in procedure may be considered completed to begin the seat re-allocation process. To begin the seat re-allocation process, a re-allocation algorithm is used to re-assign seat for patrons that are willing or interested in different or better seats. Such re-allocation processes or algorithms may include a random process, a process where priority patrons are given priority for re-assignment of seat, a process where patrons are willing to pay additional for the re-assignment to either the theater or the individual patron whose seat is being provided to another patron, frequent event patrons, season ticket patrons, a standard bidding process, or other predetermined process.

An optional polling process to poll existing members and non-members in seats to whether additional seats are available. That is, in another optional embodiment of the present invention, non-members may also make their seats available for re-allocation/re-sale at any point in the process. In this additional polling process, the next step is to determine whether additional seats have been made available. If additional seats have been made available, then these additional seats are added to the list of available.

If the patron that is identified by the re-allocation process is determined to be present in the theater, for example, via mobile telephone, wireless device, and/or manual verification, an optional sub-process determines whether the patron's optional profile is also satisfied with the available seating. If the optional subscriber profile is not satisfied, then the re-allocation process searches for another possible patron. If the optional profile sub-process is satisfied, then the eligible patron is notified via one or means, such as announcement, manually, wireless device, mobile telephone, bulletin board, and/or other means. The patron is then notified and presented with the option of moving for free, use of award points, additional money to the theater and/or patron to whose seat is being provided, or other predetermined criteria to obtain the seat. The patron, of course has the option to decline, and if so, the process continues and returns to the re-allocation process to attempt to locate another possible patron.

If no confirmation is received from the patron for a predetermined period of time, the re-allocation process continues to wait until the predetermined period of time has expired. Once the predetermined period of time has expired and there is no response received from the patron provided with the option of changing their seat, the patron is cleared or removed from the eligible list, and the seat is considered or assigned empty status for the re-allocation algorithm to be again implemented.

If the patron accepts and a confirmation is received, payment of money or other means may be effectuated on the spot via the wireless device, credit card, debit card, points, and the like, and the patron may now move to the other seat. The patron's seat may then optionally be made available as an empty seat to the re-allocation process. If a predetermined period of time has not expired, then the re-allocation process may be run again to optionally continuously re-allocate seats. The patron may optionally store the up-graded ticket on a wireless device for proof of entrance to the better seating area. Optionally, the seat and/or row and/or section, includes a separate reader device to receive optionally the original ticket that is now re-allocated to a better seat, or a new ticket that may optionally be received by the patron via the wireless device and/or manually via a worker in the theater or stadium.

Of course, to re-allocation algorithm does not have to be run or implemented one patron at a time, but may be run to re-allocate or re-assign a plurality of patrons. If one patron or higher priority patron does not accept, then the next already generated patron may be queried to determine whether the next patron desires the seat re-allocation. Further, the system optionally downloads instructions on how to get to the new location, and can provide step-by-step instructions using an optional standard global positioning system (GPS) incorporated in, or as a separate accessory to, the wireless device.

Figure 32:
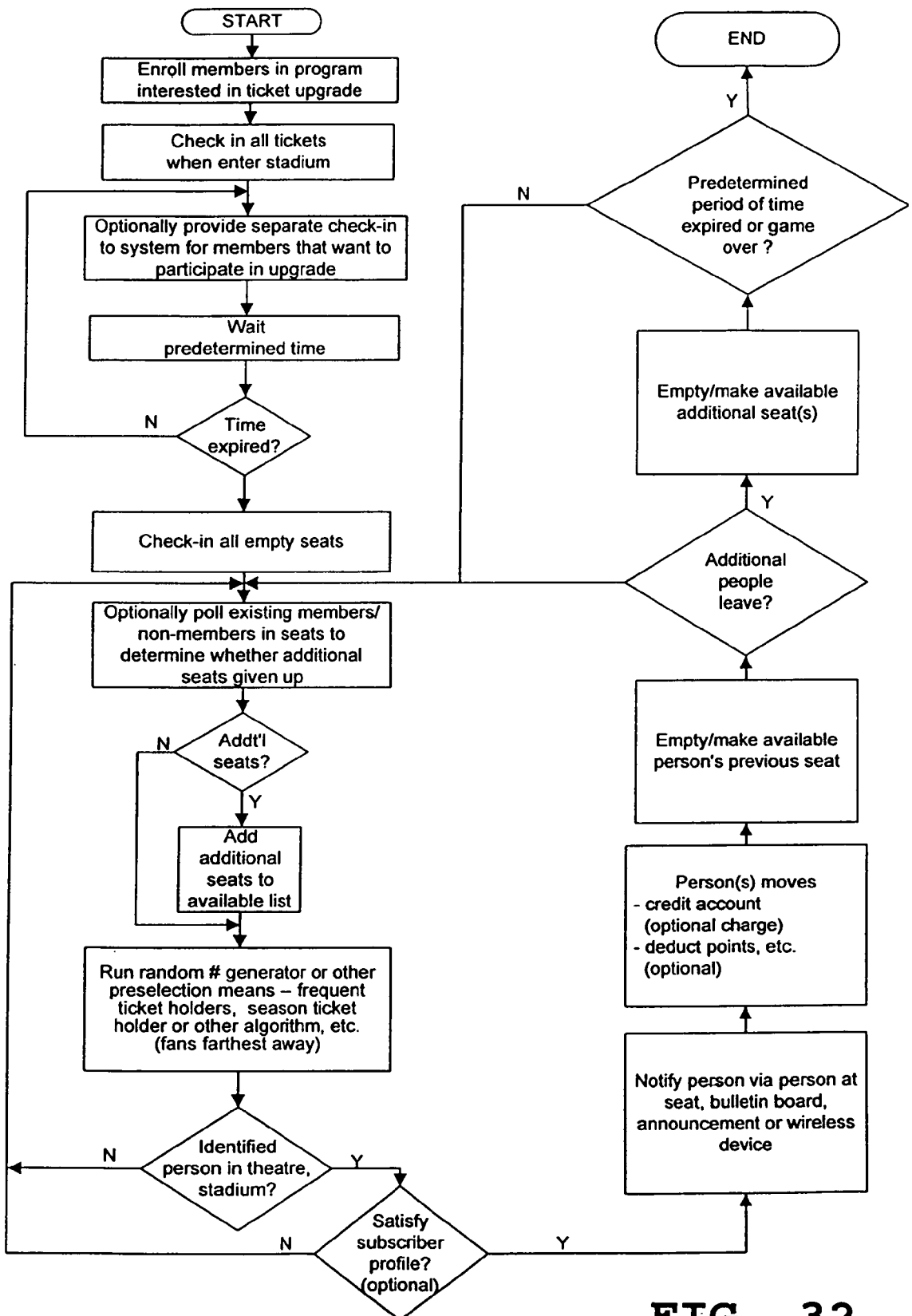

FIG. 32 is a flowchart of a fifth embodiment of the invention. In FIG. 32, the process begins by enrolling members in the program that are interested in the ticket upgrade. Tickets are checked in, for example, as the patrons enter the reserved seating area, such as a stadium or theater, through, for example, bar code readers, scanners, infrared readers, and/or manually or other method where the patron is checked in, either at the gate, seat or other location. An optional separate check in area is provided for patrons that want to participate in the upgrade program. For example, patrons can optionally check in a predetermined time before the event through a wireless device, Internet connection, manual or voice recognition telephone, or other manner. The important point is to provide a standard manner for allowing patrons to check in, and if the patron fails to check in using a predetermined procedure, to allow that seat to be provided to another willing patron in accordance with a process to be described below. Currently, such a process is impossible and unthinkable in view of the difficulty reserved seating events have in simply getting the patrons seated prior to the beginning of the event. The present invention represents a revolutionary process to enhance event enjoyment, earn patron loyalty and optionally provide additional revenues to the theater/stadium or optionally other patrons with the desirable ticket.

The check in procedure continues for a predetermined period of time until a predetermined time period has expired, for example, 5 minutes before the event begins, 10 minutes after the event begins, after a predetermined event, such as the second act of a play, and the like. Once the predetermined time period or event has been completed, the check in procedure may be considered completed to begin the seat re-allocation process. To begin the seat re-allocation process, a re-allocation algorithm is used to re-assign seat for patrons that are willing or interested in different or better seats. Such re-allocation processes or algorithms may include a random process, a process where priority patrons are given priority for re-assignment of seat, a process where patrons are willing to pay additional for the re-assignment to either the theater or the individual patron whose seat is being provided to another patron, frequent event patrons, season ticket patrons, a standard bidding process, or other predetermined process.

An optional polling process to poll existing members and non-members in seats to whether additional seats are available. That is, in another optional embodiment of the present invention, non-members may also make their seats available for re-allocation/re-sale at any point in the process. In this additional polling process, the next step is to determine whether additional seats have been made available. If additional seats have been made available, then these additional seats are added to the list of available.

If the patron that is identified by the re-allocation process is determined to be present in the theater, for example, via mobile telephone, wireless device, and/or manual verification, an optional sub-process determines whether the patron's optional profile is also satisfied with the available seating. If the optional subscriber profile is not satisfied, then the re-allocation process searches for another possible patron. If the optional profile sub-process is satisfied, then the eligible patron is notified via one or means, such as announcement, manually, wireless device, mobile telephone, bulletin board, and/or other means. The patron is then notified and presented with the option of moving for free, use of award points, additional money to the theater and/or patron to whose seat is being provided, or other predetermined criteria to obtain the seat. The patron, of course has the option to decline, and if so, the process continues and returns to the re-allocation process to attempt to locate another possible patron.

If the patron accepts, payment of money or other means may be effectuated on the spot via the wireless device, credit card, debit card, points, and the like, and the patron may now move to the other seat. The patron's seat may then optionally be made available as an empty seat to the re-allocation process. The process then optionally determines whether there have been additional vacancies, for example, just prior to the event, during the event or as a result of predetermined processes, and empties and/or makes available these additional seats for the event. For example, if standard smart card, standard scanner, standard bluetooth, wireless, or other technology is used in the present invention, additional seats may be made available as patrons leave the event early, for example if diverted for an urgent business meeting, and the like. These additional seats may provide additional opportunities for patron satisfaction, revenue (theater or patrons), advertising, advertising sponsorship for banner advertising on the wireless device and/or in the theater, and the like. Thus, scanners posted at strategic locations, for example, at the exit of the theater or stadium will confirm that the patron is leaving, and optionally prompt the patron to confirm that they do not plan on returning. This embodiment may optionally be used in other embodiments of the present invention, and vice versa.

If a predetermined period of time has not expired, then the re-allocation process may be run again to optionally continuously re-allocate seats while advantageously including the additional seats. The patron may optionally store the up-graded ticket on a wireless device for proof of entrance to the better seating area. Optionally, the seat and/or row and/or section, includes a separate reader device to receive optionally the original ticket that is now re-allocated to a better seat, or a new ticket that may optionally be received by the patron via the wireless device and/or manually via a worker in the theater or stadium.

Figure 33:
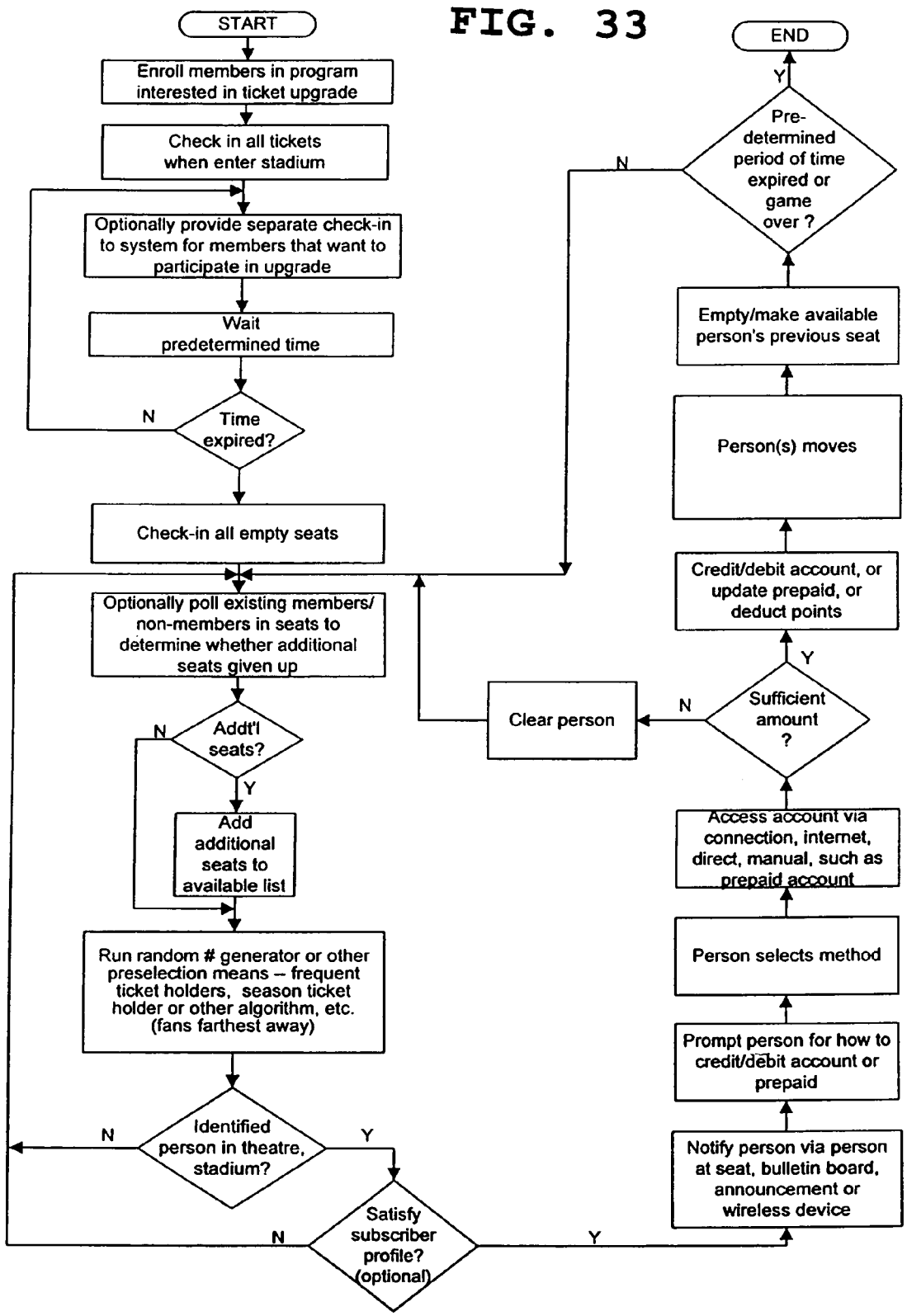

FIG. 33 is a flowchart of a sixth embodiment of the invention. In FIG. 33, the process begins by enrolling members in the program that are interested in the ticket upgrade. Tickets are checked in, for example, as the patrons enter the reserved seating area, such as a stadium or theater, through, for example, bar code readers, scanners, infrared readers, and/or manually or other method where the patron is checked in, either at the gate, seat or other location. An optional separate check in area is provided for patrons that want to participate in the upgrade program. For example, patrons can optionally check in a predetermined time before the event through a wireless device, Internet connection, manual or voice recognition telephone, or other manner. The important point is to provide a standard manner for allowing patrons to check in, and if the patron fails to check in using a predetermined procedure, to allow that seat to be provided to another willing patron in accordance with a process to be described below. The patron may check in either a predetermined time before or after the event begins. Currently, such a process is impossible and unthinkable in view of the difficulty reserved seating events have in simply getting the patrons seated prior to the beginning of the event. The present invention represents a revolutionary process to enhance event enjoyment, earn patron loyalty and optionally provide additional revenues to the theater/stadium or optionally other patrons with the desirable ticket.

The check in procedure continues for a predetermined period of time until a predetermined time period has expired, for example, 5 minutes before the event begins, 10 minutes after the event begins, after a predetermined event, such as the second act of a play, and the like. Once the predetermined time period or event has been completed, the check in procedure may be considered completed to begin the seat re-allocation process. To begin the seat re-allocation process, a re-allocation algorithm is used to re-assign seat for patrons that are willing or interested in different or better seats. Such re-allocation processes or algorithms may include a random process, a process where priority patrons are given priority for re-assignment of seat, a process where patrons are willing to pay additional for the re-assignment to either the theater or the individual patron whose seat is being provided to another patron, frequent event patrons, season ticket patrons, a standard bidding process, or other predetermined process.

An optional polling process to poll existing members and non-members in seats to whether additional seats are available. That is, in another optional embodiment of the present invention, non-members may also make their seats available for re-allocation/re-sale at any point in the process. In this additional polling process, the next step is to determine whether additional seats have been made available. If additional seats have been made available, then these additional seats are added to the list of available.

If the patron that is identified by the re-allocation process is determined to be present in the theater, for example, via mobile telephone, wireless device, and/or manual verification, an optional sub-process determines whether the patron's optional profile is also satisfied with the available seating. If the optional subscriber profile is not satisfied, then the re-allocation process searches for another possible patron. If the optional profile sub-process is satisfied, then the eligible patron is notified via one or means, such as announcement, manually, wireless device, mobile telephone, bulletin board, and/or other means. The patron is then notified and presented with the option of moving for free, use of award points, additional money to the theater and/or patron to whose seat is being provided, or other predetermined criteria to obtain the seat. Optionally, a bidding process may be initiated that allows various patrons to bid against one another. Any standard bidding process may optionally be used. The patron, of course has the option to decline, and if so, the process continues and returns to the re-allocation process to attempt to locate another possible patron.

The patron is prompted for the method of obtaining the tickets, such as a payment method, such as credit card, debit card, cash, point redemption, or optionally a gift/prize. The patron subsequently selects a payment method. The patron's account is debited at a future time, or optionally immediately via connection to a standard clearinghouse network, such as visa network, master card network or other network via direct connection or via the Internet, and the like. If sufficient funds do not exist, then the person is cleared or rejected from the opportunity for the seat re-allocation/upgrade process. If sufficient funds do exist, then the patron's account is debited or points deducted. Alternatively, one person may purchase the upgrade on behalf of another person.

The patron then moves to the new seat, and the system then clears the patron's old seat from the system to optionally provide re-allocation of the previous seat. As indicated previously, if the patron accepts, payment of money or other means may be effectuated on the spot via the wireless device, credit card, debit card, points, and the like, and the patron may now move to the other seat. The patron's seat may then optionally be made available as an empty seat to the re-allocation process. If a predetermined period of time has not expired, then the re-allocation process may be run again to optionally continuously re-allocate seats. The patron may optionally store the up-graded ticket on a wireless device for proof of entrance to the better seating area. Optionally, the seat and/or row and/or section, includes a separate reader device to receive optionally the original ticket that is now re-allocated to a better seat, or a new ticket that may optionally be received by the patron via the wireless device and/or manually via a worker in the theater or stadium.

Figure 34:
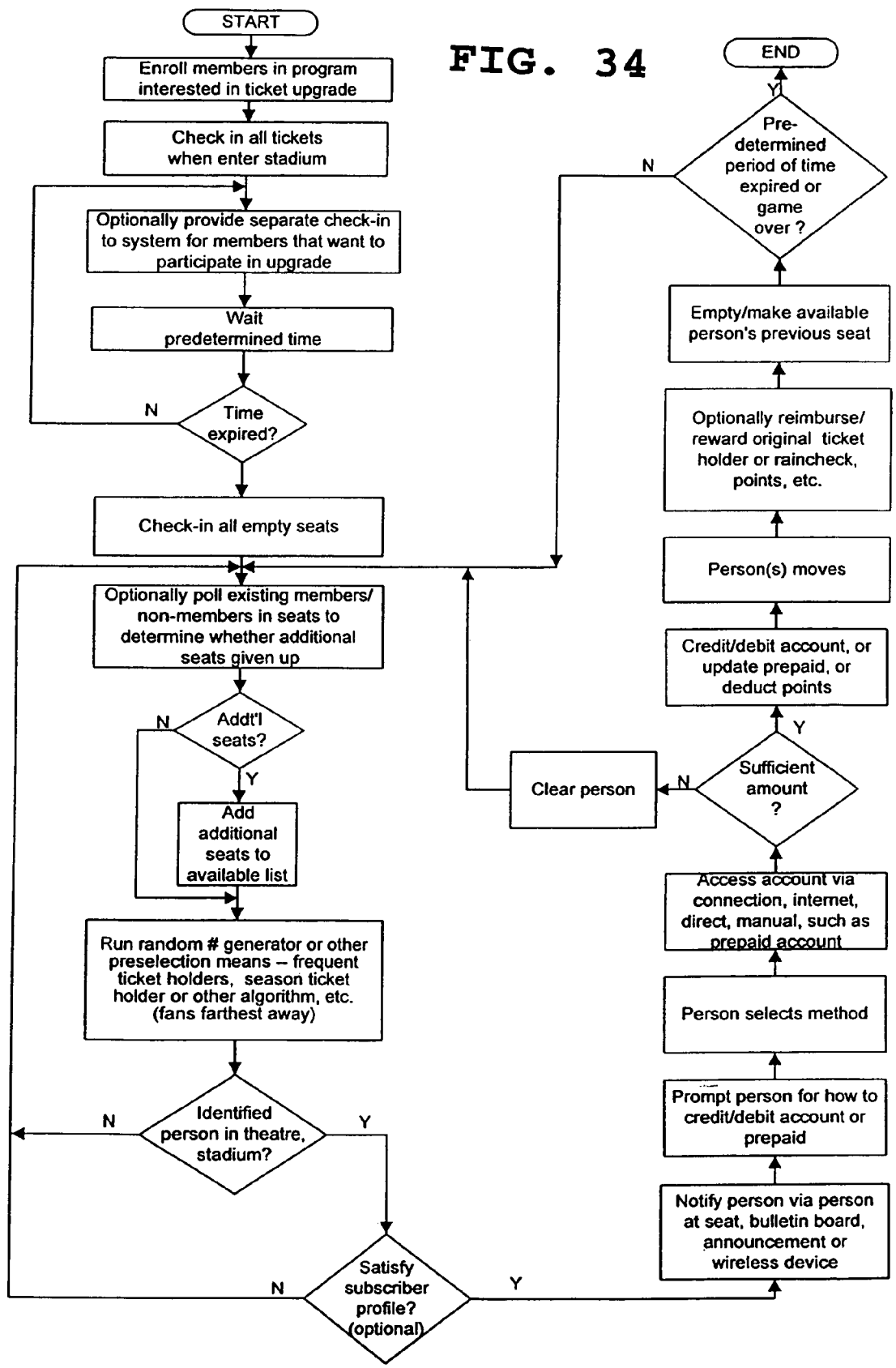

FIG. 34 is a flowchart of a seventh embodiment of the invention. In FIG. 34, the process begins by enrolling members in the program that are interested in the ticket upgrade. Tickets are checked in, for example, as the patrons enter the reserved seating area, such as a stadium or theater, through, for example, bar code readers, scanners, infrared readers, and/or manually or other method where the patron is checked in, either at the gate, seat or other location. An optional separate check in area is provided for patrons that want to participate in the upgrade program. For example, patrons can optionally check in a predetermined time before the event through a wireless device, Internet connection, manual or voice recognition telephone, or other manner. The important point is to provide a standard manner for allowing patrons to check in, and if the patron fails to check in using a predetermined procedure, to allow that seat to be provided to another willing patron in accordance with a process to be described below. Currently, such a process is impossible and unthinkable in view of the difficulty reserved seating events have in simply getting the patrons seated prior to the beginning of the event. The present invention represents a revolutionary process to enhance event enjoyment, earn patron loyalty and optionally provide additional revenues to the theater/stadium or optionally other patrons with the desirable ticket.

The check in procedure continues for a predetermined period of time until a predetermined time period has expired, for example, 5 minutes before the event begins, 10 minutes after the event begins, after a predetermined event, such as the second act of a play, and the like. Once the predetermined time period or event has been completed, the check in procedure may be considered completed to begin the seat re-allocation process. To begin the seat re-allocation process, a re-allocation algorithm is used to re-assign seat for patrons that are willing or interested in different or better seats. Such re-allocation processes or algorithms may include a random process, a process where priority patrons are given priority for re-assignment of seat, a process where patrons are willing to pay additional for the re-assignment to either the theater or the individual patron whose seat is being provided to another patron, frequent event patrons, season ticket patrons, a standard bidding process, or other predetermined process.

An optional polling process to poll existing members and non-members in seats to whether additional seats are available. That is, in another optional embodiment of the present invention, non-members may also make their seats available for re-allocation/re-sale at any point in the process. In this additional polling process, the next step is to determine whether additional seats have been made available. If additional seats have been made available, then these additional seats are added to the list of available.

If the patron that is identified by the re-allocation process is determined to be present in the theater, for example, via mobile telephone, wireless device, and/or manual verification, an optional sub-process determines whether the patron's optional profile is also satisfied with the available seating. If the optional subscriber profile is not satisfied, then the re-allocation process searches for another possible patron. If the optional profile sub-process is satisfied, then the eligible patron is notified via one or means, such as announcement, manually, wireless device, mobile telephone, bulletin board, and/or other means. The patron is then notified and presented with the option of moving for free, use of award points, additional money to the theater and/or patron to whose seat is being provided, or other predetermined criteria to obtain the seat. The patron, of course has the option to decline, and if so, the process continues and returns to the re-allocation process to attempt to locate another possible patron.

The patron is prompted for the method of obtaining the tickets, such as a payment method, such as credit card, debit card, cash, point redemption, or optionally a gift/prize. The patron subsequently selects a payment method. The patron's account is debited at a future time, or optionally immediately via connection to a standard clearinghouse network, such as visa network, master card network or other network via direct connection or via the Internet, and the like.

If sufficient funds do not exist, then the person is cleared or rejected from the opportunity for the seat re-allocation/upgrade process. If sufficient funds do exist, then the patron's account is debited or points deducted. Alternatively, one person may purchase the upgrade on behalf of another person.

The patron then moves to the new seat, and the system then clears the patron's old seat from the system to optionally provide re-allocation of the previous seat. As indicated previously, if the patron accepts, payment of money or other means may be effectuated on the spot via the wireless device, credit card, debit card, points, and the like, and the patron may now move to the other seat. In addition, the original ticket holder is optionally reimbursed with award points, a percentage of the revenue, a flat fee, an additional event ticket that might also be upgradable, and/or any other means for rewarding the original ticket holder. The patron's seat may then optionally be made available as an empty seat to the re-allocation process. If a predetermined period of time has not expired, then the re-allocation process may be run again to optionally continuously re-allocate seats. The patron may optionally store the up-graded ticket on a wireless device for proof of entrance to the better seating area. Optionally, the seat and/or row and/or section, includes a separate reader device to receive optionally the original ticket that is now re-allocated to a better seat, or a new ticket that may optionally be received by the patron via the wireless device and/or manually via a worker in the theater or stadium.

Figure 35:
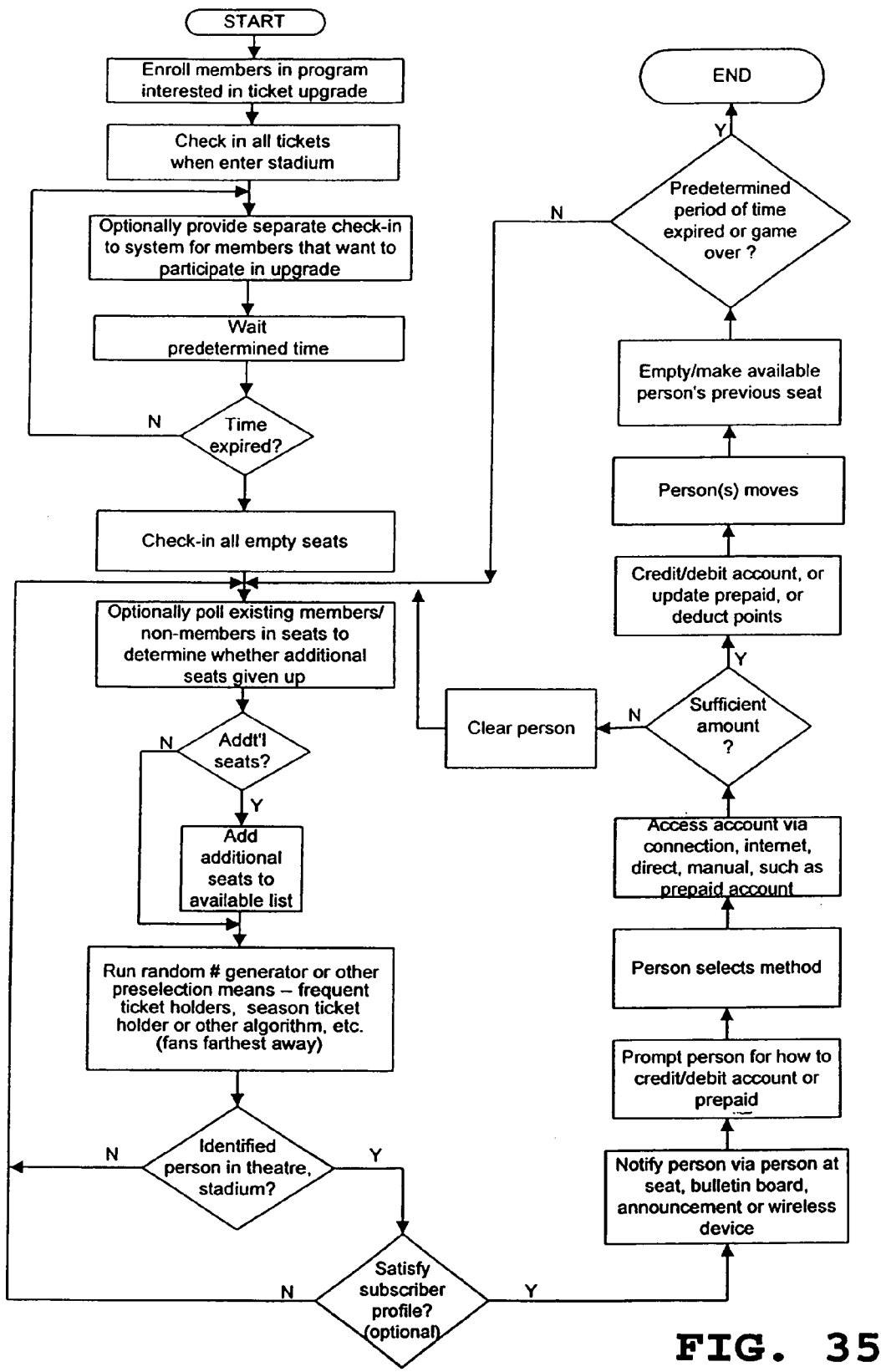

FIG. 35 is a flowchart of an eighth embodiment of the invention. In FIG. 35, the process begins by enrolling members in the program that are interested in the ticket upgrade. Tickets are checked in, for example, as the patrons enter the reserved seating area, such as a stadium or theater, through, for example, bar code readers, scanners, infrared readers, and/or manually or other method where the patron is checked in, either at the gate, seat or other location. An optional separate check in area is provided for patrons that want to participate in the upgrade program. For example, patrons can optionally check in a predetermined time before the event through a wireless device, Internet connection, manual or voice recognition telephone, or other manner. The important point is to provide a standard manner for allowing patrons to check in, and if the patron fails to check in using a predetermined procedure, to allow that seat to be provided to another willing patron in accordance with a process to be described below. Currently, such a process is impossible and unthinkable in view of the difficulty reserved seating events have in simply getting the patrons seated prior to the beginning of the event. The present invention represents a revolutionary process to enhance event enjoyment, earn patron loyalty and optionally provide additional revenues to the theater/stadium or optionally other patrons with the desirable ticket.

The seat re-allocation process is used to re-assign seat for patrons that are willing or interested in different or better seats. Such re-allocation processes or algorithms may include a random process, a process where priority patrons are given priority for re-assignment of seat, a process where patrons are willing to pay additional for the re-assignment to either the theater or the individual patron whose seat is being provided to another patron, frequent event patrons, season ticket patrons, a standard bidding process, or other predetermined process. Simultaneously or subsequently, the check in procedure continues for a predetermined period of time until a predetermined time period has expired, for example, 5 minutes before the event begins, 10 minutes after the event begins, after a predetermined event, such as the second act of a play, and the like. Once the predetermined time period or event has been completed, the check in procedure may be considered completed to begin the seat re-allocation process.

An optional polling process to poll existing members and non-members in seats to whether additional seats are available. That is, in another optional embodiment of the present invention, non-members may also make their seats available for re-allocation/re-sale at any point in the process. In this additional polling process, the next step is to determine whether additional seats have been made available. If additional seats have been made available, then these additional seats are added to the list of available.

If the patron that is identified by the re-allocation process is determined to be present in the theater, for example, via mobile telephone, wireless device, and/or manual verification, an optional sub-process determines whether the patron's optional profile is also satisfied with the available seating. If the optional subscriber profile is not satisfied, then the re-allocation process searches for another possible patron. If the optional profile sub-process is satisfied, then the eligible patron is notified via one or means, such as announcement, manually, wireless device, mobile telephone, bulletin board, and/or other means. The patron is then notified and presented with the option of moving for free, use of award points, additional money to the theater and/or patron to whose seat is being provided, or other predetermined criteria to obtain the seat. The patron, of course has the option to decline, and if so, the process continues and returns to the re-allocation process to attempt to locate another possible patron.

The patron is prompted for the method of obtaining the tickets, such as a payment method, such as credit card, debit card, cash, point redemption, or optionally a gift/prize. The patron subsequently selects a payment method. The patron's account is debited at a future time, or optionally immediately via connection to a standard clearinghouse network, such as visa network, master card network or other network via direct connection or via the Internet, and the like. If sufficient funds do not exist, then the person is cleared or rejected from the opportunity for the seat re-allocation/upgrade process. If sufficient funds do exist, then the patron's account is debited or points deducted. Alternatively, one person may purchase the upgrade on behalf of another person.

The patron then moves to the new seat, and the system then clears the patron's old seat from the system to optionally provide re-allocation of the previous seat. As indicated previously, if the patron accepts, payment of money or other means may be effectuated on the spot via the wireless device, credit card, debit card, points, and the like, and the patron may now move to the other seat. The patron's seat may then optionally be made available as an empty seat to the re-allocation process. If a predetermined period of time has not expired, then the re-allocation process may be run again to optionally continuously re-allocate seats. The patron may optionally store the up-graded ticket on a wireless device for proof of entrance to the better seating area. Optionally, the seat and/or row and/or section, includes a separate reader device to receive optionally the original ticket that is now re-allocated to a better seat, or a new ticket that may optionally be received by the patron via the wireless device and/or manually via a worker in the theater or stadium.

Figure 36:
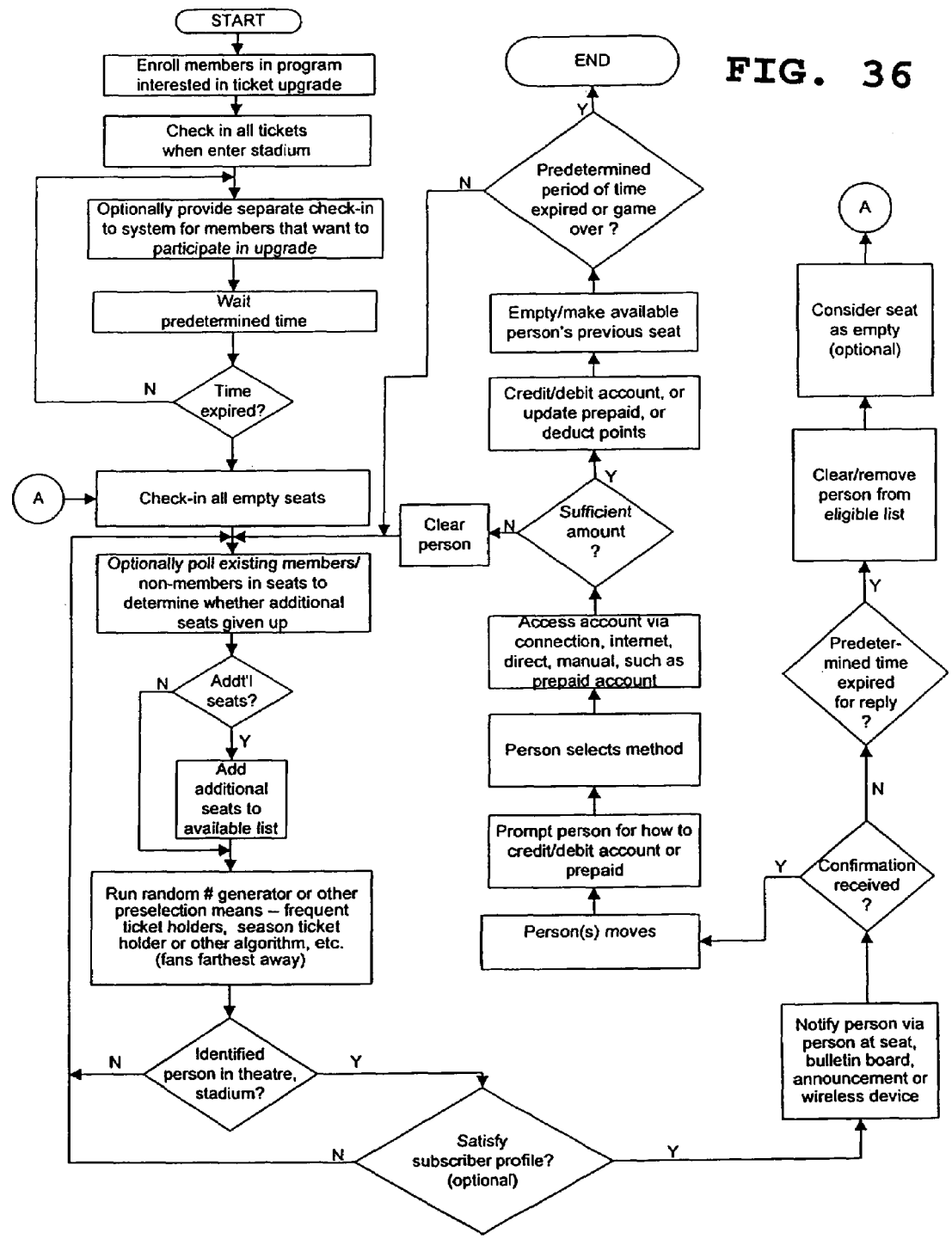

FIG. 36 is a flowchart of a ninth embodiment of the invention. In FIG. 36, the process begins by enrolling members in the program that are interested in the ticket upgrade. Tickets are checked in, for example, as the patrons enter the reserved seating area, such as a stadium or theater, through, for example, bar code readers, scanners, infrared readers, and/or manually or other method where the patron is checked in, either at the gate, seat or other location. An optional separate check in area is provided for patrons that want to participate in the upgrade program. For example, patrons can optionally check in a predetermined time before the event through a wireless device, Internet connection, manual or voice recognition telephone, or other manner. The important point is to provide a standard manner for allowing patrons to check in, and if the patron fails to check in using a predetermined procedure, to allow that seat to be provided to another willing patron in accordance with a process to be described below. Currently, such a process is impossible and unthinkable in view of the difficulty reserved seating events have in simply getting the patrons seated prior to the beginning of the event. The present invention represents a revolutionary process to enhance event enjoyment, earn patron loyalty and optionally provide additional revenues to the theater/stadium or optionally other patrons with the desirable ticket.

The check in procedure continues for a predetermined period of time until a predetermined time period has expired, for example, 5 minutes before the event begins, 10 minutes after the event begins, after a predetermined event, such as the second act of a play, and the like. Once the predetermined time period or event has been completed, the check in procedure may be considered completed to begin the seat re-allocation process. To begin the seat re-allocation process, a re-allocation algorithm is used to re-assign seat for patrons that are willing or interested in different or better seats. Such re-allocation processes or algorithms may include a random process, a process where priority patrons are given priority for re-assignment of seat, a process where patrons are willing to pay additional for the re-assignment to either the theater or the individual patron whose seat is being provided to another patron, frequent event patrons, season ticket patrons, a standard bidding process, or other predetermined process.

An optional polling process to poll existing members and non-members in seats to whether additional seats are available. That is, in another optional embodiment of the present invention, non-members may also make their seats available for re-allocation/re-sale at any point in the process. In this additional polling process, the next step is to determine whether additional seats have been made available. If additional seats have been made available, then these additional seats are added to the list of available.

If the patron that is identified by the re-allocation process is determined to be present in the theater, for example, via mobile telephone, wireless device, and/or manual verification, an optional sub-process determines whether the patron's optional profile is also satisfied with the available seating. If the optional subscriber profile is not satisfied, then the re-allocation process searches for another possible patron. If the optional profile sub-process is satisfied, then the eligible patron is notified via one or means, such as announcement, manually, wireless device, mobile telephone, bulletin board, and/or other means. The patron is then notified and presented with the option of moving for free, use of award points, additional money to the theater and/or patron to whose seat is being provided, or other predetermined criteria to obtain the seat. The patron, of course has the option to decline, and if so, the process continues and returns to the re-allocation process to attempt to locate another possible patron.

The patron is prompted for the method of obtaining the tickets, such as a payment method, such as credit card, debit card, cash, point redemption, or optionally a gift/prize. The patron subsequently selects a payment method. The patron's account is debited at a future time, or optionally immediately via connection to a standard clearinghouse network, such as visa network, master card network or other network via direct connection or via the Internet, and the like. If sufficient funds do not exist, then the person is cleared or rejected from the opportunity for the seat re-allocation/upgrade process. If sufficient funds do exist, then the patron's account is debited or points deducted. Alternatively, one person may purchase the upgrade on behalf of another person.

The patron then moves to the new seat, and the system then clears the patron's old seat from the system to optionally provide re-allocation of the previous seat.

If no confirmation is received from the patron for a predetermined period of time, the re-allocation process continues to wait until the predetermined period of time has expired. Once the predetermined period of time has expired and there is no response received from the patron provided with the option of changing their seat, the patron is cleared or removed from the eligible list, and the seat is considered or assigned empty status for the re-allocation algorithm to be again implemented.

As indicated previously, if the patron accepts and a confirmation is received, payment of money or other means may be effectuated on the spot via the wireless device, credit card, debit card, points, and the like, and the patron may now move to the other seat. The patron's seat may then optionally be made available as an empty seat to the re-allocation process. If a predetermined period of time has not expired, then the re-allocation process may be run again to optionally continuously re-allocate seats. The patron may optionally store the up-graded ticket on a wireless device for proof of entrance to the better seating area. Optionally, the seat and/or row and/or section, includes a separate reader device to receive optionally the original ticket that is now re-allocated to a better seat, or a new ticket that may optionally be received by the patron via the wireless device and/or manually via a worker in the theater or stadium.

Of course, to re-allocation algorithm does not have to be run or implemented one patron at a time, but may be run to re-allocate or re-assign a plurality of patrons. If one patron or higher priority patron does not accept, then the next already generated patron may be queried to determine whether the next patron desires the seat re-allocation. Further, the system optionally downloads instructions on how to get to the new location, and can provide step-by-step instructions using an optional standard global positioning system (GPS) incorporated in, or as a separate accessory to, the wireless device.

Figure 37:
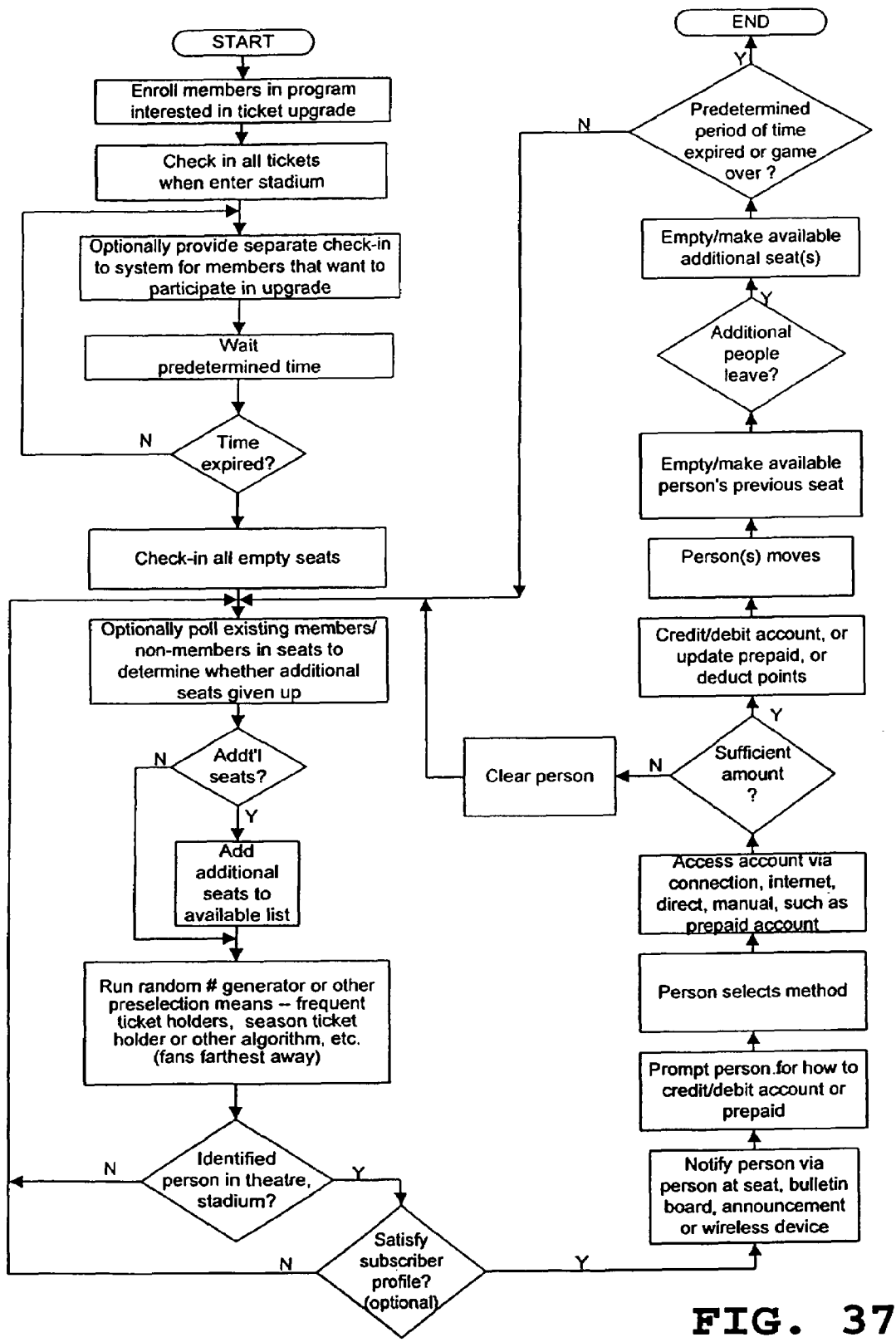

FIG. 37 is a flowchart of a tenth embodiment of the invention. In FIG. 37, the process begins by enrolling members in the program that are interested in the ticket upgrade. Tickets are checked in, for example, as the patrons enter the reserved seating area, such as a stadium or theater, through, for example, bar code readers, scanners, infrared readers, and/or manually or other method where the patron is checked in, either at the gate, seat or other location. An optional separate check in area is provided for patrons that want to participate in the upgrade program. For example, patrons can optionally check in a predetermined time before the event through a wireless device, Internet connection, manual or voice recognition telephone, or other manner. The important point is to provide a standard manner for allowing patrons to check in, and if the patron fails to check in using a predetermined procedure, to allow that seat to be provided to another willing patron in accordance with a process to be described below. Currently, such a process is impossible and unthinkable in view of the difficulty reserved seating events have in simply getting the patrons seated prior to the beginning of the event. The present invention represents a revolutionary process to enhance event enjoyment, earn patron loyalty and optionally provide additional revenues to the theater/stadium or optionally other patrons with the desirable ticket.

The check in procedure continues for a predetermined period of time until a predetermined time period has expired, for example, 5 minutes before the event begins, 10 minutes after the event begins, after a predetermined event, such as the second act of a play, and the like. Once the predetermined time period or event has been completed, the check in procedure may be considered completed to begin the seat re-allocation process. To begin the seat re-allocation process, a re-allocation algorithm is used to re-assign seat for patrons that are willing or interested in different or better seats. Such re-allocation processes or algorithms may include a random process, a process where priority patrons are given priority for re-assignment of seat, a process where patrons are willing to pay additional for the re-assignment to either the theater or the individual patron whose seat is being provided to another patron, frequent event patrons, season ticket patrons, a standard bidding process, or other predetermined process.

An optional polling process to poll existing members and non-members in seats to whether additional seats are available. That is, in another optional embodiment of the present invention, non-members may also make their seats available for re-allocation/re-sale at any point in the process. In this additional polling process, the next step is to determine whether additional seats have been made available. If additional seats have been made available, then these additional seats are added to the list of available.

If the patron that is identified by the re-allocation process is determined to be present in the theater, for example, via mobile telephone, wireless device, and/or manual verification, an optional sub-process determines whether the patron's optional profile is also satisfied with the available seating. If the optional subscriber profile is not satisfied, then the re-allocation process searches for another possible patron. If the optional profile sub-process is satisfied, then the eligible patron is notified via one or means, such as announcement, manually, wireless device, mobile telephone, bulletin board, and/or other means. The patron is then notified and presented with the option of moving for free, use of award points, additional money to the theater and/or patron to whose seat is being provided, or other predetermined criteria to obtain the seat. The patron, of course has the option to decline, and if so, the process continues and returns to the re-allocation process to attempt to locate another possible patron.

The patron is prompted for the method of obtaining the tickets, such as a payment method, such as credit card, debit card, cash, point redemption, or optionally a gift/prize. The patron subsequently selects a payment method. The patron's account is debited at a future time, or optionally immediately via connection to a standard clearinghouse network, such as visa network, master card network or other network via direct connection or via the Internet, and the like. If sufficient funds do not exist, then the person is cleared or rejected from the opportunity for the seat re-allocation/upgrade process. If sufficient funds do exist, then the patron's account is debited or points deducted. Alternatively, one person may purchase the upgrade on behalf of another person.

The patron then moves to the new seat, and the system then clears the patron's old seat from the system to optionally provide re-allocation of the previous seat. As indicated previously, if the patron accepts, payment of money or other means may be effectuated on the spot via the wireless device, credit card, debit card, points, and the like, and the patron may now move to the other seat. The patron's seat may then optionally be made available as an empty seat to the re-allocation process. The process then optionally determines whether there have been additional vacancies, for example, just prior to the event, during the event or as a result of predetermined processes, and empties and/or makes available these additional seats for the event. For example, if standard smart card, standard scanner, standard bluetooth, wireless, or other technology is used in the present invention, additional seats may be made available as patrons leave the event early, for example if diverted for an urgent business meeting, and the like. These additional seats may provide additional opportunities for patron satisfaction, revenue (theater or patrons), advertising, advertising sponsorship for banner advertising on the wireless device and/or in the theater, and the like. Thus, scanners posted at strategic locations, for example, at the exit of the theater or stadium will confirm that the patron is leaving, and optionally prompt the patron to confirm that they do not plan on returning. This embodiment may optionally be used in other embodiments of the present invention, and vice versa.

If a predetermined period of time has not expired, then the re-allocation process may be run again to optionally continuously re-allocate seats while advantageously including the additional seats. The patron may optionally store the up-graded ticket on a wireless device for proof of entrance to the better seating area. Optionally, the seat and/or row and/or section, includes a separate reader device to receive optionally the original ticket that is now re-allocated to a better seat, or a new ticket that may optionally be received by the patron via the wireless device and/or manually via a worker in the theater or stadium.

Figure 38:
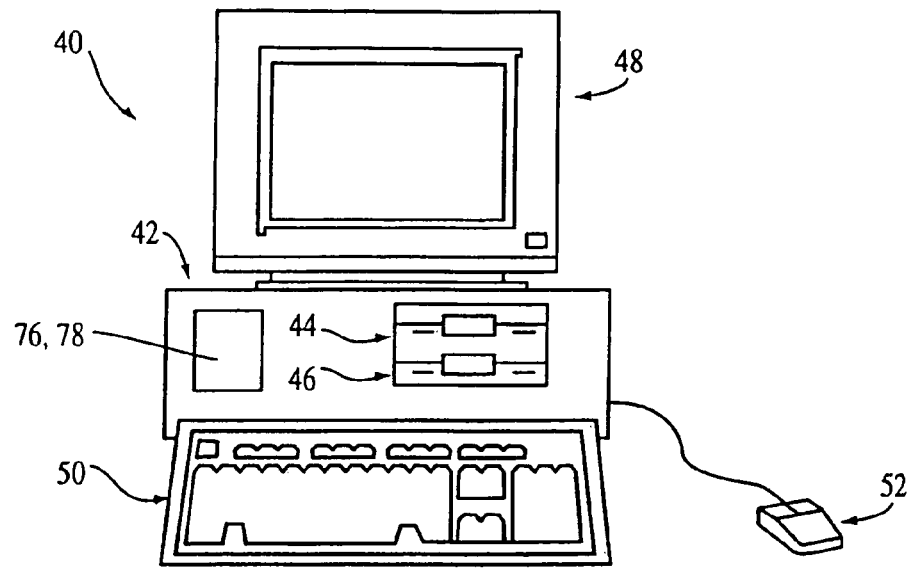
FIG. 38 is an illustration of a main central processing unit for implementing the computer processing in accordance with a computer implemented embodiment of the present invention.

FIG. 38 is an illustration of a main central processing unit for implementing the computer processing in accordance with a computer implemented embodiment of the present invention. The procedures described above may be presented in terms of program procedures executed on, for example, a computer or network of computers.

Viewed externally in FIG. 38, a computer system designated by reference numeral 40 has a central processing unit 42 having disk drives 44 and 46. Disk drive indications 44 and 46 are merely symbolic of a number of disk drives which might be accommodated by the computer system. Typically these would include a floppy disk drive such as 44, a hard disk drive (not shown externally) and a CD ROM indicated by slot 46. The number and type of drives varies, typically with different computer configurations. Disk drives 44 and 46 are in fact optional, and for space considerations, may easily be omitted from the computer system used in conjunction with the production process/apparatus described herein.

The computer also has an optional display 48 upon which information is displayed. In some situations, a keyboard 50 and a mouse 52 may be provided as input devices to interface with the central processing unit 42. Then again, for enhanced portability, the keyboard 50 may be either a limited function keyboard or omitted in its entirety. In addition, mouse 52 may be a touch pad control device, or a track ball device, or even omitted in its entirety as well. In addition, the computer system also optionally includes at least one infrared transmitter 76 and/or infrared receiver 78 for either transmitting and/or receiving infrared signals, as described below.

Figure 39:
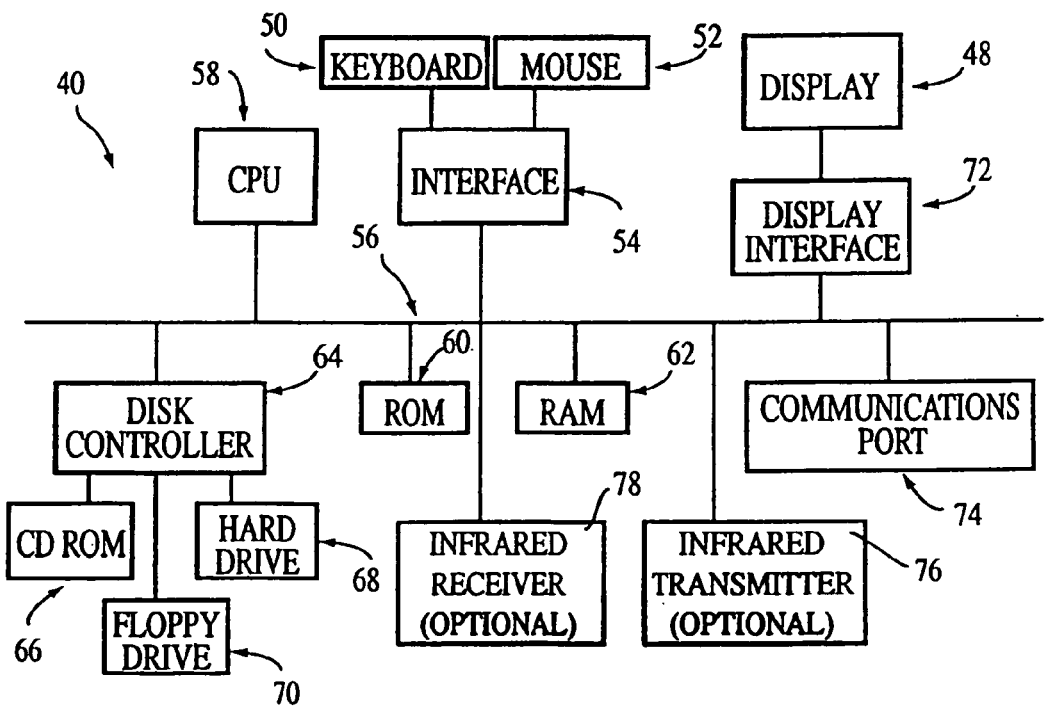
FIG. 39 illustrates a block diagram of the internal hardware of the computer of FIG. 38.

FIG. 39 illustrates a block diagram of the internal hardware of the computer of FIG. 38. A bus 56 serves as the main information highway interconnecting the other components of the computer. CPU 58 is the central processing unit of the system, performing calculations and logic operations required to execute a program. Read only memory (ROM) 60 and random access memory (RAM) 62 constitute the main memory of the computer. Disk controller 64 interfaces one or more disk drives to the system bus 56. These disk drives may be floppy disk drives such as 70, or CD ROM or DVD (digital video disks) drive such as 66, or internal or external hard drives 68. As indicated previously, these various disk drives and disk controllers are optional devices.

A display interface 72 interfaces display 48 and permits information from the bus 56 to be displayed on the display 48. Again as indicated, display 48 is also an optional accessory. For example, display 48 could be substituted or omitted. Communication with external devices, for example, the components of the apparatus described herein, occurs utilizing communication port 74. For example, optical fibers and/or electrical cables and/or conductors and/or optical communication (e.g., infrared, and the like) and/or wireless communication (e.g., radio frequency (RF), and the like) can be used as the transport medium between the external devices and communication port 74.

In addition to the standard components of the computer, the computer also optionally includes at least one of infrared transmitter 76 or infrared receiver 78. Infrared transmitter 76 is utilized when the computer system is used in conjunction with one or more of the processing components/stations that transmits/receives data via infrared signal transmission.

Figure 40:
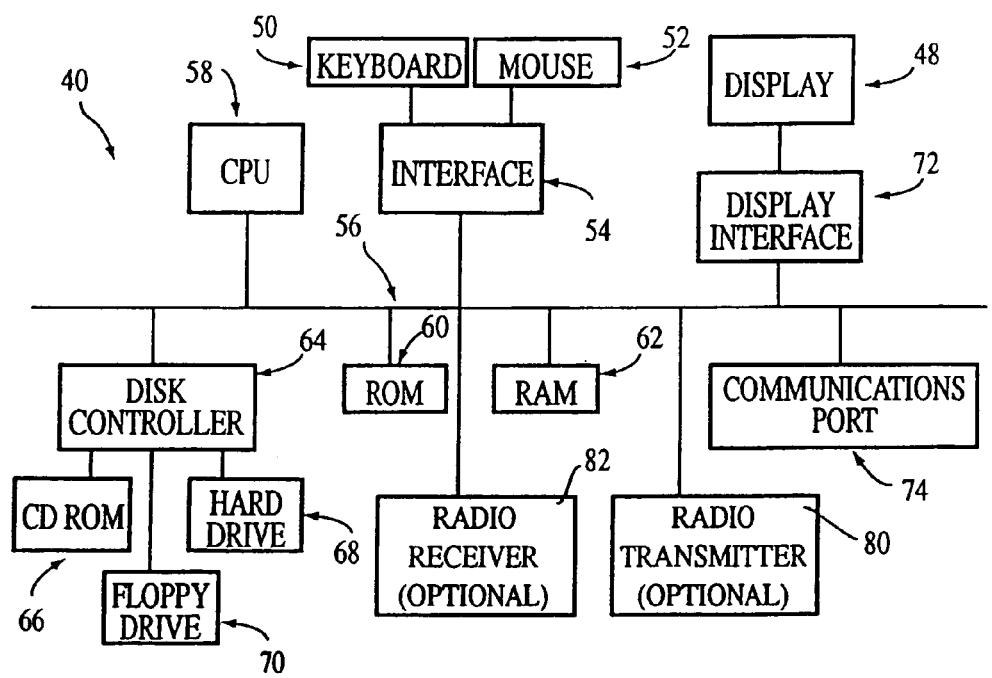
FIG. 40 is a block diagram of the internal hardware of the computer of FIG. 38 in accordance with a second embodiment.

FIG. 40 is a block diagram of the internal hardware of the computer of FIG. 38 in accordance with a second embodiment. In FIG. 40, instead of utilizing an infrared transmitter or infrared receiver, the computer system uses at least one of a low power radio transmitter 80 and/or a low power radio receiver 82. The low power radio transmitter 80 transmits the signal for reception by components of the production process, and receives signals from the components via the low power radio receiver 82. The low power radio transmitter and/or receiver 80, 82 are standard devices in industry.

Figure 41:
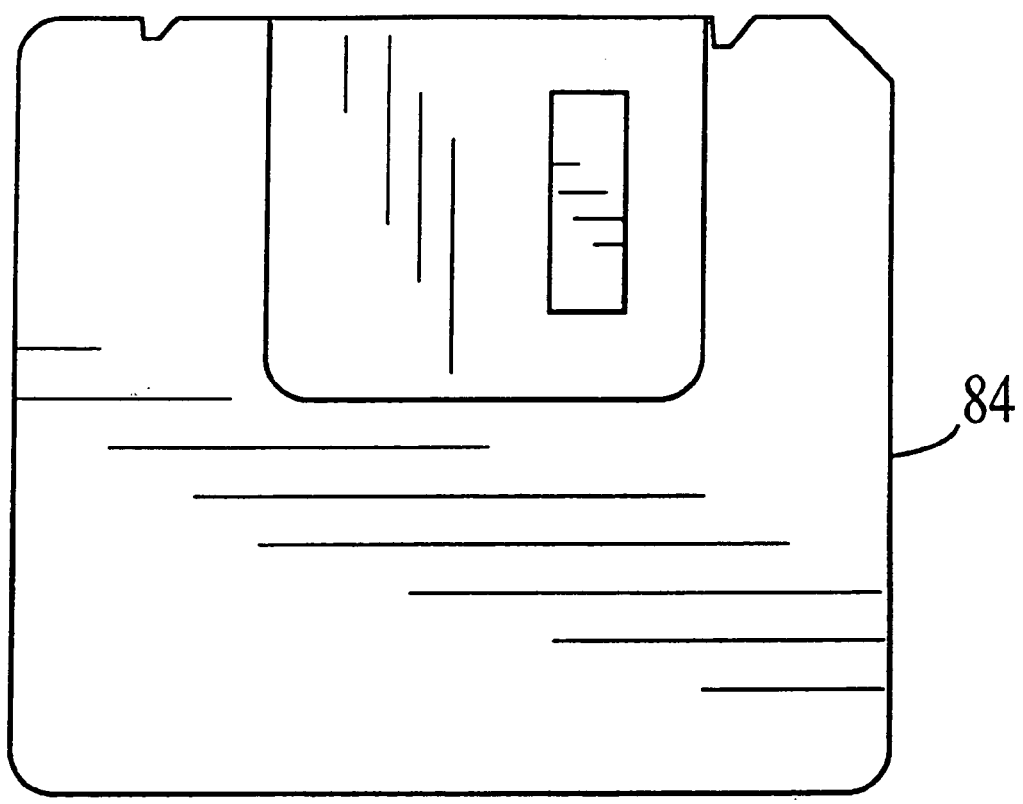
FIG. 41 is an illustration of an exemplary memory medium which can be used with disk drives illustrated in FIGS. 38–40.

FIG. 41 is an illustration of an exemplary memory medium which can be used with disk drives illustrated in FIGS. 38–40. Typically, memory media such as floppy disks, or a CD ROM, or a digital video disk will contain, for example, a multi-byte locale for a single byte language and the program information for controlling the computer to enable the computer to perform the functions described herein. Alternatively, ROM 60 and/or RAM 62 illustrated in FIGS. 37–38 can also be used to store the program information that is used to instruct the central processing unit 58 to perform the operations associated with the production process.

Although processing system 40 is illustrated having a single processor, a single hard disk drive and a single local memory, processing system 40 may suitably be equipped with any multitude or combination of processors or storage devices. Processing system 40 may, in point of fact, be replaced by, or combined with, any suitable processing system operative in accordance with the principles of the present invention, including sophisticated calculators, and hand-held, laptop/notebook, mini, mainframe and super computers, as well as processing system network combinations of the same.

Conventional processing system architecture is more fully discussed in *Computer Organization and Architecture*, by William Stallings, MacMillam Publishing Co. (3rd ed. 1993); conventional processing system network design is more fully discussed in *Data Network Design*, by Darren L. Spohn, McGraw-Hill, Inc. (1993), and conventional data communications is more fully discussed in *Data Communications Principles*, by R. D. Gitlin, J. F. Hayes and S. B. Weinstain, Plenum Press (1992) and in *The Irwin Handbook of Telecommunications*, by James Harry Green, Irwin Professional Publishing (2nd ed. 1992). Each of the foregoing publications is incorporated herein by reference.

Alternatively, the hardware configuration may be arranged according to the multiple instruction multiple data (MIMD) multiprocessor format for additional computing efficiency. The details of this form of computer architecture are disclosed in greater detail in, for example, U.S. Pat. No. 5,163,131; Boxer, A., Where Buses Cannot Go, IEEE Spectrum, February 1995, pp. 41–45; and Barroso, L. A. et al., RPM: A Rapid Prototyping Engine for Multiprocessor Systems, IEEE Computer February 1995, pp. 26–34, all of which are incorporated herein by reference.

In alternate preferred embodiments, the above-identified processor, and in particular microprocessing circuit 58, may be replaced by or combined with any other suitable processing circuits, including programmable logic devices, such as PALs (programmable array logic) and PLAs (programmable logic arrays), DSPs (digital signal processors), FPGAs (field programmable gate arrays), ASICs (application specific integrated circuits), VLSIs (very large scale integrated circuits) or the like.

Figure 42:
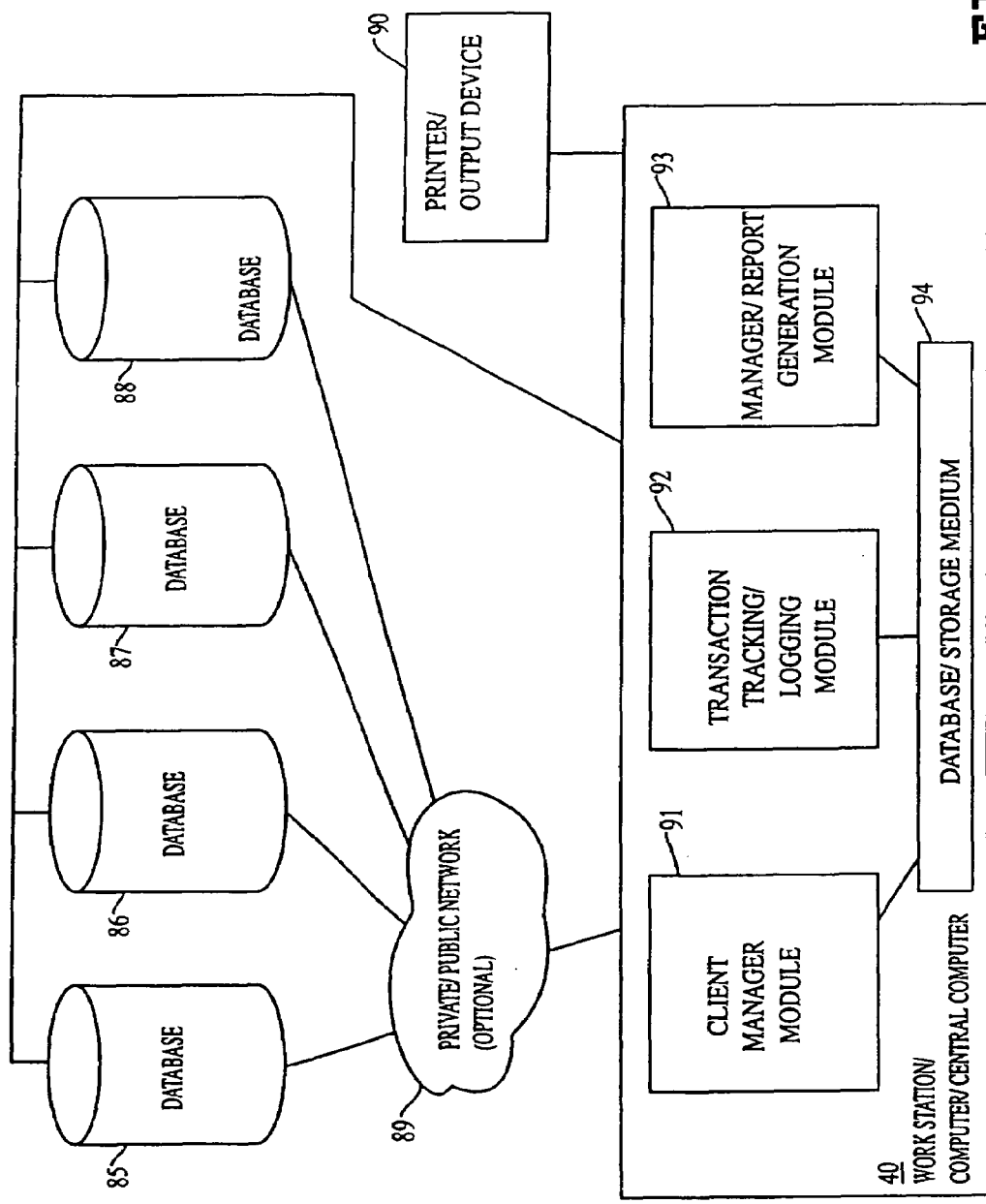
FIG. 42 is an illustration of the functional operation of the main central processing unit illustrated in FIGS. 38–41.

FIG. 42 is an illustration of the functional operation of the main central processing system illustrated in FIGS. 38–41. In FIG. 42, main central processing unit 40 interfaces with various external databases 85–88 to obtain the necessary information for tracking the performance of the resources. Main central processing unit 40 may be hardwired or directly connected to databases 85–88, or alternatively, access databases 85–88 via a private and/or public network 89.

Main central processing unit 40 is connected to an output device 90 for generating the report. The output device 90 may be a printer, or other output device such as a facsimile, electronic mail, and the like. Main central processing unit 40 includes, for example, a client manager module 91, such as Broker's Ally manufactured by Scherrer Resources, Inc. of Philadelphia, Pa. that may be modified to perform the functions described herein.

Main central processing unit 40 includes, for example, a transaction tracking or logging module 92, such as the functionality provided by the Excel Software package manufactured by Microsoft Corporation that may be modified to perform the functions described herein. Main central processing unit 40 also includes, for example, a manager/report generator module 91, such as Axys manufactured by Advent Software, Inc. of San Francisco, Calif., that may be modified to perform the functions described herein. Other suitable software packages are also available that may be modified to perform the functions described herein.

It should be noted that while the above process was described with reference to the figures, in essence, the various steps of the present invention are performed in hardware. Accordingly, each step of the present invention typically generates a physical electrical signal which represents a physical result of a specific step described in the flow charts. The flow charts represent physical electrical signals which are generated and used in subsequent steps of the process. Therefore, the flowcharts represent the transforming of physical electrical signals representing physical characteristics and quantities into other physical electrical signals also representing transformed physical characteristics.

The Internet is not a physical or tangible entity, but rather a giant network which interconnects innumerable smaller groups of linked computer networks. It is thus a network of networks. This is best understood if one considers what a linked group of computers—referred to here as a "network"—is, and what it does. Small networks are now ubiquitous (and are often called "local area networks"). For example, in many United States Courthouses, computers are linked to each other for the purpose of exchanging files and messages (and to share equipment such as printers). These are networks.

Some networks are "closed" networks, not linked to other computers or networks. Many networks, however, are connected to other networks, which are in turn connected to other networks in a manner which permits each computer in any network to communicate with computers on any other network in the system. This global Web of linked networks and computers is referred to as the Internet.

The nature of the Internet is such that it is very difficult, if not impossible, to determine its size at a given moment. It is indisputable, however, that the Internet has experienced extraordinary growth in recent years. In 1981, fewer than 300 computers were linked to the Internet, and by 1989, the number stood at fewer than 90,000 computers. By 1993, over 1,000,000 computers were linked. Today, over 9,400,000 host computers worldwide, of which approximately 60 percent located within the United States, are estimated to be linked to the Internet. This count does not include the personal computers people use to access the Internet using modems. In all, reasonable estimates are that as many as 40 million people around the world can and do access the enormously flexible communication Internet medium. That figure is expected to grow to 200 million Internet users by the year 1999.

Some of the computers and computer networks that make up the Internet are owned by governmental and public institutions, some are owned by non-profit organizations, and some are privately owned. The resulting whole is a decentralized, global medium of communications—or "cyberspace"—that links people, institutions, corporations, and governments around the world. The Internet is an international system. This communications medium allows any of the literally tens of millions of people with access to the Internet to exchange information. These communications can occur almost instantaneously, and can be directed either to specific individuals, to a broader group of people interested in a particular subject, or to the world as a whole.

The Internet had its origins in 1969 as an experimental project of the Advanced Research Project Agency ("ARPA"), and was called ARPANET. This network linked computers and computer networks owned by the military, defense contractors, and university laboratories conducting defense-related research. The network later allowed researchers across the country to access directly and to use extremely powerful supercomputers located at a few key universities and laboratories. As it evolved far beyond its research origins in the United States to encompass universities, corporations, and people around the world, the ARPANET came to be called the "DARPA Internet," and finally just the "Internet."

From its inception, the network was designed to be a decentralized, self-maintaining series of redundant links between computers and computer networks, capable of rapidly transmitting communications without direct human involvement or control, and with the automatic ability to re-route communications if one or more individual links were damaged or otherwise unavailable. Among other goals, this redundant system of linked computers was designed to allow vital research and communications to continue even if portions of the network were damaged, say, in a war.

To achieve this resilient nationwide (and ultimately global) communications medium, the ARPANET encouraged the creation of multiple links to and from each computer (or computer network) on the network. Thus, a computer located in Washington, D.C., might be linked (usually using dedicated telephone lines) to other computers in neighboring states or on the Eastern seaboard. Each of those computers could in turn be linked to other computers, which themselves would be linked to other computers.

A communication sent over this redundant series of linked computers could travel any of a number of routes to its destination. Thus, a message sent from a computer in Washington, D.C., to a computer in Palo Alto, Calif., might first be sent to a computer in Philadelphia, and then be forwarded to a computer in Pittsburgh, and then to Chicago, Denver, and Salt Lake City, before finally reaching Palo Alto. If the message could not travel along that path (because of military attack, simple technical malfunction, or other reason), the message would automatically (without human intervention or even knowledge) be re-routed, perhaps, from Washington, D.C. to Richmond, and then to Atlanta, New Orleans, Dallas, Albuquerque, Los Angeles, and finally to Palo Alto. This type of transmission, and re-routing, would likely occur in a matter of seconds.

Messages between computers on the Internet do not necessarily travel entirely along the same path. The Internet uses "packet switching" communication protocols that allow individual messages to be subdivided into smaller "packets" that are then sent independently to the destination, and are then automatically reassembled by the receiving computer. While all packets of a given message often travel along the same path to the destination, if computers along the route become overloaded, then packets can be re-routed to less loaded computers.

At the same time that ARPANET was maturing (it subsequently ceased to exist), similar networks developed to link universities, research facilities, businesses, and individuals around the world. These other formal or loose networks included BITNET, CSNET, FIDONET, and USENET. Eventually, each of these networks (many of which overlapped) were themselves linked together, allowing users of any computers linked to any one of the networks to transmit communications to users of computers on other networks. It is this series of linked networks (themselves linking computers and computer networks) that is today commonly known as the Internet.

No single entity—academic, corporate, governmental, or non-profit—administers the Internet. It exists and functions as a result of the fact that hundreds of thousands of separate operators of computers and computer networks independently decided to use common data transfer protocols to exchange communications and information with other computers (which in turn exchange communications and information with still other computers). There is no centralized storage location, control point, or communications channel for the Internet, and it would not be technically feasible for a single entity to control all of the information conveyed on the Internet.

How Individuals Access the Internet

Individuals have a wide variety of avenues to access cyberspace in general, and the Internet in particular. In terms of physical access, there are two common methods to establish an actual link to the Internet. First, one can use a computer or computer terminal that is directly (and usually permanently) connected to a computer network that is itself directly or indirectly connected to the Internet. Second, one can use a "personal computer" with a "modem" to connect over a telephone line to a larger computer or computer network that is itself directly or indirectly connected to the Internet. As detailed below, both direct and modem connections are made available to people by a wide variety of academic, governmental, or commercial entities.

Students, faculty, researchers, and others affiliated with the vast majority of colleges and universities in the United States can access the Internet through their educational institutions. Such access is often via direct connection using computers located in campus libraries, offices, or computer centers, or may be through telephone access using a modem from a student's or professor's campus or off-campus location. Some colleges and universities install "ports" or outlets for direct network connections in each dormitory room or provide access via computers located in common areas in dormitories. Such access enables students and professors to use information and content provided by the college or university itself, and to use the vast amount of research resources and other information available on the Internet worldwide.

Similarly, Internet resources and access are sufficiently important to many corporations and other employers that those employers link their office computer networks to the Internet and provide employees with direct or modem access to the office network (and thus to the Internet). Such access might be used by, for example, a corporation involved in scientific or medical research or manufacturing to enable corporate employees to exchange information and ideas with academic researchers in their fields.

Those who lack access to the Internet through their schools or employers still have a variety of ways they can access the Internet. Many communities across the country have established "free-nets" or community networks to provide their citizens with a local link to the Internet (and to provide local-oriented content and discussion groups). The first such community network, the Cleveland Free-Net Community Computer System, was established in 1986, and free-nets now exist in scores of communities as diverse as Richmond, Va., Tallahassee, Fla., Seattle, Wash., and San Diego, Calif. Individuals typically can access free-nets at little or no cost via modem connection or by using computers available in community buildings. Free-nets are often operated by a local library, educational institution, or non-profit community group.

Individuals can also access the Internet through many local libraries. Libraries often offer patrons use of computers that are linked to the Internet. In addition, some libraries offer telephone modem access to the libraries' computers, which are themselves connected to the Internet. Increasingly, patrons now use library services and resources without ever physically entering the library itself. Libraries typically provide such direct or modem access at no cost to the individual user.

Individuals can also access the Internet by patronizing an increasing number of storefront "computer coffee shops," where customers—while they drink their coffee—can use computers provided by the shop to access the Internet. Such Internet access is typically provided by the shop for a small hourly fee.

Individuals can also access the Internet through commercial and non-commercial "Internet service providers" that typically offer modem telephone access to a computer or computer network linked to the Internet. Many such providers are commercial entities offering Internet access for a monthly or hourly fee. Some Internet service providers, however, are non-profit organizations that offer free or very low cost access to the Internet. For example, the International Internet Association offers free modem access to the Internet upon request. Also, a number of trade or other non-profit associations offer Internet access as a service to members.

Another common way for individuals to access the Internet is through one of the major national commercial "online services" such as America Online, CompuServe, the Microsoft Network, or Prodigy. These online services offer nationwide computer networks (so that subscribers can dial-in to a local telephone number), and the services provide extensive and well organized content within their own proprietary computer networks. In addition to allowing access to the extensive content available within each online service, the services also allow subscribers to link to the much larger resources of the Internet. Full access to the online service (including access to the Internet) can be obtained for modest monthly or hourly fees. The major commercial online services have almost twelve million individual subscribers across the United States.

In addition to using the national commercial online services, individuals can also access the Internet using some (but not all) of the thousands of local dial-in computer services, often called "bulletin board systems" or "BBSs." With an investment of as little as $ 2,000.00 and the cost of a telephone line, individuals, non-profit organizations, advocacy groups, and businesses can offer their own dial-in computer "bulletin board" service where friends, members, subscribers, or customers can exchange ideas and information. BBSs range from single computers with only one telephone line into the computer (allowing only one user at a time), to single computers with many telephone lines into the computer (allowing multiple simultaneous users), to multiple linked computers each servicing multiple dial-in telephone lines (allowing multiple simultaneous users). Some (but not all) of these BBS systems offer direct or indirect links to the Internet. Some BBS systems charge users a nominal fee for access, while many others are free to the individual users.

Although commercial access to the Internet is growing rapidly, many users of the Internet—such as college students and staff—do not individually pay for access (except to the extent, for example, that the cost of computer services is a component of college tuition). These and other Internet users can access the Internet without paying for such access with a credit card or other form of payment.

Methods to Communicate Over the Internet

Once one has access to the Internet, there are a wide variety of different methods of communication and information exchange over the network. These many methods of communication and information retrieval are constantly evolving and are therefore difficult to categorize concisely. The most common methods of communications on the Internet (as well as within the major online services) can be roughly grouped into six categories:

(1) one-to-one messaging (such as "e-mail"),
(2) one-to-many messaging (such as "listserv"),
(3) distributed message databases (such as "USENET newsgroups"),
(4) real time communication (such as "Internet Relay Chat"),
(5) real time remote computer utilization (such as "telnet"),
(6) remote information retrieval (such as "ftp," "gopher," and the "World Wide Web").

Most of these methods of communication can be used to transmit text, data, computer programs, sound, visual images (i.e., pictures), and moving video images.

One-to-one messaging. One method of communication on the Internet is via electronic mail, or "e-mail," comparable in principle to sending a first class letter. One can address and transmit a message to one or more other people. E-mail on the Internet is not routed through a central control point, and can take many and varying paths to the recipients. Unlike postal mail, simple e-mail generally is not "sealed" or secure, and can be accessed or viewed on intermediate computers between the sender and recipient (unless the message is encrypted).

One-to-many messaging. The Internet also contains automatic mailing list services (such as "listservs"), that allow communications about particular subjects of interest to a group of people. For example, people can subscribe to a "listserv" mailing list on a particular topic of interest to them. The subscriber can submit messages on the topic to the listserv that are forwarded (via e-mail), either automatically or through a human moderator overseeing the listserv, to anyone who has subscribed to the mailing list. A recipient of such a message can reply to the message and have the reply also distributed to everyone on the mailing list. This service provides the capability to keep abreast of developments or events in a particular subject area.

Most listserv-type mailing lists automatically forward all incoming messages to all mailing list subscribers. There are thousands of such mailing list services on the Internet, collectively with hundreds of thousands of subscribers. Users of "open" listservs typically can add or remove their names from the mailing list automatically, with no direct human involvement. Listservs may also be "closed," i.e., only allowing for one's acceptance into the listserv by a human moderator.

Distributed message databases. Similar in function to listservs—but quite different in how communications are transmitted—are distributed message databases such as "USENET newsgroups." User-sponsored newsgroups are among the most popular and widespread applications of Internet services, and cover all imaginable topics of interest to users. Like listservs, newsgroups are open discussions and exchanges on particular topics. Users, however, need not subscribe to the discussion mailing list in advance, but can instead access the database at any time. Some USENET newsgroups are "moderated" but most are open access. For the moderated newsgroups, n10 all messages to the newsgroup are forwarded to one person who can screen them for relevance to the topics under discussion. USENET newsgroups are disseminated using ad hoc, peer to peer connections between approximately 200,000 computers (called USENET "servers") around the world. For unmoderated newsgroups, when an individual user with access to a USENET server posts a message to a newsgroup, the message is automatically forwarded to all adjacent USENET servers that furnish access to the newsgroup, and it is then propagated to the servers adjacent to those servers, etc. The messages are temporarily stored on each receiving server, where they are available for review and response by individual users. The messages are automatically and periodically purged from each system after a time to make room for new messages. Responses to messages, like the original messages, are automatically distributed to all other computers receiving the newsgroup or forwarded to a moderator in the case of a moderated newsgroup. The dissemination of messages to USENET servers around the world is an automated process that does not require direct human intervention or review.

There are newsgroups on more than fifteen thousand different subjects. In 1994, approximately 70,000 messages were posted to newsgroups each day, and those messages were distributed to the approximately 190,000 computers or computer networks that participate in the USENET newsgroup system. Once the messages reach the approximately 190,000 receiving computers or computer networks, they are available to individual users of those computers or computer networks. Collectively, almost 100,000 new messages (or "articles") are posted to newsgroups each day.

Real time communication. In addition to transmitting messages that can be later read or accessed, individuals on the Internet can engage in an immediate dialog, in "real time", with other people on the Internet. In its simplest forms, "talk" allows one-to-one communications and "Internet Relay Chat" (or IRC) allows two or more to type messages to each other that almost immediately appear on the others' computer screens. IRC is analogous to a telephone party line, using a computer and keyboard rather than a telephone. With IRC, however, at any one time there are thousands of different party lines available, in which collectively tens of thousands of users are engaging in conversations on a huge range of subjects. Moreover, one can create a new party line to discuss a different topic at any time. Some IRC conversations are "moderated" or include "channel operators."

In addition, commercial online services such as America Online, CompuServe, the Microsoft Network, and Prodigy have their own "chat" systems allowing their members to converse.

Real time remote computer utilization. Another method to use information on the Internet is to access and control remote computers in "real time" using "telnet." For example, using telnet, a researcher at a university would be able to use the computing power of a supercomputer located at a different university. A student can use telnet to connect to a remote library to access the library's online card catalog program.

Remote information retrieval. The final major category of communication may be the most well known use of the Internet—the search for and retrieval of information located on remote computers. There are three primary methods to locate and retrieve information on the Internet.

A simple method uses "ftp" (or file transfer protocol) to list the names of computer files available on a remote computer, and to transfer one or more of those files to an individual's local computer.

Another approach uses a program and format named "gopher" to guide an individual's search through the resources available on a remote computer.

The World Wide Web

A third approach, and fast becoming the most well-known on the Internet, is the "World Wide Web." The Web utilizes a "hypertext" formatting language called hypertext markup language (HTML), and programs that "browse" the Web can display HTML documents containing text, images, sound, animation and moving video. Any HTML document can include links to other types of information or resources, so that while viewing an HTML document that, for example, describes resources available on the Internet, one can "click" using a computer mouse on the description of the resource and be immediately connected to the resource itself. Such "hyperlinks" allow information to be accessed and organized in very flexible ways, and allow people to locate and efficiently view related information even if the information is stored on numerous computers all around the world.

Purpose. The World Wide Web (W3C) was created to serve as the platform for a global, online store of knowledge, containing information from a diversity of sources and accessible to Internet users around the world. Though information on the Web is contained in individual computers, the fact that each of these computers is connected to the Internet through W3C protocols allows all of the information to become part of a single body of knowledge. It is currently the most advanced information system developed on the Internet, and embraces within its data model most information in previous networked information systems such as ftp, gopher, wais, and Usenet.

History. W3C was originally developed at CERN, the European Particle Physics Laboratory, and was initially used to allow information sharing within internationally dispersed teams of researchers and engineers. Originally aimed at the High Energy Physics community, it has spread to other areas and attracted much interest in user support, resource recovery, and many other areas which depend on collaborative and information sharing. The Web has extended beyond the scientific and academic community to include communications by individuals, non-profit organizations, and businesses.

Basic Operation. The World Wide Web is a series of documents stored in different computers all over the Internet. Documents contain information stored in a variety of formats, including text, still images, sounds, and video. An essential element of the Web is that any document has an address (rather like a telephone number). Most Web documents contain "links." These are short sections of text or image which refer to another document. Typically the linked text is blue or underlined when displayed, and when selected by the user, the referenced document is automatically displayed, wherever in the world it actually is stored. Links for example are used to lead from overview documents to more detailed documents, from tables of contents to particular pages, but also as cross-references, footnotes, and new forms of information structure.

Many organizations now have "home pages" on the Web. These are documents which provide a set of links designed to represent the organization, and through links from the home page, guide the user directly or indirectly to information about or relevant to that organization. As an example of the use of links a home page might contain links such as those:

THE NATURE OF CYBERSPACE
CREATION OF THE INTERNET AND THE DEVELOPMENT OF CYBERSPACE
HOW PEOPLE ACCESS THE INTERNET
METHODS TO COMMUNICATE OVER THE INTERNET

Links may take the user from the original Web site to another Web site on another computer connected to the Internet. These links from one computer to another, from one document to another across the Internet, are what unify the Web into a single body of knowledge, and what makes the Web unique. The Web was designed with a maximum target time to follow a link of one tenth of a second.

Publishing. The World Wide Web exists fundamentally as a platform through which people and organizations can communicate through shared information. When information is made available, it is said to be "published" on the Web. Publishing on the Web simply requires that the "publisher" has a computer connected to the Internet and that the computer is running W3C server software. The computer can be as simple as a small personal computer costing less than $1500 dollars or as complex as a multi-million dollar mainframe computer. Many Web publishers choose instead to lease disk storage space from someone else who has the necessary computer facilities, eliminating the need for actually owning any equipment oneself.

The Web, as a universe of network accessible information, contains a variety of documents prepared with quite varying degrees of care, from the hastily typed idea, to the professionally executed corporate profile. The power of the Web stems from the ability of a link to point to any document, regardless of its status or physical location.

Information to be published on the Web must also be formatted according to the rules of the Web standards. These standardized formats assure that all Web users who want to read the material will be able to view it. Web standards are sophisticated and flexible enough that they have grown to meet the publishing needs of many large corporations, banks, brokerage houses, newspapers and magazines which now publish "online" editions of their material, as well as government agencies, and even courts, which use the Web to disseminate information to the public. At the same time, Web publishing is simple enough that thousands of individual users and small community organizations are using the Web to publish their own personal "home pages," the equivalent of individualized newsletters about that person or organization, which are available to everyone on the Web.

Web publishers have a choice to make their Web sites open to the general pool of all Internet users, or close them, thus making the information accessible only to those with advance authorization. Many publishers choose to keep their sites open to all in order to give their information the widest potential audience. In the event that the publishers choose to maintain restrictions on access, this may be accomplished by assigning specific user names and passwords as a prerequisite to access to the site. Or, in the case of Web sites maintained for internal use of one organization, access will only be allowed from other computers within that organization's local network.

Searching the Web. A variety of systems have developed that allow users of the Web to search particular information among all of the public sites that are part of the Web. Services such as Yahoo, Magellan, Altavista, Webcrawler, and Lycos are all services known as "search engines" which allow users to search for Web sites that contain certain categories of information, or to search for key words. For example, a Web user looking for the text of Supreme Court opinions would type the words "Supreme Court" into a search engine, and then be presented with a list of World Wide Web sites that contain Supreme Court information. This list would actually be a series of links to those sites. Having searched out a number of sites that might contain the desired information, the user would then follow individual links, browsing through the information on each site, until the desired material is found. For many content providers on the Web, the ability to be found by these search engines is very important.

Common standards. The Web links together disparate information on an ever-growing number of Internet-linked computers by setting common information storage formats (HTML) and a common language for the exchange of Web documents (HTTP). Although the information itself may be in many different formats, and stored on computers which are not otherwise compatible, the basic Web standards provide a basic set of standards which allow communication and exchange of information. Despite the fact that many types of computers are used on the Web, and the fact that many of these machines are otherwise incompatible, those who "publish" information on the Web are able to communicate with those who seek to access information with little difficulty because of these basic technical standards.

A distributed system with no centralized control. Running on tens of thousands of individual computers on the Internet, the Web is what is known as a distributed system. The Web was designed so that organizations with computers containing information can become part of the Web simply by attaching their computers to the Internet and running appropriate World Wide Web software. No single organization controls any membership in the Web, nor is there any single centralized point from which individual Web sites or services can be blocked from the Web. From a user's perspective, it may appear to be a single, integrated system, but in reality it has no centralized control point.

Contrast to closed databases. The Web's open, distributed, decentralized nature stands in sharp contrast to most information systems that have come before it. Private information services such as Westlaw, Lexis/Nexis, and Dialog, have contained large storehouses of knowledge, and can be accessed from the Internet with the appropriate passwords and access software. However, these databases are not linked together into a single whole, as is the World Wide Web.

Success of the Web in research, education, and political activities. The World Wide Web has become so popular because of its open, distributed, and easy-to-use nature. Rather than requiring those who seek information to purchase new software or hardware, and to learn a new kind of system for each new database of information they seek to access, the Web environment makes it easy for users to jump from one set of information to another. By the same token, the open nature of the Web makes it easy for publishers to reach their intended audiences without having to know in advance what kind of computer each potential reader has, and what kind of software they will be using.

The Internet is not exclusively, or even primarily, a means of commercial communication. Many commercial entities maintain Web sites to inform potential consumers about their goods and services, or to solicit purchases, but many other Web sites exist solely for the dissemination of non-commercial information. The other forms of Internet communication—e-mail, bulletin boards, newsgroups, and chat rooms—frequently have non-commercial goals. For the economic and technical reasons set forth in the following paragraphs, the Internet is an especially attractive means for not-for-profit entities or public interest groups to reach their desired audiences. Human Rights Watch, Inc., offers information on its Internet site regarding reported human rights abuses around the world. National Writers Union provides a forum for writers on issues of concern to them. Stop Prisoner Rape, Inc., posts text, graphics, and statistics regarding the incidence and prevention of rape in prisons. Critical Path AIDS Project, Inc., offers information on safer sex, the transmission of HIV, and the treatment of AIDS.

Such diversity of content on the Internet is possible because the Internet provides an easy and inexpensive way for a speaker to reach a large audience, potentially of millions. The start-up and operating costs entailed by communication on the Internet are significantly lower than those associated with use of other forms of mass communication, such as television, radio, newspapers, and magazines. This enables operation of their own Web sites not only by large companies, such as Microsoft and Time Warner, but also by small, not-for-profit groups, such as Stop Prisoner Rape and Critical Path AIDS Project. Commercial online services such as America Online allow subscribers to create Web pages free of charge. Any Internet user can communicate by posting a message to one of the thousands of newsgroups and bulletin boards or by engaging in an on-line "chat", and thereby reach an audience worldwide that shares an interest in a particular topic.

The ease of communication through the Internet is facilitated by the use of hypertext markup language (HTML), which allows for the creation of "hyperlinks" or "links". HTML enables a user to jump from one source to other related sources by clicking on the link. A link might take the user from Web site to Web site, or to other files within a particular Web site. Similarly, by typing a request into a search engine, a user can retrieve many different sources of content related to the search that the creators of the engine have collected.

Through the use of HTML, for example, Critical Path and Stop Prisoner Rape link their Web sites to several related databases, and a user can immediately jump from the home pages of these organizations to the related databases simply by clicking on a link. America Online creates chat rooms for particular discussions but also allows subscribers to create their own chat rooms. Similarly, a newsgroup gathers postings on a particular topic and distributes them to the newsgroup's subscribers. Users of the Carnegie Library can read on-line versions of Vanity Fair and Playboy, and America Online's subscribers can peruse the New York Times, Boating, and other periodicals. Critical Path, Stop Prisoner Rape, America Online and the Carnegie Library all make available content of other speakers over whom they have little or no editorial control.

Because of the different forms of Internet communication, a user of the Internet may speak or listen interchangeably, blurring the distinction between "speakers" and "listeners" on the Internet. Chat rooms, e-mail, and newsgroups are interactive forms of communication, providing the user with the opportunity both to speak and to listen.

It follows that unlike traditional media, the barriers to entry as a speaker on the Internet do not differ significantly from the barriers to entry as a listener. Once one has entered cyberspace, one may engage in the dialogue that occurs there. In the argot of the medium, the receiver can and does become the content provider, and vice-versa. The Internet is therefore a unique and wholly new medium of worldwide human communication.

Once a provider posts content on the Internet, it is available to all other Internet users worldwide. Similarly, once a user posts a message to a newsgroup or bulletin board, that message becomes available to all subscribers to that newsgroup or bulletin board. Once a provider posts its content on the Internet, it cannot prevent that content from entering any community. Unlike the newspaper, broadcast station, or cable system, Internet technology necessarily gives a speaker a potential worldwide audience. Because the Internet is a network of networks any network connected to the Internet has the capacity to send and receive information to any other network. Hotwired Ventures, for example, cannot prevent its materials on mixology from entering communities that have no interest in that topic.

It takes several steps to enter cyberspace. At the most fundamental level, a user must have access to a computer with the ability to reach the Internet (typically by way of a modem). A user must then direct the computer to connect with the access provider, enter a password, and enter the appropriate commands to find particular data. On the World Wide Web, a user must normally use a search engine or enter an appropriate address. Similarly, accessing newsgroups, bulletin boards, and chat rooms requires several steps.

Unlike other forms of communication on the Internet, there is technology by which an operator of a World Wide Web server may interrogate a user of a Web site. An HTML document can include a fill-in-the-blank "form" to request information from a visitor to a Web site, and this information can be transmitted back to the Web server and be processed by a computer program, usually a Common Gateway Interface (cgi) script. The Web server could then grant or deny access to the information sought. The cgi script is the means by which a Web site can process a fill-in form and thereby screen visitors by requesting a credit card number or adult password.

A large percentage, perhaps 40% or more, of content on the Internet originates outside the United States. An Internet user could access a Web site of London (which presumably is on a server in England), and then link to other sites of interest in England. A user can sometimes discern from a URL that content is coming from overseas, since InterNIC allows a content provider to imbed a country code in a domain name. Foreign content is otherwise indistinguishable from domestic content (as long as it is in English), since foreign speech is created, named, and posted in the same manner as domestic speech. There is no requirement that foreign speech contain a country code in its URL.

The use of "caching" makes it difficult to determine whether the material originated from foreign or domestic sources. Because of the high cost of using the trans-Atlantic and transpacific cables, and because the high demand on those cables leads to bottleneck delays, content is often "cached", or temporarily stored, on servers in the United States. Material from a foreign source in Europe can travel over the trans-Atlantic cable to the receiver in the United States, and pass through a domestic caching server which then stores a copy for subsequent retrieval. This domestic caching server, rather than the original foreign server, will send the material from the cache to the subsequent receivers, without placing a demand on the trans-oceanic cables. This shortcut effectively eliminates most of the distance for both the request and the information and, hence, most of the delay. The caching server discards the stored information according to its configuration (e.g., after a certain time or as the demand for the information diminishes). Caching therefore advances core Internet values: the cheap and speedy retrieval of information.

Caching is not merely an international phenomenon. Domestic content providers store popular domestic material on their caching servers to avoid the delay of successive searches for the same material and to decrease the demand on their Internet connection. America Online can cache the home page of the New York Times on its servers when a subscriber first requests it, so that subsequent subscribers who make the same request will receive the same home page, but from America Online's caching service rather than from the New York Times's server.

Figure 43:
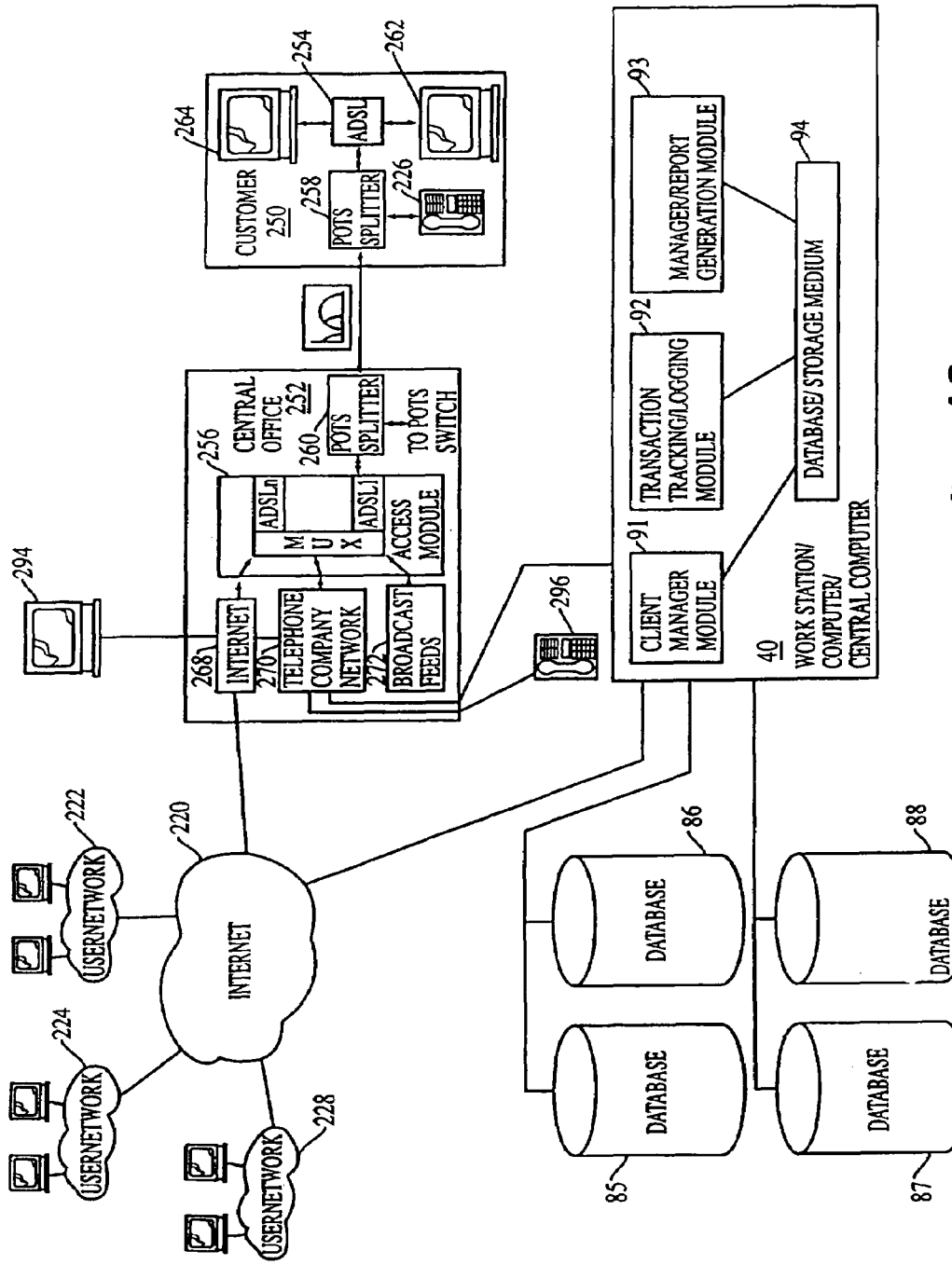
FIG. 43 is a block diagram of an alternative computer system suitable for implementing the invention.

FIG. 43 is an illustration of the architecture of the combined internet, POTS, and ADSL architecture for use in the present invention in accordance with a first embodiment. In FIG. 43, to preserve POTS and to prevent a fault in the ADSL equipment 254, 256 from compromising analog voice traffic 226, 296 the voice part of the spectrum (the lowest 4 kHz) is separated from the rest by a passive filter, called a POTS splitter 258, 260. The rest of the available bandwidth—from about 10 kHz to 1 MHZ—carries data at rates up to 6 bits per second for every hertz of bandwidth from data equipment 262, 264, 294. The ADSL equipment 256 then has access to a number of destinations including significantly the Internet 268, and other destinations 270, 272.

To exploit the higher frequencies, ADSL makes use of advanced modulation techniques, of which the best known is the discrete multitone (DMT) technology. As its name implies, ADSL transmits data asymmetrically—at different rates upstream toward the central office 252 and downstream toward the subscriber 250.

Cable television providers are providing analogous Internet service to PC users over their TV cable systems by means of special cable modems. Such modems are capable of transmitting up to 30 Mb/s over hybrid fiber/coax systems, which use fiber to bring signals to a neighborhood and coax to distribute it to individual subscribers.

Cable modems come in many forms. Most create a downstream data stream out of one of the 6-MHZ TV channels that occupy spectrum above 50 MHZ (and more likely 550 MHZ) and carve an upstream channel out of the 5-50-MHZ band, which is currently unused. Using 64-state quadrature amplitude modulation (64 QAM), a downstream channel can realistically transmit about 30 Mb/s (the oft-quoted lower speed of 10 Mb/s refers to PC rates associated with Ethernet connections). Upstream rates differ considerably from vendor to vendor, but good hybrid fiber/coax systems can deliver upstream speeds of a few megabits per second. Thus, like ADSL, cable modems transmit much more information downstream than upstream.

The internet architecture 220 and ADSL architecture 354, 356 may also be combined with, for example, user networks 222, 224, and 228. As illustrated in this first embodiment, users may access or use or participate in the administration, management computer assisted program in computer 40 via various different access methods. In this first embodiment, the various databases are only accessible via access to and/or by computer system 40.

Figure 44:
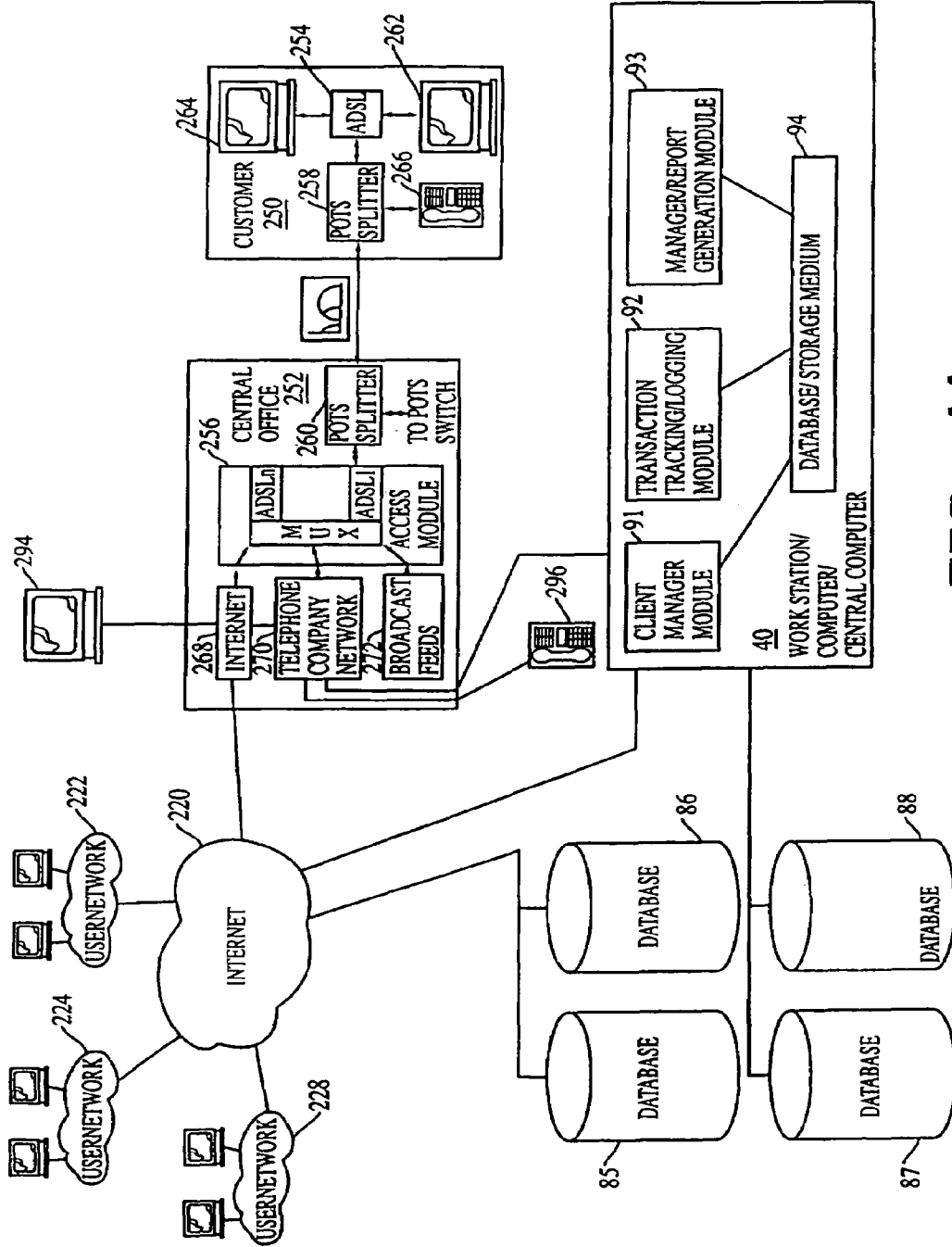
FIG. 44 is a block diagram showing a portion of the computer system of FIG. 43 in more detail.

FIG. 44 is an illustration of the architecture of the combined internet, POTS, and ADSL architecture for use in the present invention in accordance with a second embodiment. As illustrated in this second embodiment, users may access or use or participate in the administration, management computer assisted program in computer 40 via various different access methods. In this second embodiment, some databases (e.g., 87, 88) are only accessible via access to and/or by computer system 40, and other databases (e.g., 85, 86) are only accessible via access to and/or by internet 220.

Figure 45:
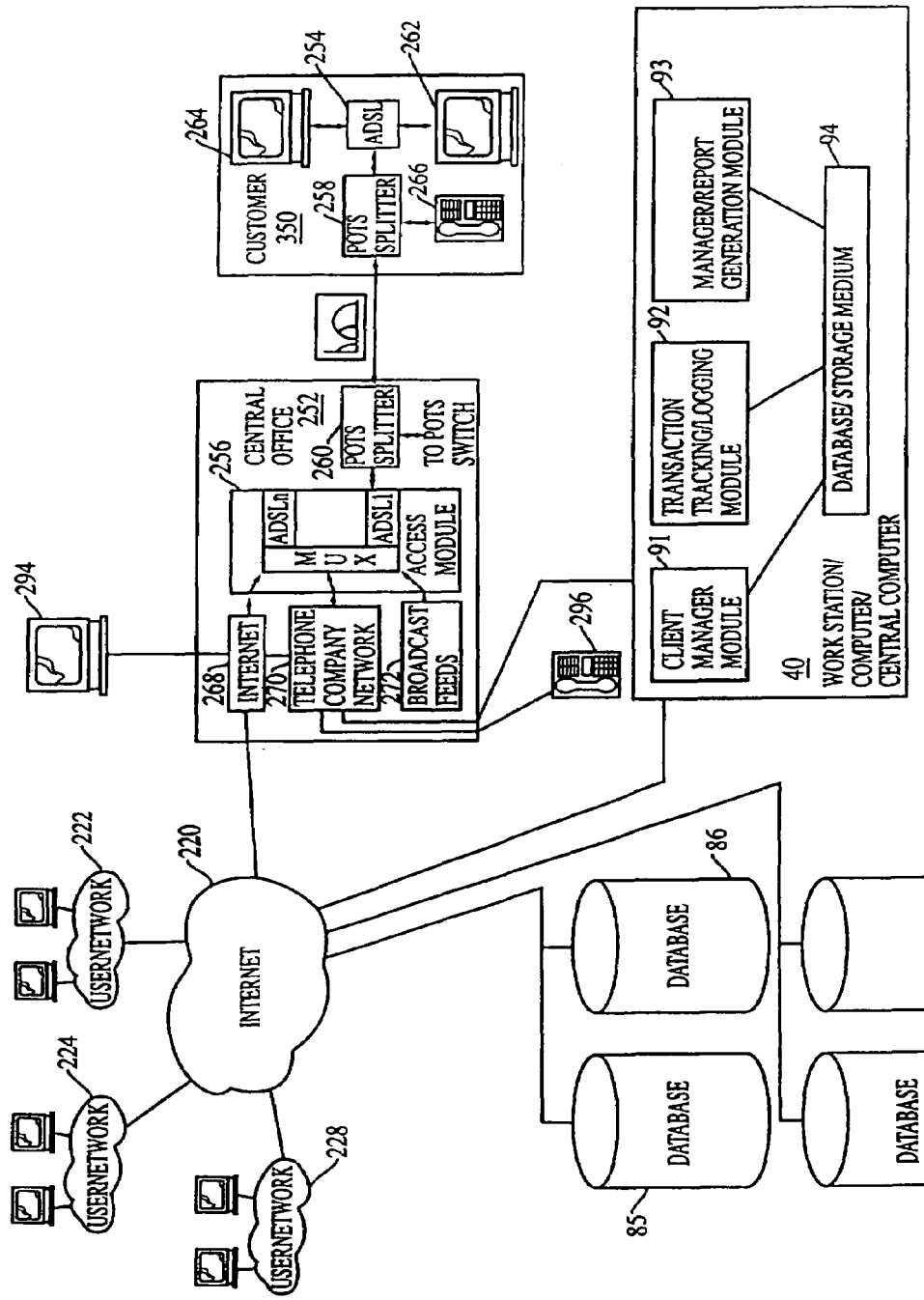
FIG. 45 is an illustration of the architecture of the combined internet, POTS, and ADSL architecture for use in the present invention in accordance with a first embodiment.

FIG. 45 is an illustration of the architecture of the combined internet, POTS, and ADSL architecture for use in the present invention in accordance with a third embodiment. As illustrated in this third embodiment, users may access or use or participate in the administration, management computer assisted program in computer 40 via various different access methods. In this third embodiment, the databases (e.g., 85, 86, 87 and/or 88) are only accessible via access to and/or by internet 220.

Figure 46:
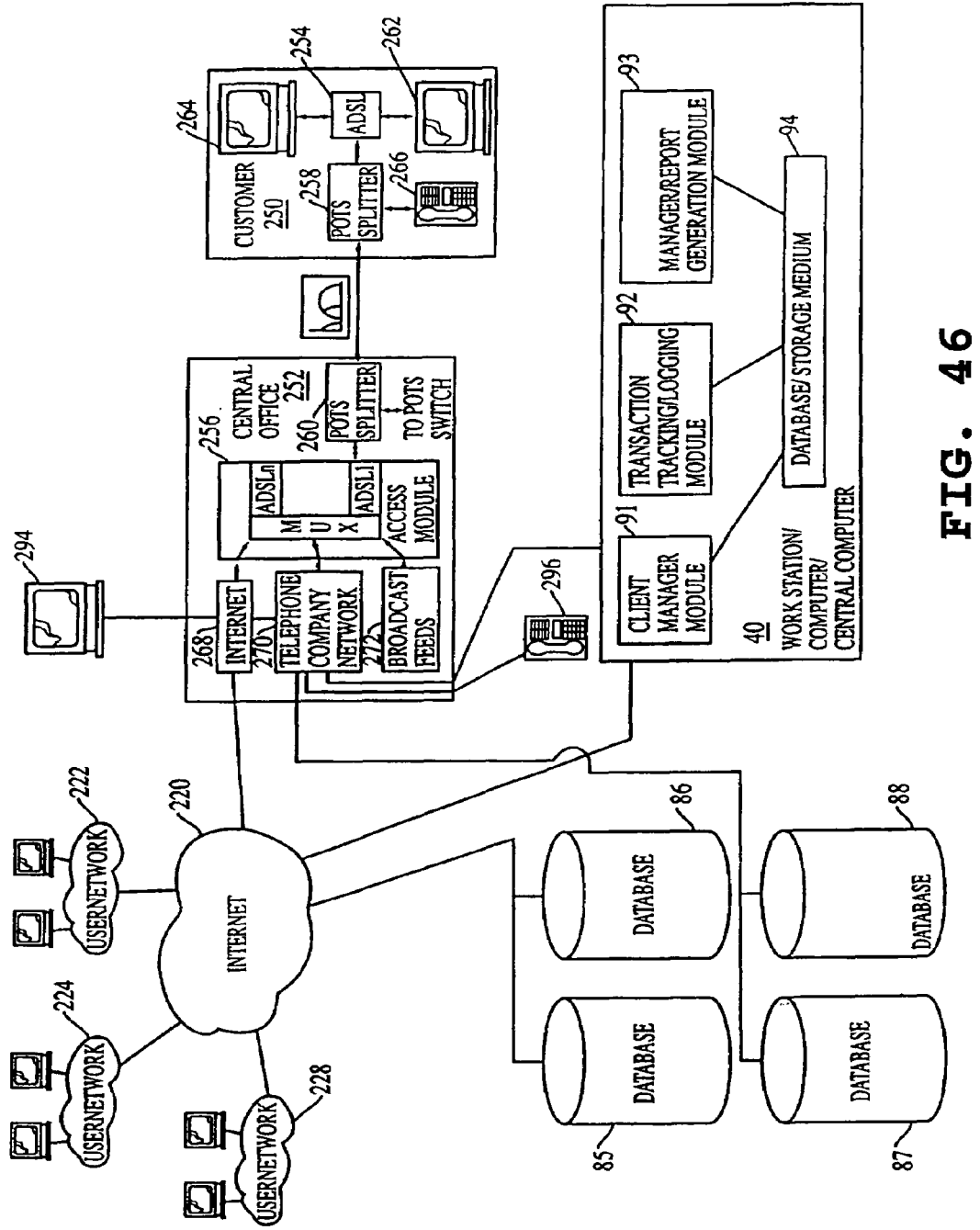
FIG. 46 is an illustration of the architecture of the combined internet, POTS, and ADSL architecture for use in the present invention in accordance with a second embodiment.

FIG. 46 is an illustration of the architecture of the combined internet, POTS, and ADSL architecture for use in the present invention in accordance with a fourth embodiment. As illustrated in this fourth embodiment, users may access or use or participate in the administration, management computer assisted program in computer 40 via various different access methods. In this fourth embodiment, some databases (e.g., 87, 88) are only accessible via access to and/or by ADSL system 256 via interface network 270, and other databases (e.g., 85, 86) are only accessible via access to and/or by internet 220.

The above embodiments are only to be construed as examples of the various different types of computer systems that may be utilized in combination with the computer assisted-implemented process of the present invention with wireless devices.

Figure 47:
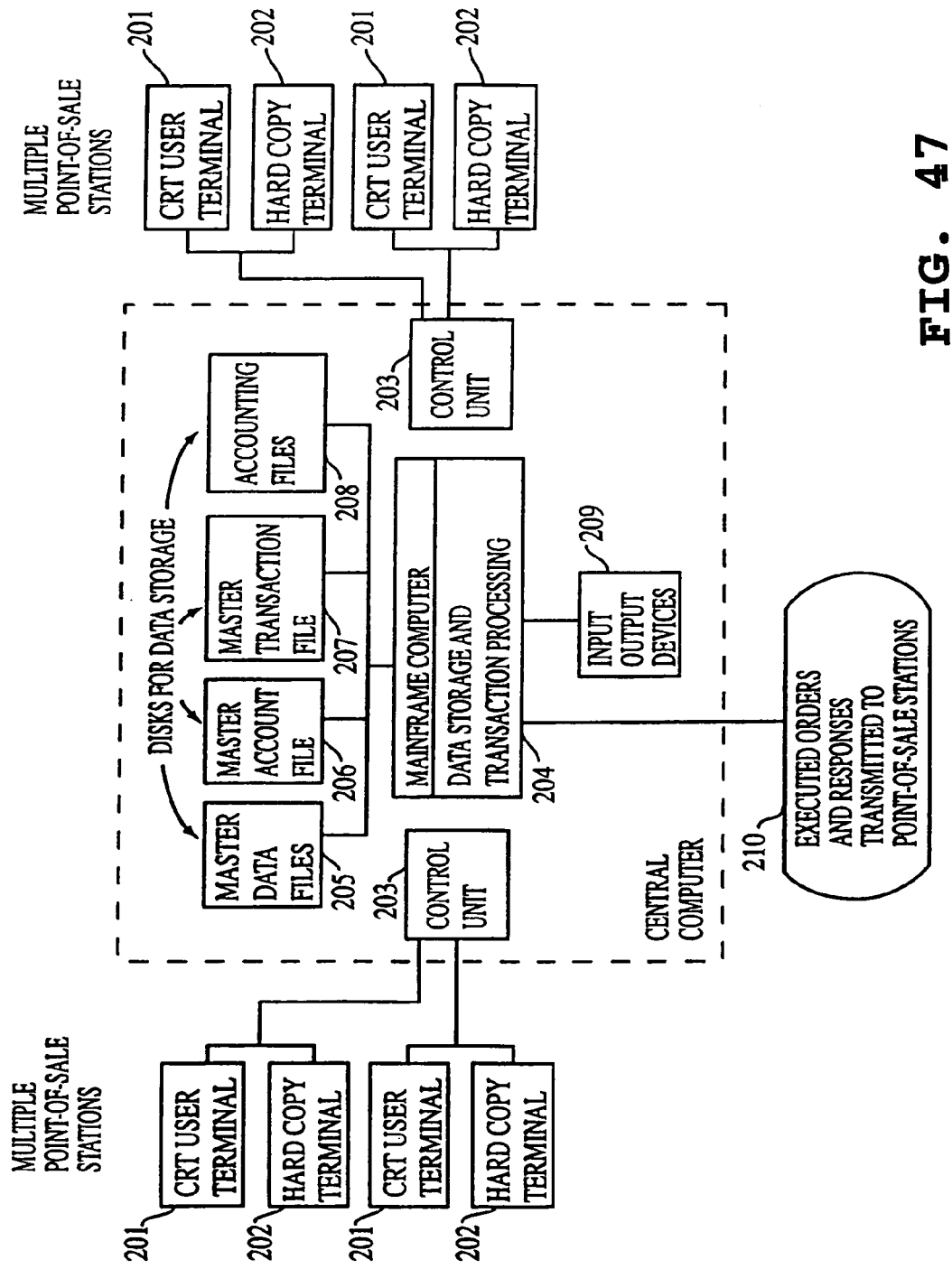
FIG. 47 is an illustration of the architecture of the combined internet, POTS, and ADSL architecture for use in the present invention in accordance with a third embodiment.

FIG. 47 is a block diagram of an alternative computer system suitable for implementing the invention. At each point-of-sale station, there is a CRT user terminal 201 and associated hard copy terminal 202. The hardware system would include a plurality of these terminals. Each terminal communicates with a central computer 204 through a control unit 203, which controls the point-of-sale terminals, receives purchase orders, redemption orders, and account inquiries from the point-of-sale stations and transmits them to the central computer and receives account verifications, transaction verifications, current market conditions, and responses to customer inquiries regarding account status from the central computer 204 and transmits them to the appropriate point-of-sale stations.

Each control unit could serve up to, for example, approximately 20 point-of-sale stations. The account verifications, transaction verifications, current market conditions, and responses to customer inquiries are transmitted first to the CRT user terminal 201. If the investor requests a written transaction record or a written account status report, the hard copy terminal 202 provides it upon command.

The central computer 204 contains storage space for data relating to transactions that are in process; processes all purchase and redemption transactions; performs the update operation; conducts the management information reporting operation and the period-by-period performance monitoring operation; calculates the income generated periodically in each account; and performs the individual record-keeping and reporting operation.

The central computer 204 transmits information to and receives information from the master data files 205 as required in order to retrieve current and projected market data, perform the update operation, conduct the management information reporting operation and the period-by-period performance monitoring operation, and retrieve the escalation rates needed to calculate revenues.

The central computer 204 also transmits information to and receives information from the master account file 206. The central computer 204 also transmits information to and receives information from the master transaction file 207 in connection with purchase and redemption transactions and in connection with management information reporting operation. The central computer 204 also transmits end-of-period financial statements to the accounting files 208 for storage and retrieves these statements from the accounting files 208 when prompted by the input/output devices of the central computer 209.

The system manager has a complement of input/output devices 209. Into the input devices are entered requests for the daily and periodic reports to the manager, the management information reports, the period-by-period investment performance reports, and the individual reports and instructions for managing and controlling the hardware system and its software. The output devices are used to obtain the daily and periodic reports to the manager, the management information reports, the period-by-period performance reports, and the individual reports.

Figure 48:
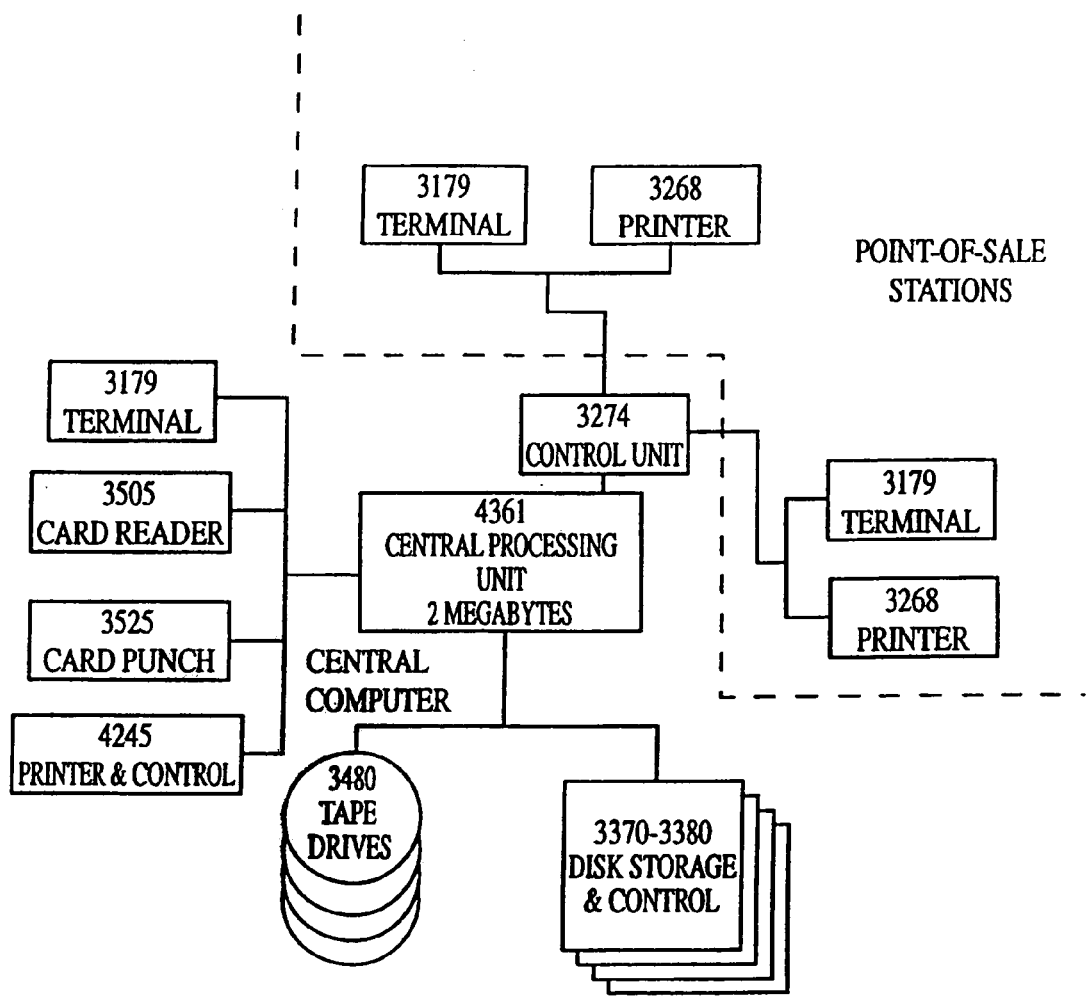
FIG. 48 is an illustration of the architecture of the combined internet, POTS, and ADSL architecture for use in the present invention in accordance with a fourth embodiment.

FIG. 48 is a block diagram showing a portion of the computer system of FIG. 47 in more detail. The exemplary system includes the following types of devices:

| Make Model | Item in FIG. 25 |
| --- | --- |
| IBM 3278 or 3279 or 3179 | CRT user terminal 201 |
| IBM 3268 | Hard copy terminal 202 |
| IBM 3274 | Control unit 203 |
| IBM 4361 | central computer 204 |
| IBM 3370–3380 | disks 205–208 |
| IBM 3420 or 3480 | tape drives 205–208 |
| IBM 3179 | CRT terminal 209 |
| IBM 3505 | card reader 209 |
| IBM 3525 | card punch 209 |
| IBM 4245 | printer 209 |

It is to be understood that there are a large number of commercially available substitutes for each item of hardware which could be combined into fully compatible systems. Accordingly, the scope of the invention is not limited by the particularity of the hardware system described herein.

The methods which are described herein, are implemented, for example, on the hardware system(s) described in FIG. 47 (or other suitable computer system) by embodying the flow-charted routines into a series of software packages that substantially follow the sequence of steps in the flow charts. There are conventional software packages that are commercially available that can also be adapted to perform one or more of the steps described herein. Accordingly, as described below, it would not be necessary in order to implement the invention to write separate software for each step from scratch.

The Point-of Sale software package marketed by International Business Machines (IBM), for example, is a general interactive data package for point-of-sale applications that can be formatted to provide the precise means of receiving customer orders and inquiries, and transmitting the responses to customer inquiries, and the transaction reports.

The Interactive Financial Systems (IFS) library of software packages marketed by IBM, for example, contains a set of general financial and accounting packages that can be adapted and formatted to provide the data base management, accounting, and financial reporting operations required to implement the invention. Part I of IFS contains data base management routines, which can be used to manage the master data files 205, the master account file 206, the master transaction file 207, and the accounting files 208. It also contains routines that can be adapted to handle the account management functions.

Part II of IFS contains general routines that cover general ledger maintenance and the preparation of financial statements and related schedules. It can be adapted and formatted to provide the precise means of preparing the daily transaction summary and summary of current position; the end-of-period investment performance and position report; the end-of-period reports to account holders; the end-of-period statements; and the report to the manager. Part III of IFS can be adapted to monitor accounts receivable. As an alternative to the IFS software package, the MSA software package produced by Management Science of America can be used.

The VSE/SP software package marketed by IBM contains a complete software package for operating the hardware system diagramed in FIGS. 25–26. It is possible to write the software needed to implement each of the other routines in one of the available user languages, such as FORTRAN, Pascal, C, C++, and the like, by following the sequence of steps described herein.

Notations and Nomenclature

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

For example, the specific sequence of the above described process may be altered so that certain processes are conducted in parallel or independent, with other processes, to the extent that the processes are not dependent upon each other. Thus, the specific order of steps described herein are not to be considered implying a specific sequence of steps to perform the above described process. Other alterations or modifications of the above processes are also contemplated. For example, further insubstantial approximations of the above equations are also considered within the scope of the processes described above. One or more, or all of the above steps may optionally be performed manually. The above embodiments are only to be construed as examples of the various different types of computer systems that may be utilized in connection with the computer assisted-implemented process for purchasing and provisioning items over global and/or local networks.

GLOSSARY

Dongle: a small security device that attaches to a computer port to control access to a specific software application. A dongle-protected program will run only when its dongle is attached to the computer.

Piconet: two or more Bluetooth units sharing the same channel-that is, operating in synchronism and following the same hopping sequence.

Profile: a document that describes exactly how different basic protocols and procedures work together in various kinds of Bluetooth devices and applications.

Service discovery protocol (SDP): a procedure used by Bluetooth-enabled devices to determine what services are available from or through other Bluetooth-enabled devices.

What is claimed is:

1. A method of at least one of reallocating, upgrading and awarding admittance to events to an event customer via a data communication network, said data communication network optionally comprising a server, workstations operably connectable to said server, one or more databases operably connectable to said server and said workstations, said workstations optionally including a web browser interface facilitating communication with said server, a point of sale server operably connectable to the server, a point of sale system operably connectable to the point of sale server, and wireless devices operably connectable to said server, said wireless devices including at least one of a smart card, a personal digital assistant, a mobile telephones, and a mobile data device, said wireless device comprising at least one of transmitting and receiving means and transceiver means for receiving and transmitting signals, said method comprising the steps of:

(a) at least one of receiving a communication from and transmitting the communication to the event customer, the communication including a request to obtain admittance to at least one event, via at least one of a short message text service (SMS) communication, bluetooth, and a wireless communication comprising an identifier associated with the wireless device and an Internet Protocol (IP) address that at least one of are displayed on and notify the wireless device upon receipt from the wireless device;

(b) optionally updating an account associated with said identifier to reflect the request;

(c) optionally accessing the account by utilizing the identifier stored on the identification device at the point of sale system upon presentation of the identification device to verify the request;

(d) admitting the event customer at the point of sale system after verification of the request;

(e) determining a predetermined time period associated with the event indicative of another event customer from event customers not attending the event in accordance with first predetermined criteria including at least one of agreement with one or more of the event customers, the event customer not providing notice of non-attendance a first predetermined time period prior to the event, the event customer not providing notice of non-attendance a second predetermined time period after start of the event the event customer leaving the event early, and other predetermined criteria;

(f) polling the wireless devices of a plurality of users to determine whether additional seats have been made available, and if additional seats have been made available, then adding the additional seats to a list of available seats for said method of dynamically at least one of allocating, upgrading and awarding admittance to the events to the event customer;

(g) releasing an allocation associated with the another event customer and notifying at least one of the event customers that are at least one of currently attending the event and registered for said at least one of reallocating, reprovisioning, upgrading and awarding responsive to said releasing the allocation;

(h) accepting by at least one of the event customers said at least one of reallocating, reprovisioning, upgrading and awarding in accordance with second predetermined criteria;

(i) registering by the event customer, and the event customer providing targeted marketing information including age and interests and compiling information for advertising and marketing services, and receiving demographic information from the event customer; processing the demographic information; transmitting to the at least one wireless device of the event customer at least one of an advertisement additional demographic information, direct marketing and focused advertising; and (j) processing customer profiles in accordance with predetermined criteria, and determining responsive to the processing of the customer profiles event customers to be notified via the at least one wireless device, and notifying the event customers responsive to the customer profiles comprising at least one of patron satisfaction communication, additional revenue, additional advertising, and advertising sponsorship for advertising on the wireless device.

2. The method of claim 1, wherein said identification device comprises a memory medium for storing the identifier, and wherein said accessing step further comprises reading said identifier from said identification device with a reading device.

3. The method of claim 1, further comprising receiving demographic information from the event customer.

4. The method of claim 1, further comprising generating at least one of a physical receipt, a confirmation, and an electronic confirmation with at least one of the identification device and the point of sale server.

5. The method of claim 1, further comprising the step of generating at least one of a physical receipt, a confirmation, and an electronic confirmation with at least one of the identification device and the point of sale server, and the at least one of the physical receipt, the confirmation, and the electronic confirmation comprises at least one of reserved seating and purchase information.

6. The method of claim 1, wherein said second predetermined criteria includes the event customer willing to pay at least one of a predetermined price and the highest price, and wherein said method further comprises the step of billing the event customer in at least one of real-time or at a later time for said at least one of reallocating, reprovisioning, upgrading and awarding in accordance with the second predetermined criteria.

7. The method of claim 1, wherein said releasing an allocation associated with the another event customer and said notifying at least one of the event customers that are at least one of currently attending the event and registered for said at least one of reallocating, reprovisioning, upgrading and awarding is performed in accordance with a predetermined algorithm.

8. The method of claim 1, wherein the first predetermined criteria includes at least one of agreement with one or more of the event customers, the event customer not providing notice of non-attendance a first predetermined time period prior to the event, the event customer not providing notice of non-attendance a second predetermined time period after start of the event, the event customer leaving the event early, and other predetermined criteria.

9. A method of upgrading and awarding admittance to events to an event customer via a data communication network, said data communication network optionally comprising a server, workstations operably connectable to said server, one or more databases operably connectable to said server and said workstations, said workstations optionally including a web browser interface facilitating communication with said server, a point of sale system, and wireless devices operably connectable to said server, said wireless devices including at least one of a smart card, a personal digital assistant, a mobile telephone, and a mobile data device, said wireless device comprising at least one of transmitting and receiving means and transceiver means for receiving and transmitting signals to and from said server, said method comprising the steps of:

(a) at least one of receiving a communication from and transmitting the communication to the event customer, the communication including a request to obtain admittance to at least one event comprising at least one ticket to utilize at least one seating location associated with the at least one event, via at least one of a short message text service (SMS) communication, bluetooth, and a wireless communication comprising an identifier associated with the wireless device and an Internet Protocol (IP) address that at least one of are displayed on and notify the wireless device upon receipt from the wireless device;

(b) admitting the event customer at the point of sale system after verification of the request, and updating a database indicating that the request was processed and that the event customer is currently checked into the at least one event and is utilizing the at least one seating location;

(c) determining first predetermined criteria associated with the event indicative of at least one other event customer not attending the event and not likely using at least another seating location including at least one of agreement with one or more of the event customers, the event customer not providing notice of non-attendance a first predetermined time period prior to the event, the event customer not providing notice of non-attendance a second predetermined time period after start of the event, the event customer leaving the event early, and other predetermined criteria;

(d) polling the wireless devices of a plurality of users to determine whether additional seats have been made available, and if additional seats have been made available, then adding the additional seats to a list of available seats for said method of dynamically at least one of allocating, upgrading and awarding admittance to the events to the event customer;

(e) releasing an allocation associated with the at least another seating location and the at least one other event customer responsive to said determining step, and notifying at least another of the event customers to perform said at least one of upgrading and awarding responsive to said releasing the allocation and responsive to the processing of profile information, and notifying the at least another event customer via the at least one wireless device;

(f) accepting by the at least another of the event customers said at least one of upgrading and awarding to utilize the at least another seating location to be utilized at the least one event in accordance with second predetermined criteria;

(g) transmitting a confirmation to the at least one wireless device of the at least another event customer to be used by the at least another event customer to utilize the at least another seating location;

(h) presenting, by the at least another event customer, at least one of the confirmation and another ticket associated with a previous seating location, to identify and utilize the at least another seating location;

(i) registering by the event customer, and the event customer providing targeted marketing information including age and interests and compiling information for advertising and marketing services, and receiving demographic information from the event customer; processing the demographic information; transmitting to the at least one wireless device of the event customer at least one of an advertisement, additional demographic information, direct marketing and focused advertising; and (j) processing customer profiles in accordance with predetermined criteria, and determining responsive to the processing of the customer profiles event customers to be notified via the at least one wireless device, and notifying the event customers responsive to the customer profiles comprising at least one of patron satisfaction communication, additional revenue, additional advertising, and advertising sponsorship for advertising on the wireless device.

10. The method of claim 9, further comprising the step of polling the wireless devices of a plurality of users to determine whether additional seats have been made available, and if additional seats have been made available, then adding the additional seats to a list of available seats for said method of dynamically at least one of allocating, upgrading and awarding admittance to the events to the event customer.

11. A method of dynamically communicating with an event customer via a data communication network, said data communication network optionally comprising a server, workstations operably connectable to said server, one or more databases operably connectable to said server and said workstations, said workstations optionally including a web browser interface facilitating communication with said server, a communication server operably connectable to the server, a communication system operably connectable to the communication server, and wireless devices operably connectable to said server, said wireless devices including at least one of a smart card, a personal digital assistant, a mobile telephone, and a mobile data device, said wireless device comprising at least one of transmitting and receiving means and transceiver means for receiving and transmitting signals, said method comprising at least one of the sequential, non-sequential and sequence independent steps of:

(a) at least one of transmitting to and receiving from, at least one wireless device of the event customer a communication including a request for at least one of a movie ticket, a sporting event ticket, a concession, a service, an offer, an entertainment service and merchandise, via at least one of a short message text service (SMS) communication, bluetooth, and a wireless communication comprising an indentifier associated with the wireless device and an Internet Protocol (IP) address that at least one of are displayed on and notify the wireless device upon receipt from the wireless device;

(b) at least one of accessing and updating an account associated with said event customer responsive to the request;

(c) at least one of accessing and verifying the account optionally by utilizing the identifier optionally at the point of sale system upon communication with the identification device to verify the request;

(d) optionally admitting the event customer at the point of sale system after verification of the request;

(e) determining an available response associated with the request and the event and notifying at least one of the event customers that are at least one of currently attending the event, the available response comprising another communication responsive to the request to the at least one of the event customers and responsive to said step (a) of said at least one of transmitting to and receiving from, the event customer the communication including the request;

(f) determining a predetermined time period associated with the event indicative of another event customer from event customers not attending the event in accordance with first predetermined criteria including at least one of agreement with one or more of the event customers, the event customer not providing notice of non-attendance a first predetermined time period prior to the event, the event customer not providing notice of non-attendance a second predetermined time period after start of the event, the event customer leaving the event early, and other predetermined criteria;

(g) polling the wireless devices of a plurality of users to determine whether additional seats have been made available, and if additional seats have been made available, then adding the additional seats to a list of available seats for said method of dynamically at least one of allocating, upgrading and awarding admittance to the events to the event customer;

(h) at least one of accepting and participating by the at least one of the event customers using the wireless device in receiving said at least one of the movie ticket, the sporting event ticket, the concession, the service, the offer, the entertainment service and the merchandise;

(i) registering by the event customer, and the event customer providing targeted marketing information including age and interests and compiling information for advertising and marketing services, and receiving demographic information from the event customer; processing the demographic information; transmitting to the at least one wireless device of the event customer at least one of an advertisement, additional demographic information, direct marketing and focused advertising; and (j) processing customer profiles in accordance with predetermined criteria, and determining responsive to the processing of the customer profiles event customers to be notified via the at least one wireless device, and notifying the event customers responsive to the customer profiles comprising at least one of patron satisfaction communication, additional revenue, additional advertising, and advertising sponsorship for advertising on the wireless device.

12. The method of claim 11, further comprising the step of polling the wireless devices of a plurality of users for additional communications including additional requests for at least one of additional movie tickets, additional sporting event tickets, additional concessions, additional services, additional offers, additional entertainment services and additional merchandise.

13. The method of claim 11, further comprising the step of processing customer profiles in accordance with predetermined criteria, and determining responsive to the processing of the customer profiles event customers to be notified via at least one of an announcement, manually, wireless device, mobile telephone, and bulletin board.

14. The method of claim 11, further comprising the step of processing customer profiles in accordance with predetermined criteria, and determining responsive to the processing of the customer profiles event customers to be notified via the at least one wireless device, and notifying the event customers responsive to the customer profiles comprising at least one of patron satisfaction communication, additional revenue, additional advertising, and advertising sponsorship for advertising on the wireless device.

15. The method of claim 11, further comprising the step of processing customer profiles in accordance with predetermined criteria, and determining responsive to the processing of the customer profiles event customers to be notified via the at least one wireless device, and notifying the event customers responsive to the customer profiles comprising advertising sponsorship for advertising on the wireless device.

16. The method of claim 11, wherein said step (a) at least one of transmitting to and receiving from, the at least one wireless device of the event customer, further comprises the step of transmitting to and receiving from, the at least one wireless device of the event customer the communication including the request for at least one of the movie ticket, the sporting event ticket, the concession, the service, the offer, the entertainment service and the merchandise, via a short message text service (SMS) communication that at least one of are displayed on and notify the wireless device upon receipt from the wireless device.

17. The method of claim 11, further comprising the step of receiving demographic information from the event customer; processing the demographic information; transmitting to the at least one wireless device of the event customer at least one of an advertisement, additional demographic information, direct marketing and focused advertising.

18. The method of claim 11, further comprising the step of registering by the event customer, and the event customer providing targeted marketing information including age and interests and compiling information for advertising and marketing services, and receiving demographic information from the event customer; processing the demographic information; transmitting to the at least one wireless device of the event customer at least one of an advertisement, additional demographic information, direct marketing and focused advertising.

19. The method of claim 11, further comprising the step of registering by the event customer, and the event customer providing information and compiling information for advertising and marketing services; processing the information; transmitting to the at least one wireless device of the event customer targeted communications to the event customer allowing a sponsor to leverage user and market information to create the targeted communications comprising at least one of an advertisement, additional information, direct marketing and focused advertising.

20. The method of claim 11, further comprising the step of generating an electronic confirmation and transmitting the electronic confirmation to the wireless device.

21. The method of claim 11, further comprising the step of generating an electronic confirmation and transmitting the electronic confirmation to the wireless device, and downloading at least one of instructions and location related information for the event customer to go to a location associated with the communication.

22. The method of claim 11, further comprising the step of generating an electronic confirmation and transmitting the electronic confirmation to the wireless device, and downloading at least one of instructions and location related information for the event customer to go to a location associated with the communication, including directions using a global positioning system in combination with the wireless device.

* * * * *

UNITED STATES PATENT AND TRADEMARK OFFICE
CERTIFICATE OF CORRECTION

PATENT NO.       : 7,203,665 B2
APPLICATION NO.  : 11/347990
DATED            : April 10, 2007
INVENTOR(S)      : Donner Page 1 of 1

It is certified that error appears in the above-identified patent and that said Letters Patent is hereby corrected as shown below:

Column 90, line 19 claim 1, delete "at" and insert --utilized by--
           line 20, after "upon" insert --determination of--
           line 22, delete "admitting" and insert --determining admittance of--
           line 22, delete "at" and insert --to be admitted--
           line 48, delete "accepting by" and insert --receiving an acceptance from--
           line 52, delete "registering by" and insert --receiving a registration from--
           line 52, delete "the event"
           line 53, delete "customer providing"

Column 91, line 13 claim 4, delete "with" and insert --to be utilized by--
           line 17 claim 5, delete "with" and insert --to be utilized by--

Column 92, line 5 claim 9, delete "admitting" and insert --determining to admit--
           line 5, delete "at" and insert --to be admitted--
           line 38, delete "accepting by" and insert --receiving an acceptance from--
           line 47, delete "presenting by" and insert --receiving from--
           line 51, delete "registering by" and insert --receiving a registration from--
           line 51, delete "the event"
           line 52, delete "customer providing"

Column 93, line 47 claim 11, delete "at" and insert --to be admitted--

Column 94, line 10 claim 11, delete "accepting and" and insert --receiving an acceptance from and indication of--
           line 16, delete "registering by" and insert --receiving a registration from--
           line 16, delete "the event"
           line 17, delete "customer providing"

Column 95, line 16 claim 18, delete "registering by" and insert --receiving a registration from--
           line 26, delete "registering by" and insert --receiving a registration from--

Signed and Sealed this

Eighth Day of June, 2010

David J. Kappos
*Director of the United States Patent and Trademark Office*